United States Patent
Graves et al.

(10) Patent No.: US 7,599,620 B2
(45) Date of Patent: Oct. 6, 2009

(54) COMMUNICATIONS NETWORK FOR A METROPOLITAN AREA

(75) Inventors: Alan F. Graves, Kanata (CA); Ian M. Cunningham, Burnstown (CA); Ryan Stark, Ottawa (CA); Kent E. Felske, Kanata (CA); Chris Hobbs, Ottawa (CA); John H. Watkins, Ottawa (CA)

(73) Assignee: Nortel Networks Limited, Montreal, Quebec (CA)

( * ) Notice: Subject to any disclaimer, the term of this patent is extended or adjusted under 35 U.S.C. 154(b) by 1543 days.

(21) Appl. No.: 09/893,493

(22) Filed: Jun. 29, 2001

(65) Prior Publication Data

US 2002/0191250 A1 Dec. 19, 2002

(51) Int. Cl.
*H04B 10/00* (2006.01)
(52) U.S. Cl. .............................. 398/51; 398/79; 398/59; 398/70
(58) Field of Classification Search ............. 398/45–73, 398/79–103
See application file for complete search history.

(56) References Cited

U.S. PATENT DOCUMENTS

| | | | |
|---|---|---|---|
| 6,583,901 B1 * | 6/2003 | Hung ........................... | 398/79 |
| 6,714,545 B1 * | 3/2004 | Hugenberg et al. ........ | 370/395.1 |
| 2002/0181044 A1 * | 12/2002 | Kuykendall, Jr. ............ | 359/124 |

FOREIGN PATENT DOCUMENTS

| | | |
|---|---|---|
| EP | 1 039 670 A | 9/2000 |
| WO | WO 01 35185 A | 5/2001 |

OTHER PUBLICATIONS

Qiao C: "Labeled Optical Burst Switching For IP-OVer-WDM Integration" IEEE Communications Magazine, IEEE Service Center, Piscataway, N.J., US, vol. 38, No. 9, (Sep. 2000), pp. 104-114, XP000975327 ISSN: 0163-6804.

Ghani N: "Lamda-Labeling; A Framework For IP-Over-WDM Using MPLS" Optical Networks Magazine, Spie, Bellingham, WA, US, vol. 1, No. 2, (Apr. 2000), pp. 45-58, XP000969815 ISSN: 1388-6916 "figure 5" p. 55, left-hand column, paragraph 3.5 right hand column, paragraph 4.

* cited by examiner

*Primary Examiner*—Agustin Bello

(57) ABSTRACT

A communications network for a metropolitan area is disclosed. The network is comprised of three basic types of nodes: an access multiplexer, a photonic switch, and a core node. The access multiplexer provides multiplexing of data packets from end-users onto at least one sparse wavelength division multiplexed (SWDM) wavelength. The SWDM wavelengths are carried over fiber cable to the photonic switches, which consolidate these wavelengths into dense wavelength division multiplexed (DWDM) wavelengths for transmission to the core node. The core nodes include a photonic switch (PSX) and a service-aware terabit router core for routing packets within the metropolitan area via the network or out to a long haul network. The photonic switches and core nodes are capable of switching at the wavelength, group of wavelength, and fiber levels.

26 Claims, 26 Drawing Sheets

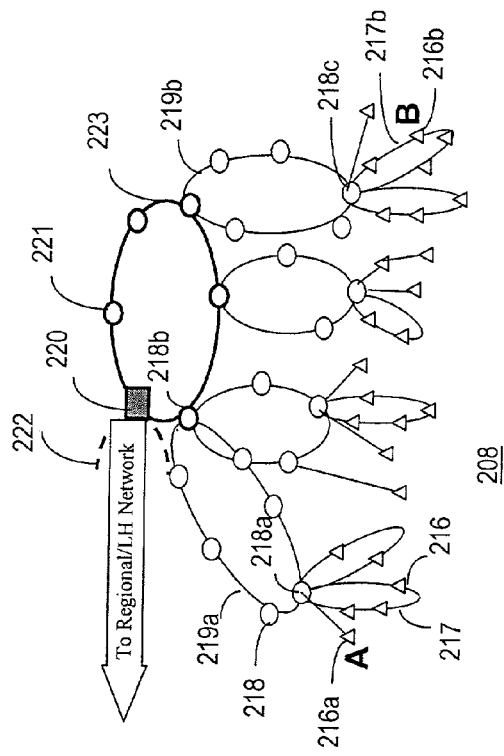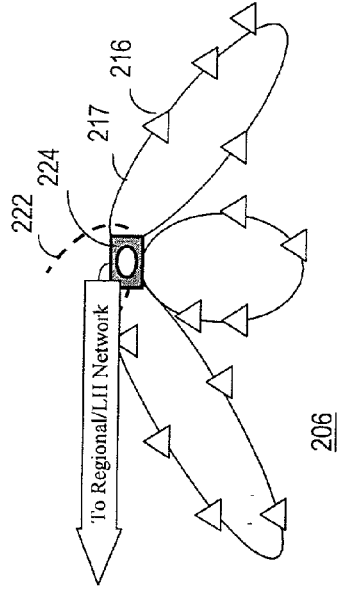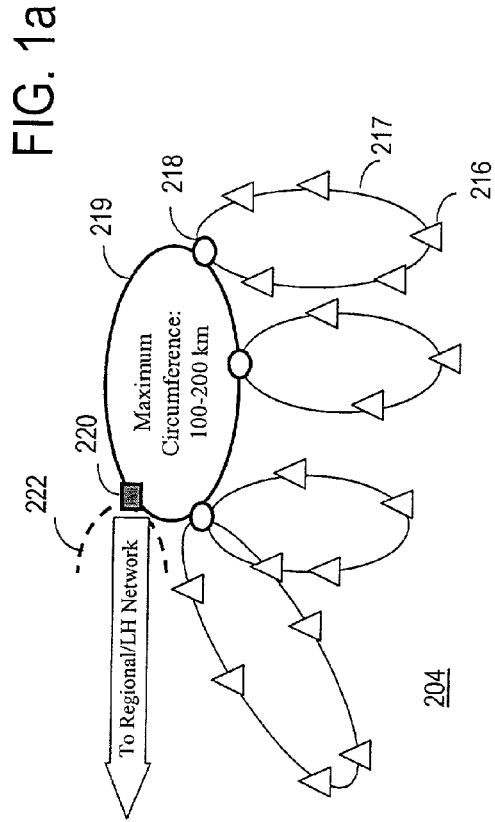
FIG. 1a
FIG. 1b
FIG. 1c

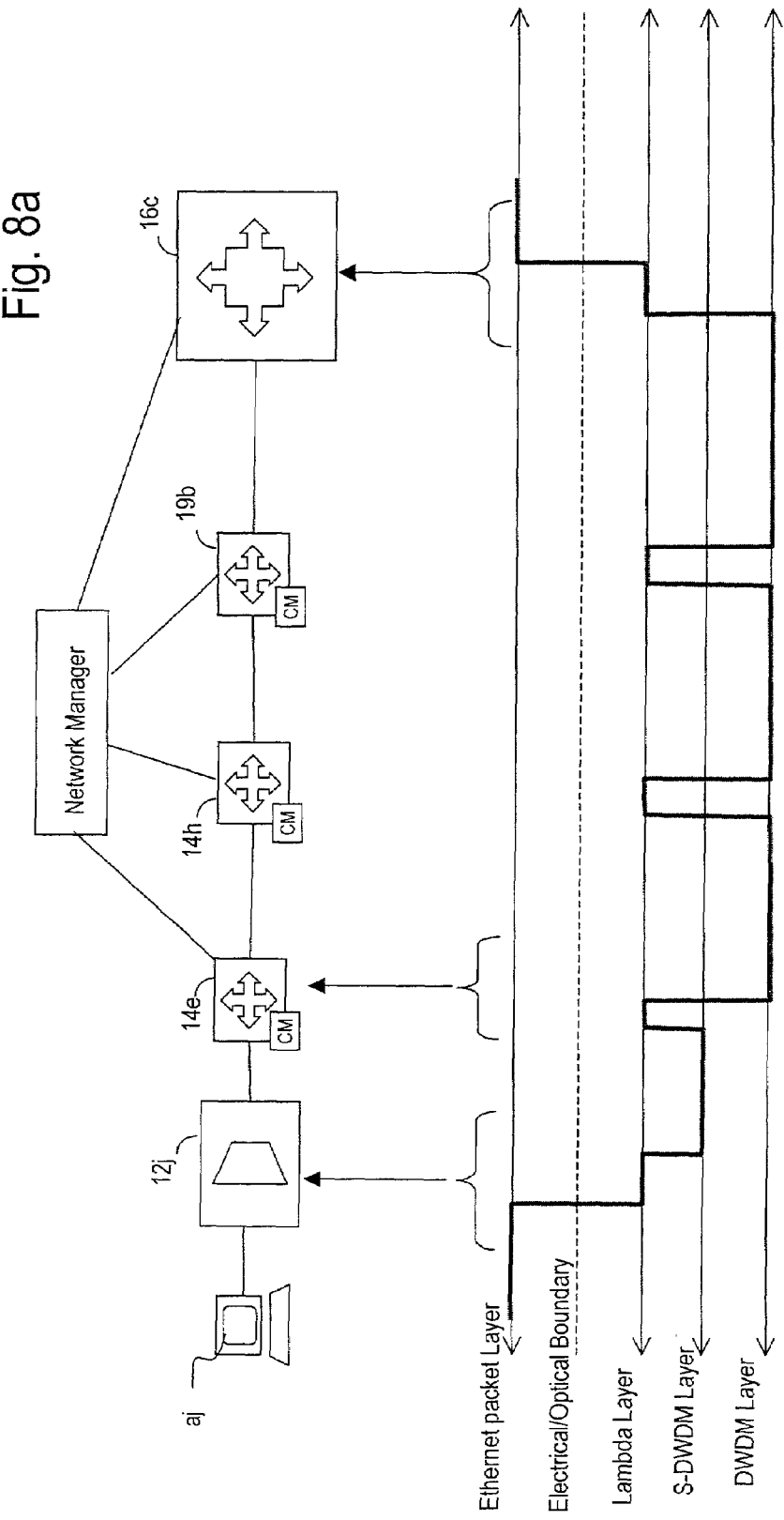

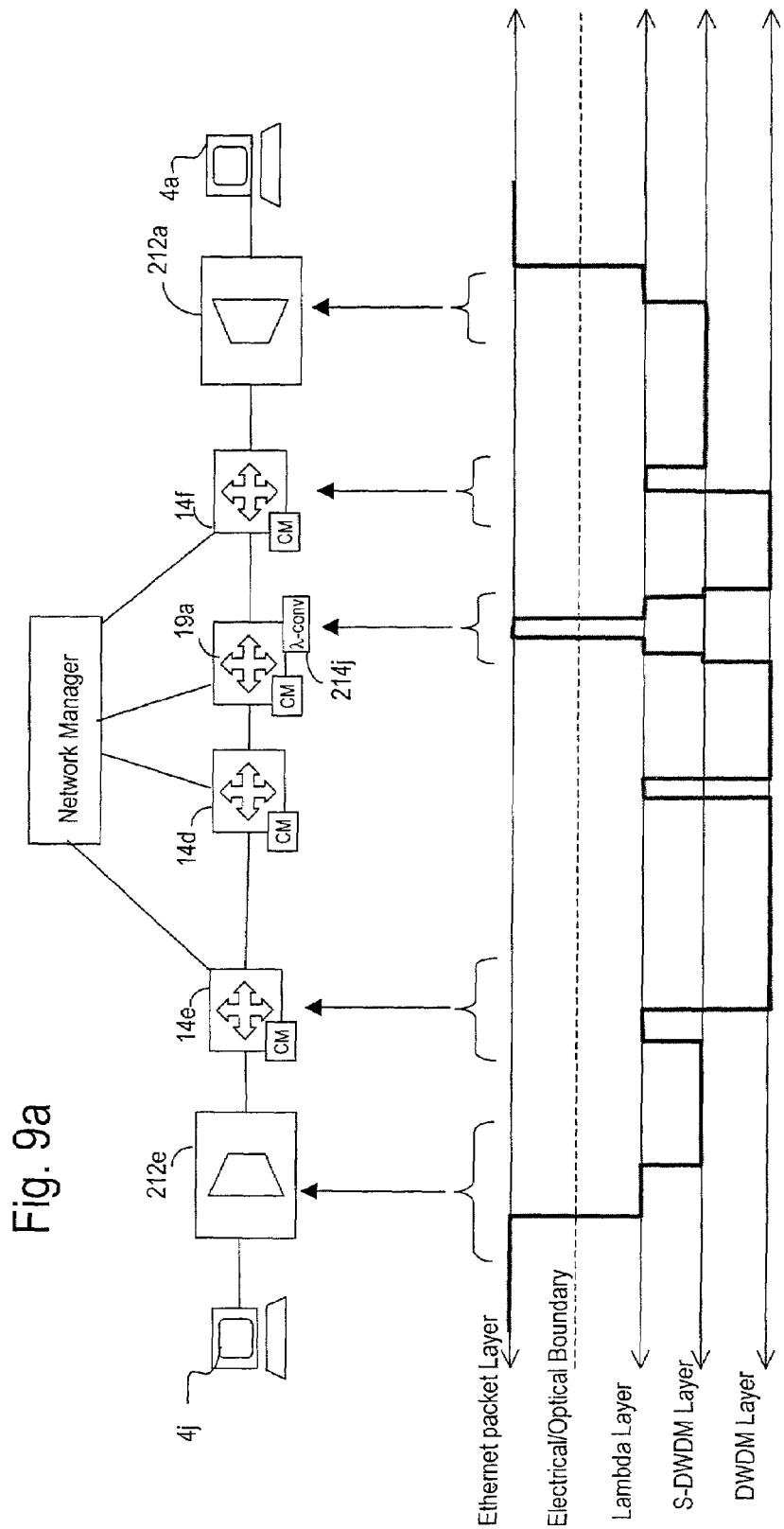

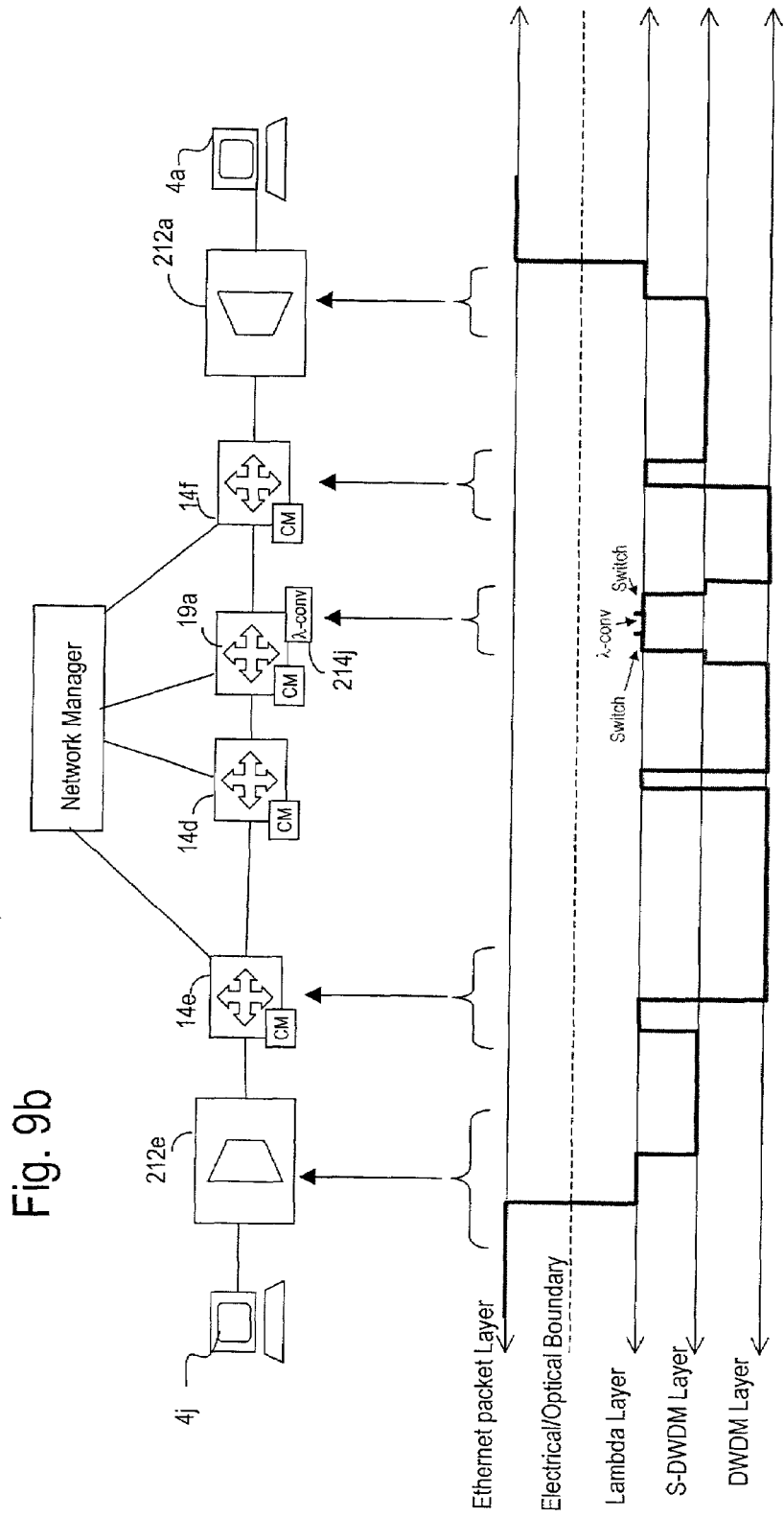

COMMUNICATIONS NETWORK FOR A METROPOLITAN AREA

The present application is related in subject matter to co-pending U.S. application Ser. No. 09/511,065, entitled "Switch For Optical Signals", filed on Feb. 23, 2000, assigned to the Assignee of the present invention and hereby incorporated by reference herein in its entirety. The present application is also related in subject matter to co-pending U.S. application Ser. No. 09/703,631 entitled "Optical Switching System for Switching Optical Signals in Wavelength Groups", filed on Nov. 2, 2000, assigned to the Assignee of the present invention and hereby incorporated by reference herein in its entirety. The present application is also related in subject matter to co-pending U.S. application Ser. No. 09/703,002 entitled "Photonic Network Node", filed on Feb. 15, 2001, assigned to the Assignee of the present invention and hereby incorporated by reference herein in its entirety. The present application is also related in subject matter to co-pending U.S. application Ser. No. 09/453,282 entitled "Architectures for Communications Networks", filed on Dec. 3, 1999 assigned to the Assignee of the present invention and hereby incorporated by reference herein in its entirety.

FIELD OF THE INVENTION

This invention relates to communication networks and more particularly to communications networks for metropolitan areas.

BACKGROUND OF THE INVENTION

Metropolitan area networks are typically multi-layer networks comprising a variety of different technologies and protocols. For example, the local loop, which connects an end-user to the local carrier's end office or central office (CO), may be twisted copper pair, coaxial cable, wireless, and in some cases, fiber cable. The service provided to end-users over these loops typically includes telephony, Internet access, and video. However, the communications industry is rapidly changing and service providers are looking towards new services such as high-speed Internet access, high speed data network access (virtual private networks-VPN), high-definition television (HDTV), and interactive Internet gaming, among other high bandwidth services, to provide new revenue streams.

Much of this traffic is sourced from, or destined to, locations outside of the Metropolitan area requiring access to a long haul network, while other traffic is confined within the metropolitan area. Between the point of presence (POP) to the long haul network and the local loop there are a variety of metropolitan access infrastructures and network configurations. However most access infrastructures typically involve central offices connected via a hierarchy of SONET rings. Asynchronous transfer mode (ATM) permanent virtual circuits (PVC) and IP packet flows are configured through this SONET network. ATM switches, or in some cases IP packet switches or routers connect digital subscriber line access multiplexers (DSLAMs) to the SONET network at the network edge and ATM tandem switches or Internet protocol (IP) routers, or class 5 switches, connect to the SONET network at the network core. It has been calculated that installing the facilities and configuring the appropriate circuits currently comprises typically about 29 steps, which will be described later. Each of the different types of network elements (i.e. SONET network nodes, ATM switches, IP routers) requires a different element management system, and the entire network requires at least one network management system, and often a plurality of network management systems. This means that operation support systems (OSSs) providing end-user care functions such as handling new orders, trouble reports, billing, and maintenance functions, must interface to several different types of equipment and several different element, sub-network or even network management systems. Furthermore, the service provider must provide operations personnel in each network node location with such equipment, the personnel being required to be knowledgeable in the various technologies used in different types of nodes used in that location and adjacent locations in the network. Still further, because of the complex configuration of the metropolitan access network, signals must undergo many protocols and physical conversions as they traverse the network. For example, it has been calculated that a signal traveling from end-user A to end-user B in the same metropolitan area goes through a series of typically up to 34 operations, which will be described later, including typically about 12 series optical transmit or receive operations for a distance which is rarely over 80 kilometers.

With regard to the broadband access portion of the metropolitan networks, the most promising proposal to-date is the full services access network (FSAN), which is in ATM-based broadband passive optical network (PON), under joint development and study by a number of telecommunications companies to provide an FTTX solution, in conjunction with VDSL, ADSL or direct fiber in to the end customer. FTTX is an acronym encompassing many types of solutions where "FTT" stands for: fiber-to-the and where X=H(Home), B (Business), C (Curb, with VDSL), Cab (Cabinet, also known as JWI, SAI, and using long-reach VDSL or ADSL), and U (User . . . any of the above). However, as FSAN is to be an open system interconnect (OSI) layer-2 (i.e. ATM-based) network requiring at least one virtual circuit to each end-user, to ensure that the quality of service (QoS) committed to that end-user is maintained, it will still entail significant complexity to operate.

Prior art metropolitan optical networks are costly, difficult-to-deploy, and error-prone. They are also unreliable, complex and power-hungry. Some of the reasons include:

a. Cost
  i. Cost breaks down into capital cost and cost-of-ownership, which includes all aspects of operations cost (equipping, sparing, provisioning, commissioning, data-fills, normal operation (including Network Management operation) trouble shooting, repair, etc.)
b. Difficult-to-deploy
  i. Multiple, somewhat incompatible systems make up the overall offering. They do not usually have integrated provisioning, maintenance, etc. across the different building blocks, so this has to be provided indirectly by another network management layer
  ii. Much of the interconnecting of the initial network set up has to be done manually, and substantial human interaction is required to set up network connections. This results in long set-up times and complex administration systems
c. Error-prone
  i. Both the initial installation and the setting up of connections in response to customer requirements include complex systems with lots of human interaction, which provides plenty of scope for errors
d. Unreliable
  i. Network fundamental complexity
  ii. Service set up complexity/software complexity
  iii. Multiple series functions any one of which can fail iv. Very hot, dense equipment
v. Non-ideally integrated OAM systems, difficult recovery from some fault conditions
e. Complex
i. Non functionally integrated solutions
ii. Many network layers involved, with lots of fine granularity Activities
iii. Complexity of individual functions (electro-optic switch/cross-connect, transponders which are used liberally)

Referring to FIGS. 1a, 1b, and 1c, three examples types of prior art metropolitan access networks, each corresponding to a different type of carrier, will be discussed. The most well-established and most conservative are the Incumbent Local Exchange Carriers (ILECs). An example ILEC network 208 is shown in FIG. 1a. The ILECs usually have a high level of presence and infrastructure throughout the Metro area under consideration. The very scale and ubiquity of their plant makes them very cautious and conservative and often they will only move to adopt new things once they are forced to by their more aggressive, agile and nimble competition. The ILEC's networks are optimized upon rights of ways and investments of a past era, for instance being copper twisted pair cable-intensive and with Metro CO's placed at locations dictated by the properties of those cables. It is not uncommon for an ILEC to have 20-50 Central Offices in a large Metro area. The ILEC's have, of course, been upgrading their plant with digital switches and fiber ring transmission, typically still using the old rights of way, and tend to use a two or three tier ring approach to interoffice plant. A three-tier ring, typical of the largest ILEC's and the most major metropolitan areas, is shown in FIG. 1a.

Referring to FIG. 1a, the example ILEC network 208 connect customer sites 216, possibly interconnected via a ring topology 217, to secondary CO's or metro points-of-presence (POP) 218. The secondary CO's 218 are interconnected via a secondary ring 219 which connects to a core high capacity metro ring 223. The core metro ring 223, consists of 3-5 major (backbone) CO's 221, and has a long haul gateway 220 connecting it to a regional or long haul network 222. These rings are typically implemented at the physical/transport layer using Sonet/SDH rings with Add-Drop Multiplexers providing STS or even VT granularity, along with ATM switches to provide additional layer-2 functionality at key entry, tandem points for data connections or cell-encapsulated voice trunks. Alternatively, for IP packet data only, packet routers may be used in multiple nodes to provide the necessary functionality above layer 1. In particular, the use of routing at intermediate nodes permits dynamic traffic reconfiguration, but at the expense of complex routers, potential traffic degradation due to QoS issues associated with heavy traffic transients on the routers, leading to packet loss, or delay.

In this way fiber connectivity is established to all CO's but up to three series rings have to be traversed in order to achieve a fiber-connected path from any CO to any other in the metro network. In the secondary CO's 218 (those served off of the secondary rings 219) and for local traffic in the fiber center-equipped CO's, the fiber rings 218 feed a plethora of vehicles feeding the access including DSLAM's and DSLAM look-alikes such as Nortel Networks UE9000, DLC's and super DLC's such as Nortel Networks S/DMS AccessNode, point-to-point fiber systems such as Nortel Networks FMT 150, etc. to provide the range of services, capabilities and customer types that are needed to be provided. Due to the tree and branch topology of the ILEC's access rights of way they often cannot extend rings out from the end CO 218 but must use point-to-point vehicles as an extension off of a ring. Hence broadband traffic from one customer premises to another within the same city has to transit 5 fiber systems and four cross-connection points or systems. The ILEC's multiple buildings means that they have the real estate to house any expansion, but only at the cost of maintaining those large (expensive to upkeep) buildings and the equipment within those buildings. However the ILEC does usually own the rights-of-way for the access plant homing into those buildings, even if the ILEC hasn't modernized it/fibered it yet, so can conceptually provide a future seamless user-to-long haul gateway solution better than the competitors.

The flow of traffic for a transport service from customer A to customer B is as follows:

The signals, in their final electrical form (which usually means voice into DS-1's into Sonet VT's and data packets into ATM cells into an ATM PVC into Sonet STS-1, STS-3c or STS-12c) are then multiplexed (if necessary) up to the final optical carrier bit rate/capacity and then modulated into an optical carrier at A, passed up the (in this case point-to-point) access system 216a to the head-end where it is received, turned into an electrical signal at the Sonet/SDH line rate is demultiplexer (if necessary) down to a bit rate acceptable to the cross-connect, cross-connected/inserted (usually at the STS level, though additional ATM switching and/or IP packet routing may be done at this point, to increase the aggregated traffic fill, on the principle of more and more bandwidth utilization efficiency, since bandwidth is so expensive . . . a self-fulfilling proposition, since the implementation is so complex) into the appropriate bandwidth component in the subtending metro core POP 218a, re-modulated (usually using Sonet/SDH) on to an optical carrier for transmission around the collector ring 219 to the next node where it is received, cross-connected electrically and re-modulated on to a (different) optical carrier, by a process of Optical-electrical conversion, electrical switching and electrical-optical conversion. This process is repeated until it reaches a Metro POP hub site 218b on to the core hub ring 223 where again it is received, cross-connected at the Sonet and possibly cell or packet level and impressed on to another Sonet/SDH optical carrier, this time on the core ring 223 between all of the hub sites. It continues step-by-step around the core hub ring 223 until it reaches the appropriate collector ring 219b to feed the local central office feeding B, whereupon it is cross-connected off of the core hub ring 223 on to the subtending collector ring 219b feeding down to the CO 216b at the end of the access ring system feeding B. It transitions each intermediate node between its entry point on the collector ring 219 and the CO 216b feeding B by going through the same reception, electrical cross-connection and re-modulation process as was done on the prior rings until it finally reaches the CO 216b feeding the access ring system 217b out to B. At that CO 216b it is cross-connected electrically into the bit stream going into the access system that feeds through B and then proceeds around the access ring 217b to B, having gone through another round of reception, cross-connection, re-modulation at each intermediate node.

In the example shown above, from customer (Cust) A to B there are the following steps of Optical Tx, (Tx), Optical Rx (Rx) and electrical switching, interconnect or cross-connection (XC) in the Access (Acc), Collector rings (Coll) and Hub rings (Hub), as follows:

TABLE 1

Steps involved in transferring a packet from customer A to B

| 1. Cust A Tx | 10. Coll ring Tx | 19. XC à Coil ring Tx | 28. Acc Tx |
| 2. AccRx | 11. Coll Ring Rx | 20. Coll Ring Rx | 29. Acc Rx |
| 3. Acc/Coll XC | 12. Coll Ring/Hub ring X-c* | 21. Coll Ring X-c* | 30. Acc XC |
| 4. Coll ring Tx | 13. Hub ring Tx | 22. Coll ring Tx | 31. Acc Tx |
| 5. Coll Ring Rx | 14. Hub Ring Rx | 23. Coll Ring Rx | 32. Acc Rx |
| 6. Coll Ring X-c* | 15. Hub Ring X-c* | 24. Coll Ring X-c* | 33. Acc/Cust X-c* |
| 7. Coll ring Tx | 16. Hub ring Tx | 25. Coll ring Tx | 34. Tx to cust B |
| 8. Coll Ring Rx | 17. Hub Ring Rx | 26. Coll Ring Rx | 35. Cust B Rx |
| 9. Coll Ring X-c* | 18. Hub Ring/Coll Ring | 27. Coll Ring/Acc ring X-c* | |

* = Cross-connection is at the Sonet STS level but may also include further traffic cross-connection, switching or routing functions, via an ATM switch or IP router. In particular further packet traffic bandwidth aggregation may occur via tandem routers, resulting in higher data "fills" in the transport pipes. There is a total of 35 concatenated operations including 12 series Optical Tx operations. Yet the distance between customer A and Customer B in the same metro space is rarely more than 80 km, which can be achieved in 1 or 2 optical span reaches. This multiple level of concatenation tends to make for costly, difficult-to-deploy, unreliable, complex, power-hungry and error-prone networks.

FIG. 1b shows an example Mature Competitive Local Exchange Carrier (CLEC) network 204. Mature CLECs were once aggressive new entrants but have become more conservative with time. They are likely to have a major but not ubiquitous presence in a given metro area and have limited fiber, fiber rights-of-way, so may have difficulty reaching whole sub-sections of a given metro area. However they are usually quicker than the ILEC's to apply new technologies and capabilities, but also expect quicker pay-back.

The example CLEC network 204 operates on the same generic principles as those of the ILEC example previously described, and consists of a set of central Metro core Points of Presence 218 connected to a Long Haul or Regional gateway 220 (or Gateways to multiple LH/Regional carriers networks 222). These Points of Presence 218 connect to the outlying Central Offices 216 via fiber (often WDM) rings 217. The outlying CO's 216 then connect into the access by rings, busses and point-to-point systems. For business customers, where two or more routes exist into the business site a ring can be implemented but often, especially for the smaller business and residence, a ring cannot be implemented and point-to-point or add-drop buss structures have to be used.

FIG. 1c shows an example new entrant network 206. The new entrant network 206 (which again operates on the same principles as already described but may be more likely to use the Sonet-IP variant in lieu of the Sonet-ATM variant) has several access rings 217 connected to a metro core POP 224, which provides access to a long haul or regional network 222. The access rings 217 tend to serve large business customers 216 directly. The new entrants tend to use networks that are not as layered as the mature CLEC, and consequently have less complexity to deal with. They new entrants tend to have an abundance of ring-based access because they are servicing large/medium business customers where methods of deploying rings can be found. The new entrants often are formed around bringing a particular new value proposition to market and are often willing to look at novel approaches as long as they perceive that this will give them an unfair advantage, is relevant to their business, can give a fast pay-back and can be handled within the budget and time-scales of such a new entrant.

FIG. 1d shows the network of FIG. 1a with the addition of network managements. Specifically, the following have been added, an access network manager, an IP manager, an ATM manager, a transport network manager, a network manager connected to the other managers with customer service interfaces coupled thereto.

Referring to FIG. 2a, the steps involved for configuring an example prior art metro access network 210 will now be described. The first six steps are to install the network elements (NE) which include, starting from the customer end: a DSLAM 300, an ATM multiplexer 304, at least one level of SONET ring 310 of four add-drop multiplexers (ADMs) 308, which might be repeated several times across any given cross section of a metro network, especially for ILEC's, and a core tandeming and long haul gateway network node, 399, which will act as the service-level demarcation point from metro into long haul and which has therefore to deal with the individual services and circuits at the per-service or per-circuit level. The core tandeming node consists of a SONET digital cross-connect switch (DCS) 314, (which also might also be repeated in other tandeming nodes, between the various layers of rings even if those nodes do not have a long-haul gateway function), an ATM switch 318 (at any point where access is required to the data payload of the Sonet for purposes of service-level manipulation or sub-STS granularity routing), and a core router 322, which provides the packet service routing and aggregation both back into the metro network and into the various long-haul networks, via Sonet interfaces, the Sonet DCS and subtending long-haul trunk Sonet equipment which is not shown but would subtend off of the Sonet DCS. FIG. 2a shows just a simple centralized router here but in practice this would normally be distributed into multiple nodes somewhat similar to the upcoming FIG. 2b, with those routers at the non-gateway nodes just having a role of further data stat. muxing and aggregation to create further network bandwidth utilization efficiencies. Whilst it is apparent that a practical ILEC network can be much more complex than what is described here, by employing several stages of rings, and potentially deploying ATM switches and/or routers in other network nodes, this further increases the complexity and cost of implementing this style of network, so only the relatively simple (but still complex) tasks of setting up the network path of FIG. 2a will be described. The next five steps are to install NE management systems (not shown) for the router 322, the ATM switch 318 and ATM mux 304, the SONET ring 310, the DCS 314, and the DSLAM 300. The next six steps are to install: a DS3 link 302 from the DSLAM 300 to the ATM mux 304, an OC3 fiber 306 from the ATM mux 304 to the SONET ADM 308, a fiber for the SONET ring 310, an OC12 fiber 312 from the SONET ring 310 to the SONET DCS 314, an OC12 fiber 316 from the SONET DCS 413 to the ATM switch 318, and an OC12 fiber 320 from the ATM switch 318 to the core router 322. Next a Sonet transport connection, assumed here to be an STS3c must be configured across the SONET ring 310. Then another STS3c must be configured through the SONET DCS 314. The next six steps are to configure the layer-2 interfaces as follows: DS3 user-to-network interface (UNI) on DSLAM 300, DS3 UNI on ATM Mux 304, OC3 UNI on ATM mux 304, OC3 UNI on ATM switch 318, OC12 UNI on ATM switch 318, OC12 UNI on core router 322. Finally, the last three steps, required to provision a subscriber's ISP connection, are as follows: provision a virtual circuit identifier (VCI) on the DSLAM 300, provision a VCI through the ATM mux 304, and provision a VCI through the ATM switch 318. These last three steps need to be repeated for each subscriber added to the network 210. Whilst this is shown for the case of a single layer of rings, in practice there may be multiple layers, as is shown in FIGS. 1a, 1b, all interconnected with ADM's or DCS's, and both ATM switches and routers may be deployed in intermediate nodes to improve the bandwidth efficiency and traffic handling of the data portion of the network. In addition there are many variations upon the basic theme of the network designs above, as has been indicated. This also extends into using a mesh of STS switches interconnected with point-to-point Sonet links with or without DWDM, to create a mesh instead of ring-based fiber transport layer.

FIG. 2b. shows the same subset path slice through an alternative prior art metropolitan network, but one that is based on IP-packet routers and Sonet STS-level transport traffic provisioning. The Sonet links may be in the form of physical rings, with logical rings used for non-routed traffic and tandem routing of data traffic using the rings as point-to-point Sonet pipes. This results in a very high efficiency flexible network, but at the cost of poor overload/peak traffic behaviour, due to massive QoS fall-off at high loads, due to the packet discards at intermediate nodes, which triggers the TCP layer to re-try transmission, resulting in much of the network traffic being lost and resent, just at the time of peak load when the network cannot tolerate inefficient operation. This is seen by end users as a massive reduction in network performance at peak times. In addition such a network is relatively costly per unit of delivered bandwidth, forcing the extreme use of technique to maximize the bandwidth utilization efficiency in an attempt to achieve a cost-effective way forward. The operation of the network path can be explained in simple steps analogous to those of the supporting text to FIG. 2a, but that description has been omitted here for brevity.

FIG. 2c graphically illustrates the communications layers corresponding to a path through each portion of the network of FIG. 2a-1.

Similarly FIG. 2d graphically illustrates the communications layer corresponding to a path through each portion of the network of FIG. 2b-1.

In both FIGS. 2c and 2d, the DWDM layer is only used for the SONET ring link.

FIG. 2e illustrates the network of FIGS. 2a-1 and 2c with the management layer added.

FIG. 2f illustrates the network of FIGS. 2b-1 and 2d with the management layer added.

FIGS. 2c-2f graphically illustrate the multitude of protocal changes required to traverse the network from access to core.

Typically in prior art MANs, the data switching granularity of the networks tends to increase as data traffic flows towards the core of the network. This prior art approach to data switching leads to a large number of Ethernet/IP data service-aware and service manipulating switches at the edge of the network, perhaps in the local central offices, with a fiber ring structure connecting the service-aware switches together. Such an approach is incompatible with direct photonic connections with minimal hops.

Legacy services, such as telephony, in the metropolitan area network will need to be supported by any new network configurations adopted by a service provider, just as new high bandwidth services, including some not yet envisioned, will also need to be supported. What is desired is a network that is cost-effective to install and operate, and yet is sufficiently flexible and scalable to enable service providers to keep pace with the growth in demand for new services and profitably provide these services to their metropolitan area customers.

SUMMARY OF THE INVENTION

It is an object of the present invention to provide an improved communications network for a metropolitan area.

The invention is directed to a network providing data packet and optical services over a photonic network. The network operates on the principle of utilizing photonic switching where possible and electronic packet switching or multiplexing where photonic switching is not possible, thereby making use of the low-cost nature of photonic switches. Photonic switching is performed by a full or partial mesh network of photonic switches that connect access multiplexers, which multiplex packets from users of the network onto fibers or WDM wavelengths, with one or more centralized packet routers having WDM interfaces. The photonic switches also provide direct optical services to end users.

According to an aspect of the present invention there is provided a communications network for a metropolitan area comprising a plurality of access multiplexers, each access multiplexer being operable to provide multiplexing of data packets from a plurality of end-users onto at least one sparse wavelength division multiplexed (SWDM) wavelength or fiber; a photonic switch coupled to the access multiplexers via fiber optic cables for carrying the SWDM wavelengths and being operable to consolidate the SWDM wavelengths into dense wavelength division multiplexed (DWDM) wavelengths for transmission and a core node coupled to the photonic switch via a fiber optic cable for carrying the DWDM wavelengths and being operable to route the data packets within the communications network or out to a long haul network. The term sparse-WDM, is used here because even though the optical carriers are relatively far apart they have to be generated at optical frequencies precise enough to enter the DWDM network.

Embodiments of this aspect of the invention reduce the number of transitions between protocol layers and technologies and therefore allow more direct connections between endpoints in the same the metropolitan network, or even long distance network, thereby reducing the cost of installing and operating these networks. Furthermore, since the path from the access multiplexer through the network to the core node is photonic, that path is independent of the packet-level protocol. This lack of dependency makes the network more tolerant to any future protocol or bit-rate changes or developments in technology at the packet layer.

Conveniently, the data packets are Ethernet packets. This allows conventional tunnels (e.g. MPLS or Layer-2 tunnels), to be used to distinguish end-users. This capability makes auto discovery and provisioning of end-users possible, thereby reducing network operating costs by simplifying OSS functions.

Conveniently, at least a portion of the data packets are transmitted to and from a residential or small business end-user to an access multiplexer over a local loop, connecting the end-user to the access multiplexer, using a digital subscriber line (DSL) protocol, although other protocols are possible, and would be chosen dependent upon their compatibility with the type of plant deployed (fiber, radio, copper . . .) and their compatibility with this new network. Since the improved networks are capable of using existing local loop access media, there is no need to retrench neighbourhood subdivisions to install the required access media, which reduces the cost of installing the network. Furthermore, the DSL protocol provides for the transmission of lifeline telephony, as well as derived telephony, and therefore easily supports this important legacy service.

Conveniently, the DSL protocol is a known prior art or an improved very-high-data-rate DSL (VDSL) protocol. The prior art forms of these protocols allow data rates of up to 50 Mbps on local loops up to 1000 feet in length or up to 25 Mbps on local loops up to 3000 feet in length, thereby providing enough bandwidth to handle services such as HDTV, high-speed Internet access, and other high-speed services. Other access media such as direct fiber connections may be used to access medium and/or large businesses (or even, in the fullness of time, residences and small businesses) based upon Gigabit Ethernet, 10 Gigabit Ethernet connections over fiber with wavelengths or parts of wavelengths allocated to each user.

Conveniently, the core node is both capable of switching at the wavelength, group of wavelength, and fiber level, thereby facilitating the offering of bandwidth-on-demand or agile optical carrier provisioning, in response to demands from the packet-aware equipment, by providing an autonomous bandwidth-provisioning scheme, such as contract managers at each photonic switching node and is capable of switching at the Ethernet packet level the contents of those optical carriers that require such Ethernet packet switching and are hence terminated on the Ethernet packet switch within the core node. Use of the optical carriers (both destined for the packet switch at the core node and destined to bypass the packet switch at the ore node) is negotiated, in real time, the end-to-end optical paths to be used when they are requested to do so via either their embedded optical UNI's or from a centralized optical UNI (as described by the U.S. application Ser. No. 09/453,282 referred to in the cross-references section above), thereby facilitating providing automatically switched transmission network (ASTN) functionality, wavelength-based virtual private network (VPN) services, and dial-up wavelength services among other wavelength based functions.

Other aspects of the invention include combinations and sub combinations of the features described above other than the combinations described above.

Embodiments of the inventions may include one or more of the following advantages:

1. Eliminating multiple "disconnected" network layers, each with their own management system by replacing this with a two layer network (IP-addressed packets in Ethernet as one layer, transport via agile optical carriers as the other layer)
2. Eliminating much of the physical equipment needed, especially expensive per-wavelength level functions such as tandem node transponders and simplifying the residual equipment, for instance replacing the tandem ATM switches (if used) and tandem STS cross-connects with photonic optical carrier switches. This does of course significantly modify the network operation, particularly the ability to provide high bandwidth utilization efficiency
3. The use of the low cost of the photonic layer to permit an over-provisioning of bandwidth (number of optical carriers). This, combined with the use of self configuring agile lambda control (as described by the U.S. application Ser. No. 09/453,282 referred to in the cross-references section above) allows more than adequate capacity (i.e. excess capacity) between any edge access mux point and the core node's packet switch making it look like the edge access multiplexer is directly connected on to the core packet switch. With this level of bandwidth availability there is no need for the complexities of fine bandwidth management, the ATM layer, etc. so all of this complexity can be swept away, made redundant by the availability of cheap abundant bandwidth.
4. The use of a self-provisioning agile layer, combined with auto-discovery of available paths eliminates the human intervention in the establishment of paths, permitting paths to be set up in a range of 10 s-100 s of milliseconds, instead of hours, days or weeks, and also eliminates the cost, errors of that human intervention.
5. The reduction in complexity leads to a reduction in failure rate of the hardware, the reduction in power-bum leads to a reduction in real-estate requirements, especially with respect to building air conditioning and heat management. Power reduction and reduced equipment heat rise also will improve hardware reliability. The massively simplified network design/architecture will substantially simplify the requirements on the network software, which should result in more stable, more bug-free software, which should improve network reliability.
6. Power-efficiency
    i. Embodiments only use E/O and O/E conversions at the very edge of the network and at the core router, with most network nodes being transmitted without recourse to EO conversion.

This saves anything from 10 to 50+ watts per optical carrier (or 400 to 2000+watts per fiber at 40 wavelengths per fiber) for each fiber transmitting a node.

ii. Embodiments replace electrical switching with optical switching. Optical switching, especially optical switching using electro-statically controlled MEMS, uses much less power per Tb/s switched than does electrical switching. For instance comparing a prototype wavelength plane photonic switch constructed in Nortel Networks in 2000, with a state-of-the art large Sonet-based electrical fabric product, also of 2000 vintage, the electrical approach requires ~5 kW per Tb/s switched whereas the optical approach needs ~60 watts per Tb/s switched, based on 10 Gb/s per optical carrier, and 600 watts per Tb/s switched based on 1 Gb/s optical carriers.

Embodiments of the present invention may include one or more of the following aspects, features, architecture and implementation:

a) A network design to exploit the interaction of photonics, Ethernet technology to provide a metro communications network, optimised for future data requirements, but capable of supporting legacy services, which is cheaper, hyper-abundant-bandwidth (exploits hyper-abundance to good effect), permits wide range of service types, massively simplifies, eliminates many stages of equipment, subscriber, service provisioning b) A network that hides the complexity of IP by use of Ethernet multiplexing, in a bandwidth inefficient manner, since inefficient bandwidth is more than offset by the low cost photonic switching layer and the use of agile lambda protocols, exploiting the spare bandwidth implied by an inefficient use of bandwidth c) A photonic transwitching layer that can connect the outlying Ethernet access multiplexers to a large centrally located router node, with the use of agile lambda control (e.g. Contract Managers) to establish lambda paths on a dynamic basis to provide capacity when, where needed, based on user or layer 3 (router) demand for "instantaneous" capacity d) The re-use of the photonic layer and associated CMs to provide photonic VPN functionality e) The use of a centralized router architecture to exploit the capacity of Tb/s-level telco-grade routers and reduce the number of routed hops dramatically, which, in conjunction with the over-provisioning of bandwidth between the AN's and the packet router, radically improves the available QoS, permitting the use of Ethernet0interfaced IP packet routing for all services including emulated circuit services.

BRIEF DESCRIPTION OF THE DRAWINGS

The invention will be further understood from the following detailed description of embodiments of the invention with reference to the accompanying drawings, in which:

FIGS. 1a, 1b, and 1c are topological views of prior art metro access networks;

FIG. 8a shows the transitions across the network of FIG. 5 in terms of the network layers utilized at each point;

FIGS. 9a and 9b illustrate the communications layers corresponding to a path through the network of FIG. 9.

DETAILED DESCRIPTION OF THE PREFERRED EMBODIMENT

Figure 3:
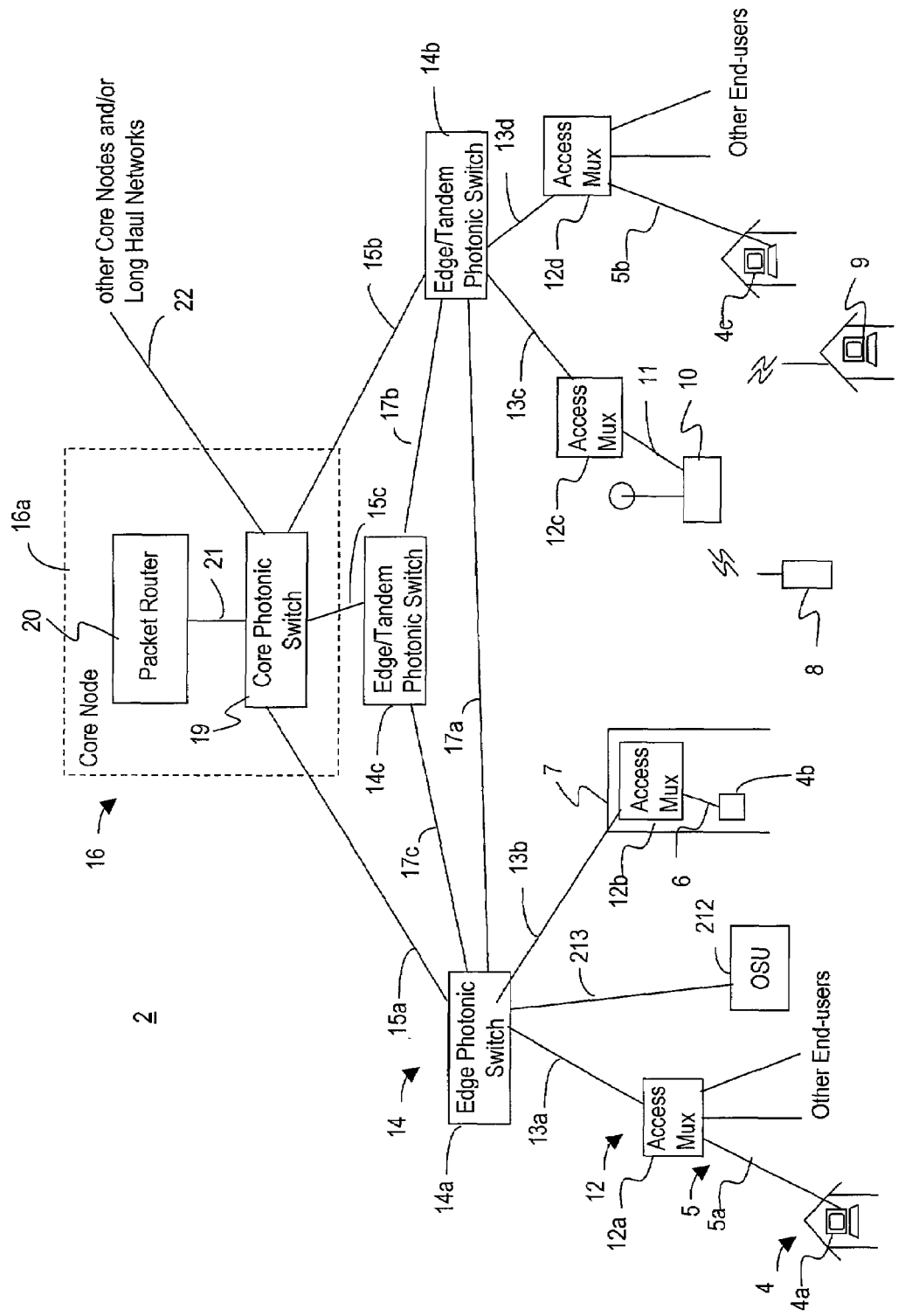
FIG. 3 is a diagram of a communications network in accordance with a first embodiment of the invention.

Referring to FIG. 3, a communications network for a metropolitan area is comprised of three types of network nodes: an access multiplexer 12, an edge photonic switch 14, or edge/tandem photonic switch (since some of the optical carriers transitting a photonic switch may have come not from the local access but rather further out edge photonic switches), this switch also being also referred to herein as simply a photonic switch, and the core node or nodes 16. The access multiplexers 12 provide multiplexing of Ethernet packets from end-users 4 over their local loops 5, which carry 100 bT or 1 GE Ethernet fiber based multiplexed service connections or multi-service "VDSL-like" connections, and can act as the Ethernet mapping points for legacy services or connections, where these are capable of being carried in a high quality packet format, and maps all of these onto one or more Sparse-DWDM (S-DWDM) wavelengths, or a fiber. Sparse-DWDM is so-called because, although the carrier wavelengths are relatively coarsely spaced in the access plant, they are generated with an optical precision, especially with regards to optical carrier frequency, so they can map straight across into the tight optical frequency constraints of the DWDM network. These S-DWDM wavelengths, having a carrier frequency spacing of an exact multiple of the DWDM wavelength plan used in the core network, typically being spread 4× further apart, for 4×100 GHz=400 GHz, are carried over fiber cable to the photonic switches 14. The purpose of S-DWDM is to provide a way to taper the capacity of the fiber network between the core network and the access network, in a manner compatible with the use of photonic switching and limited or no wavelength conversion and no requirement for other E-O functions. The photonic switches 14 consolidate these wavelengths into DWDM wavelength spacing having a carrier frequency spacing of approximately 100 GHz for transmission to core nodes 16 or other photonic switches 14. Hence, one of the roles of the photonic edge switch is to act as an access wavelength consolidator or concentrator in the upstream direction, and as an expander in the downstream direction. The core node 16 includes a photonic switch (PSX) 19 and a service-aware terabit router core 20 for routing packets within the metropolitan area network or out to a long haul network via the PSX 19. Such a photonic switch is described in co-pending U.S. application Ser. No. 09/511,065, and such a service-aware router is described in co-pending U.S. application Ser. No. 09/057,525. The core node 16 is capable of switching at the wavelength, group of wavelength, and fiber level, thereby facilitating the offering of autonomous agile optical carrier functionality, wavelength-based VPN services, and dial-up wavelength services among other wavelength based functions. But it is believed that, in a constrained metro environment, where significant excess bandwidth provisioning is permissible and enabled economically by the low-cost nature of the photonic technology, and with the centralized router architecture, adequate connectivity can be achieved without recourse to wavelength conversion.

The network of FIG. 3 embodies a new approach that trades reduced bandwidth efficiency for increased functional simplification at the network level, relying upon the low cost nature of photonic switching to provide enough bandwidth to overcome the reduced transport efficiency in a cost-effective manner. FIG. 3 shows a network where the number of operations performed on a packet stream transiting that network is markedly reduced, especially at the per-packet level, with much of the functionality being at the per-optical carrier level of granularity, rather than individual packet manipulation or other sub-optical carrier (sub-lambda) level. In the case of packet data services or those services that can be carried upon a very high QoS packet stream, the network uses edge/access packet-aware multiplexers to generate sufficient payloads for one or more individual optical carrier (wavelength) from each multiplexer to be dedicated back to the centralized high quality packet router, instead of associating each tandem point along the way with its own bandwidth-efficient, but complex, expensive and QoS-robbing (due to packet collisions/discards, etc.) packet-processing tandem router or power-hungry and expensive Sonet cross-connect, with its associated transponders. These functions are replaced by an optical switch, which leads to a much lower bandwidth utilization efficiency, dependent upon the capacity scaling of the bandwidth demand in the network, with higher bandwidth demand networks tending to be more efficient. The reduced bandwidth efficiency is offset by a much higher throughput bandwidth capability for a given cost and given complexity, combined with an automated self-configuring agile wavelength-level bandwidth allocation sub-system, which, independently or in combination more than offset this. Furthermore the resultant reduction in the number of packet-level manipulations, combined with a much higher available bandwidth, configured as direct (but dynamically reconfigurable) paths from access multiplexer to core router, results in a much more repeatable, and much higher Quality of Service (QoS) capability, thereby enabling the use of the packet flows in emulated circuit applications as well. The network effectively consists of a single centralized large router, such as the 4.8 Tb/s Optera Packet Core under development by, and announced by Nortel Networks Ltd., an array of non-blocking access multiplexers and a low cost, high bandwidth photonic "connectivity cloud" built from photonic (all optical) circuit switches operating primarily as per-optical-carrier granularity DWDM-interfaced real-time switch nodes operating under agile network control (e.g. as described in U.S. application Ser. No. 09/453,282 referred to in the cross references section). This agility permits the central packet router or the multiplexers to rapidly request and be assigned additional connectivity as and when circumstances dictate.

In FIG. 3, a small business, possibly medium business or even a residential neighbourhood end-user 4a, which could be a small home office business (SOHO), is connected to a first access multiplexer 12a by a copper twisted pair (CTP) local loop 5a providing "VDSL-like" service capability, for example, albeit by Ethernet packets, not ATM cells. There could also be ADSL-like connectivity (dependent upon distance) from a transmission viewpoint, but without the ATM requirements that come with today's ADSL, VDSL—basically replacing that with Ethernet-based packet structures similar to 10 bT, 100 bT but transmitted over QAM modems. Medium or large businesses may have fiber-based access to the Access Multiplexer via 100 bT, 1 GE or possibly even 10 GE-based fiber links, or by means of legacy fiber systems carrying IP or Ethernet packet services in Sonet (Packet over Sonet). A first access multiplexer 12a is connected to a first edge photonic switch 14a by a single mode fiber optic cable 13a having at least one pair of working fibers. Each fiber of the pair is for unidirectional transmission of at least one optical carrier, mapped to one of the core DWDM wavelengths, either carried as a single wavelength on a dedicated fiber or as part of a S-DWDM wavelength plan; one fiber is for carrying data from the access multiplexer 12a and the other fiber is for carrying data to the access multiplexer 12a. Optionally, in the case of bi-directional optical signal transmission, only one fiber need be used for carrying data between the edge photonic switch node 14a and the access multiplexer 12a. An optical service unit (OSU) 212 is also connected to the edge photonic switch 14a by a fiber 213 for carrying one or more DWDM optical carriers carried in the access as S-DWDM or as single wavelengths on a dedicated fiber to provide wavelength services to an end user serviced by the OSU 212.

A second access multiplexer 12b, connected to the first edge photonic switch 14a by a fiber optic cable 13b, provides services, for example 1GE, 100 bT with all services embedded in it, over a fiber optic cable 6 to an end-user 4b in a multi-tenant unit (MTU) 7, which could house residences or offices.

A third access multiplexer 12c, connected to a second edge photonic switch 14b by a fiber optic cable 13c, provides any of the above-mentioned services to wireless end-users, which may include both mobile end-users 8 and fixed wireless access end-users 9, via a cellular base station 10 coupled to the third access multiplexer 12c via a fiber optic cable 11.

A fourth access multiplexer 12d, connected to the second edge photonic switch 14b by a fiber optic cable 13d, similarly provides any of the above-mentioned services to another residential end-user 4c via CTP local loop 5b.

An optical services unit (OSU) 112 coupled to the edge photonic switch 14a via a fiber optic cable 113 provides a direct fiber/optical carrier access for end-to-end optical offerings.

In practice, since any particular access multiplexer may support multiple access line cards, all four of the above access topologies might be supported off of one access multiplexer 12. Furthermore, in the case of large business applications or business campus applications the Access Multiplexers can be located on the business premises/campus in a CLE application, dedicated to that business.

The access multiplexers 12 transmit Ethernet data packets typically modulated on S-DWDM wavelengths to their respective photonic switches 14 over the corresponding fiber-optic cables 13. The S-DWDM carrier wavelengths are pre-assigned to each access multiplexer 12. Once an access multiplexer is installed it automatically communicates with the local bandwidth brokering device 9, for example a Contract Manager (CM) as described in co-pending U.S. application Ser. No. 09/453,282, via the optical UNI on an unused (or shared control/signalling) wavelength and causes the CM community to set up a light-path from the access multiplexer to the core packet router(s). The CM is not shown on FIG. 3, to keep that figure clear for other purposes, but is shown on FIG. 4. The access multiplexer (or router) can then or subsequently request additional paths or capacity on established paths at a granularity of one entire optical carrier (wavelength) at whatever electrical modulation rate the end equipment is using (since the photonic switched network is agnostic to the modulation rate and protocol on any given wavelength as long as it doesn't exceed a pre-set maximum, probably 10 Gb/s per lambda, though there must be a spare path to the right bit-rate/format port card on the core router, which is connected to via the photonic switch in the core node) as/when required if the traffic flow potential offered by the existing allocated bandwidth through the photonic layer is no longer sufficient, or can relinquish such paths if they are no longer needed, by communication with the CMs via the optical UNI. However, it is possible to selectively add more DWDM carriers assigned to an access multiplexer 12 via S-DWDM links or dedicated single carrier fibers as well as change the wavelength of assigned carriers, for instance where tunable lasers are provided or carriers are distributed to the access multiplexers from the network, in which case the Access Multiplexers can become optical carrier wavelength agnostic.

The first and second photonic switches 14a and 14b are connected to the core node 16 by respective fiber optic cables 15a and 15b. A third edge photonic switch 14c is connected to the core node 16 by another fiber optic cable 15c. The third edge photonic switch 14c services other access multiplexers 12, not shown for simplicity. The third edge photonic switch 14c is connected to the first and second photonic switches 14a and 14b by respective fiber optic cables 17c and 17b. The first and second photonic switches 14a and 14b are connected together via a fiber optic cable 17a. In this manner of connection, the photonic switches 14 form a mesh network configuration. The cables 15 and 17 are for carrying DWDM signals between the photonic switches 14 and between the core node 16 and the edge photonic switch 14, respectively. Hence the edge photonic switch node may also operate as a tandem photonic switch node for tandeming traffic from remote photonic switches, transitting the tandem location, en route to the core packet router. In practical networks substantially more than three photonic switching nodes would be used, building up a failure-resilient multiple path mesh network, with excellent survivability, enhanced by the speedy autonomous recovery from failures made possible by combining the autonomous agile lambda capability with pre-computed protection paths, along the lines of the P-Cycle work published by Dr. Wayne Grover of TRLabs referenced herein below with regards to FIG. 9. In a typical Metropolitan Network maybe 10-50 photonic switch sites would be deployed in an ILEC application, depending upon the size of the metro area and the bandwidth demanded. The distance across a metro area is typically limited to an upper bound on the optical path of the order of 150-200 km, with most links being much less, and the access portion should be bounded to ~5-10 km to keep the technology cheap and to limit the degradation in the outgoing link for distributed unmodulated carriers, should the optical carrier sources be centralized to the edge switches.

The core node 16 includes the PSX 19 for switching the DWDM signals between the photonic switches 14, the packet router 20, and to one or more long haul networks as required. The traffic to/from the long-haul network may be over long-haul optical carriers containing packet traffic from the Packet Switch, or may be optical carriers from the Customer Premises Equipment, directly into the long-haul network, in which case they can be of any format, bit-rate or protocol supported by the long-haul network and the metro network, or which can be converted to a structure supported in the metro network by the core router. As an example an ultra-long haul transmission system might have data formatting identical to the metro system, but with greater Forward Error Correcting Code overhead and power, and different (ultra long haul) optical parameters, in which case the signals would have to be returned to electrical baseband at the core node. Alternatively the long haul network may use IP-over-Sonet, in which case the core router would have to re-map the payload into Ethernet over Optical carrier (lambda) for propagation across the metro network. This might be done by adding, to a high-speed Ethernet signal (1 GE, 10 GE), a bit-rate independent and protocol independent digital wrapper, which is also detectable/receivable using low speed receivers in intermediate photonic switch nodes. Such a wrapper structure was disclosed in Application number (add reference). In the event that the long-haul optical carrier originates/terminates in the CPE, then this CPE would have to meet the necessary compatibility requirements with that long-haul network, including the required optical precision, optical power levels, FEC levels, etc. and the handling of optical impairment accumulated on the long distance fiber transmission. However, such signals can readily be propagated across the photonic layer of the new network, thereby enabling this option of direct access to the long haul optical network.

The PSX 19 is capable of performing switching at the wavelength, wavelength group, and fiber level. The interface between the packet router 20 and the PSX 19 is preferably a low cost, short reach optical interface such as a 1310 nm short reach module or even a parallel optical interface (POI) 21 such as that offered by Infineon under the brand-name "Paroli". The packet router 20 is a service-aware router that, using tunnels (e.g. MPLS or layer-2) switches the Ethernet packets according to the individual user and service with which they are associated. This capability allows of the packet router 20 to provide different levels of QoS and to respond appropriately under conditions of traffic congestion. Note that it is only this router which is intended to be a potential source of QoS constraint, with enough bandwidth being supplied by the photonic layer in a dynamic express routing configuration, to ensure that the Access multiplexer achieves level of performance equivalent to being locally located next to the core router (i.e. the remoteness of the Access Multiplexer carries no performance penalties—the "death of distance"). This also means that only very conservative levels of statistical multiplexing are allowed in the Access multiplexer, to ensure that the QoS constraints are all centralized into one (or a few) location, since upgrades to the multiple Access multiplexers, to remove a QoS limitation would be time-consuming and expensive due to the geographical dispersion of these multiplexers. A plurality of fiber optic cables 22 connects the PSX 19 to one or more long haul networks for routing traffic into, and out from, the metropolitan area serviced by the network 2. The cable 22 also connects to other core nodes 16 (not shown) for providing additional wavelength and packet-switching capacity, as would be required for a large metropolitan area and for traffic protection. Some or all of the photonic switches 14 would also be connected to these other core nodes 16 via fiber-optic cables for providing additional bandwidth between the mesh network of photonic switches 14 and the core nodes 16.

The photonic switches 14 provide photonic connections to the access multiplexers 12 to accumulate individual services into a high bandwidth channel. That channel is then express routed at the wavelength level back to a single (or in a large city or for protection/diversity reasons, one of a few) service-aware switch or router 20, in this case a multi Tb/s Ethernet switch. Whilst the individual wavelengths being transported through the photonic paths may not be as fully utilized as they would have been had conventional edge routers been used, this under-utilization is more than offset by the lower cost per Mb/s of the photonic switching provided by the photonic switches 14 and core photonic switch 19. However, this under-utilization in the photonic paths lowers the port utilization efficiency on the central switch/router 20, which, being the central switch, has extreme throughput demands placed upon it. To avoid further increase in these demands, concentrating (or statistical multiplexing) tributary cards can be used on part or all of the port-capacity of the central router/router 20.

In the network 2 shown in FIG. 3, numerous tandem packet processing hops, typical in known MANs, have been replaced with two different points of packet processing: one (potentially benign with little or no impact on QoS if the level of Stat Muxing is kept low or zero) in the access multiplexers 12 and one (a more significant massive routing or switching function) in the core nodes 16. Assuming the possible presence of more than one large switch node per city (say two large switches nodes for survival reasons or 2-5 large switches nodes for load-sharing reasons) then the maximum number of packet processing points end-to-end in a city would be four, two of which could be engineered to be benign by over-providing photonic bandwidth to the Access Multiplexers, and two of which are in large central nodes with extremely well engineered QoS constraints as is expected of Tb/s-level "carrier grade" packet switches/routers, such as Nortel Networks Optera Packet Core (OPC). In comparison a legacy/prior art distributed router based network would exhibit up to ten-to-twenty hops common in today's tandem IP-routed networks. Furthermore, since the multi-Tb/s switches 20 could have direct wavelength connections to their peers in other cities (thereby turning the long-haul backbone into a deliverer of lambda pipes only) the total number of data hops end-to-end across the North American continent would also usually be four. A central packet-aware Tb/s router 20 would be used to map traffic into each long-haul carrier's network on a per-destination wavelength basis.

For a 20 Tb/s core node 16, it would be reasonable to expect about 300-600 bi-directional 10 Gb/s modulated wavelengths to face into the long-haul network (since typically a large percentage of data traffic does not stay in the same community), which is enough to provide an average of five wavelengths per destination per carrier for four carriers, at 25-50 major hubs per carrier. The reasoning behind these numbers is: the router capacity is single direction but is used in a folded bi-directional mode for full connectivity, resulting in effective halving of capacity per direction, plus some of the traffic will be local, not requiring long-haul capacity (which therefore drops from 500 to ~300) but the photonic switch and router may tandem some traffic, for example for outlying smaller communities, so this would lift the trunk capacity, since that traffic would appear twice on the trunk ports and not at all on the metro/access side.

Figure 4:
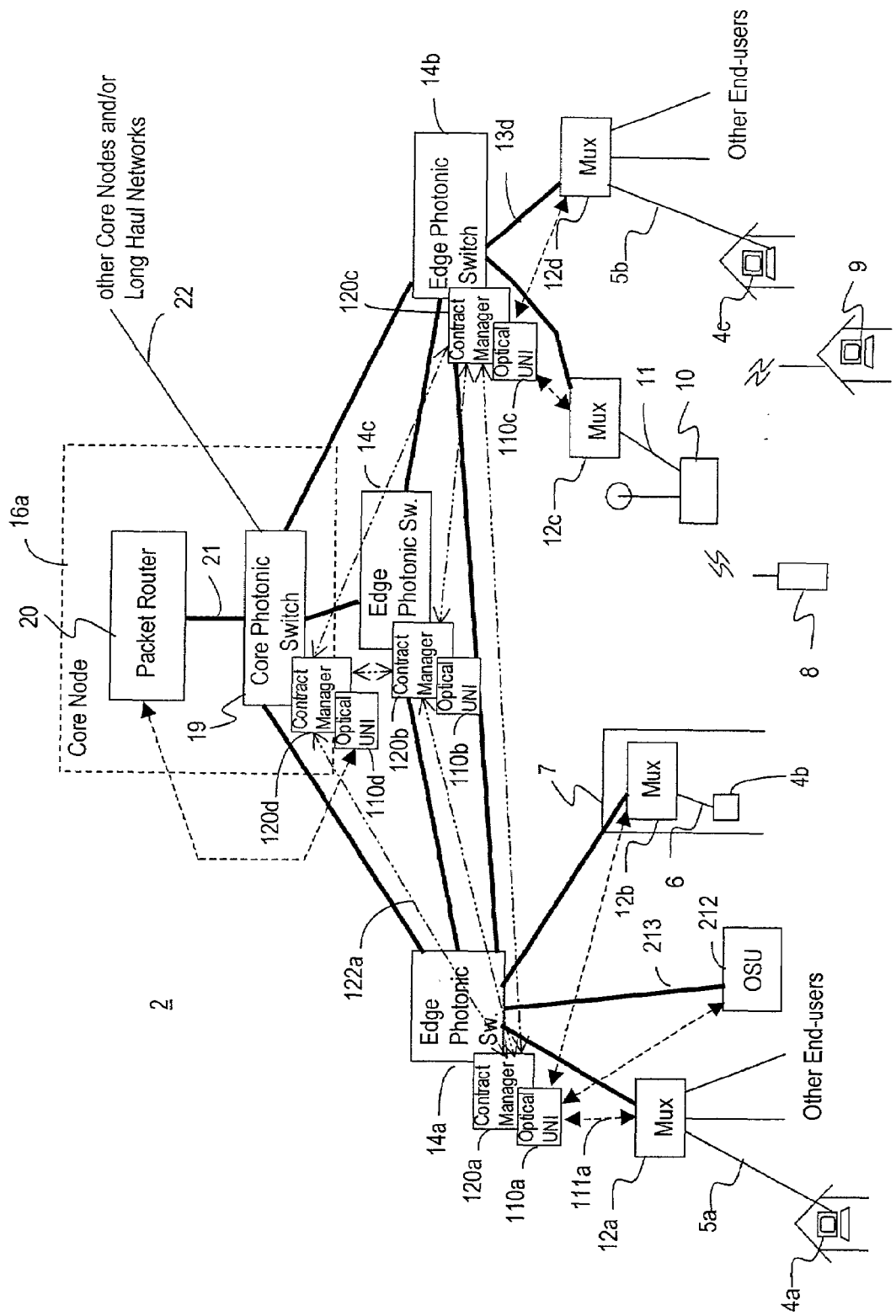
FIG. 4a shows communications control paths and the network management for the network of FIG. 3.

FIG. 4 shows further detail of the photonic switches 14, 19 in FIG. 3. Specifically, each photonic switch 14, 19 includes a Contract Manager (CM) 120 which responds to bandwidth request inputs by dynamically determining, through consultation with other CMs 120, wavelength paths between the photonic switches 14, 19 based on demand and utilization of the links 15, 17. The detailed operation of the Contract Manager is covered under co-pending U.S. application Ser. No. 09/453,282, entitled "Architectures for Communications Networks", filed Dec. 3, 1999 (Graves-Hobbs—1999). The edge photonic switches 14a to 14c have correspondingly labelled CMs 120a to 120c. The core photonic switch 19 includes a CM 120d. Each CM 120 includes an optical UNI 110 for accepting requests and providing grants to nodes supported by the CM. For example, the Optical UNI 110a accepts requests (and provides grants) to the access multiplexer 12a, the OSU 212, and the access multiplexer 12b, over logical communications paths shown in FIG. 4 as dashed lines. Likewise, the Optical UNI 110d communicates with the packet router 20. The CM 120a to 120d communicate with each other over logical paths shown in FIG. 4 as double-dashed lines. All the CMs 120 have links (not shown) with overall network management for equipment provisioning, status, maintenance, billing, etc. so they can maintain an up-to-date map of the network equipment resources and status around their nodes.

By connecting the access directly back to the Ethernet Tb/s packet router 20 with a photonic switched network, the tandem connections from end-to-end (customer A to customer B) become much simpler, with some dependency from the choice of access system. The access system could be access multiplexers 12, as previously described, but other types of access systems (e.g. Passive Access Multiplexers—PAMs or Passive Optical Networks—PONs) could also be used.

Furthermore, for the case of two intermediate PS's there would be a total of 9 steps for the first case above, (i.e. traffic not going to the Ethernet service-aware router 20) and 11 steps for the second case above (i.e. for traffic going to the Ethernet service-aware router 20). This number of steps compares favourably with an estimated 35 typical of known MANs currently in use. This reduction is a major improvement and is one of the advantages of the network 2. Another important advantage of the network 2 is that there are only two optical transmitters and two optical receivers over the entire bi-directional path between an end-user and the packet router 20 for a total of four transmitters, and four receivers over the entire bi-directional path (two for direct user-to-user lambda-based connections), which is a reduction of ~22 transmitters and ~22 receivers (from the example in Table 1) over known MAN's for a ~6:1 reduction in transponder quantity requirements, and resultant costs for these items. Note that the majority of the functions transitioned in the present network 2 are photonic switches 14, 19 so this network approach becomes more advantageous as the cost of photonic switches decreases. Also note that these photonic switches are used to reconfigure the available bandwidth (in the form of optical carriers) between the multiplexers and the packet router on the basis of the need for overall capacity increments, decrements between those points, on a response time determined both by the needs of the multiplexers and routers to be allocated a bandwidth change, and the ability of the agile photonic layer to provide the changes, determined by the response time of the (e.g.) Contract Managers, photonic switch switching times and the photonic line system stabilization requirements. In the case of a Metro area the CM's should be able to determine an available path and set it up in 30-50 ms, using techniques disclosed in co-pending U.S. application Ser. No. 09/453,282 (referred to in the cross references section), so the response time of the photonic layer becomes the issue. Here the switch cross-points can be switched in 3-15 ms, mainly determined by the response time of the MEMS if used in the photonic switches 14, 19. However other known photonic switching technologies such as bubble switches and semiconductor optical amplifiers (SOA), among others, could be used). However the resultant changes in DWDM output resulting from changing the number of optical carriers in an active DWDM output, due to switch action, unless applied "gradually" can cause a gain perturbation in the output amplifier, causing degradations in already active traffic optical carriers, which is undesirable or unacceptable. This can be overcome by ramping optical powers down on only the circuits to be switched over a few milliseconds to a few hundred milliseconds, dependent upon the design and resultant responsiveness of the optical amplifier control loop, and then ramping them up again in about the same period after the switch has operated to keep the changes to rates which can be handled by the gain control loops of the DWDM optical amplifiers, typically currently requiring a ~100-300 ms overall switching time although several companies have indicated that this can be reduced to as low as 2 ms in future. This can be achieved by having the switch control processor interact with the output spectral flattening sub-system of the photonic switch, which may consist of an output scanning analyser and a series of Variable Optical Attenuators or Variable Optical Amplifiers, in series with each optical path through the switch, the interaction being to ramp the VOA down to minimum gain/maximum loss prior to switching and then to ramp it up again, to restore the optical carrier that has been switched to the same power level as all the other optical carriers in the given DWDM outputs. A suitable power spectral flattening system is defined in co-pending application entitled "Optical Switch With Power Equalization", Ser. No. 09/580,495.

There are other advantages of the network 2 of FIG. 3. Firstly, given enough latent need for bandwidth a service provider can effectively use (even if not fill) a wavelength with a single business customer or a small group of small business/residence customers connected via a Gigabit Ethernet (GE) GE-PON (i.e. a Passive Optical Network that carries Gigabit Ethernet frames) or a hybrid fiber/copper access system. It is of little consequence that the wavelengths are not fully filled because even current early technology photonic switching is much cheaper per megabit/sec than currently available forms of service-aware packet switching or broadband circuit switching. Secondly, since a node to handle partitioning of traffic on a per-service and per-carrier level is needed anyway at the entry to the multiple long-haul networks, centralizing metro packet-aware functions at the same point provides the opportunity to use a multi-Tb/s packet router 20 to do both jobs and to cost-effectively back-haul complete wavelengths via photonic switches 14, 19. In addition, the same network 2 will enable the provision of end-to-end cross-connected or dynamically switched wavelength-level services under network control, with or without a level of agility, or with direct customer input and control. (e.g. Dial-a-wavelength service). Hence, the network can be combined with direct user input or Ethernet packet switch/router and Access Multiplexer input (based on their layer 3 bandwidth requirements, packet loss rate, etc.) to provide an on-demand, dynamically provisionable wavelength, waveband, or fiber network capability. Such capability is described in a co-pending U.S. application Ser. No. 09/453,282 entitled "Architectures for Communications Networks".

The installation and provisioning of the network 2 is much simpler than the approach used for existing MANs. This simplification is mainly due to the use of cost-effective photonically switched bandwidth between the access multiplexers 12 and the core nodes 16, combined with the improved ability to auto-configure connections in an integrated simplified network. This simplified approach has 11 steps (9 steps for lambda only services) to service revenue versus 29 steps as described earlier in the approach for prior art MANs. Specifically, the 11 steps involved to set up the network 2 are: installing the core node(s) 16, edge photonic switches 14, and access multiplexers 12 network elements; installing fiber links 13, 15, and 17 between the network elements; installing fiber to a long haul network POP; installing an NE manager for each NE type (i.e. core node 16, photonic switch 14, and access multiplexer 12); provision layer-2 paths (e.g. MPLS paths) from the access multiplexers 12 to the core node(s) 16.

The photonic switches 14, 19 are "photonic good citizens" with appropriate optical path conditioning to permit the concatenation of multiple fiber hops through multiple photonic switch locations without the need for intermediate per-wavelength functions such as regenerators, transponders, complex per-optical-carrier compensators, spectral flatteners, etc. "Good photonic citizen" means that the photonic switching nodes are required to always operate harmoniously with the optical links of which they are an integral part. This requires that they exhibit well controlled and benign optical parameters (optical loss, polarization-dependent loss, loss variations, chromatic dispersion, polarization mode dispersion, induced optical noise, signal level degradation beyond what can readily be recovered by optical amplification without approaching the noise floor or the overload points of associated optical amplifiers, group delay from embedded DWDM, S-DWDM non-perfections, dynamic switching effects, particularly those which can disrupt in-traffic optical carriers, etc. It also requires that the switch node be used for appropriate compensation to remove the effects of line system tolerances interacting with the switching function to produce non-optimum effects. One such classic example of this is the need for per optical carrier power spectral flattening at the switch output, to compensate for the variation in input powers from the multiple uncorrelated routes that may each be feeding a few wavelengths to any given output. Hence, the photonic function is assumed to be that which is needed to allow contiguous connection right across the present network 2, and not just a switch. The suite of functions comprising such a switch is described in the cross-referenced co-pending U.S. Application Ser. No. (12660RO) entitled "Photonic Network Node".

For data services, as opposed to wavelength services, wavelengths can either be shared over multiple subscribers in an Ethernet optical PON or can be terminated close to the end users 4 with the information bandwidth of that wavelength being shared over those subscribers 4 by use of point-to-point copper links in a hybrid fiber-copper access system. To facilitate this sharing, a multi-lambda GE or 10 GE multiplexer/demultiplexer and an array of high speed digital modems can be located relatively close to the subscribers 4, potentially at the convenient junction wiring interface (JWI) site, thereby exploiting the known fact that shortening the copper loop allows much higher speed modems to be used. Due to the variations in cable lengths from the JWI to the individual users 4, the users taken as a group will see a range of available bandwidths. This range in bandwidth can be minimized by either setting the bandwidth of all subscribers 4 to the bandwidth that can be served over the longest loop from the JWI (i.e. reducing everyone's bandwidth to the lowest common denominator).

A similar approach can be used for small, medium business to provide Ethernet based access or, for larger businesses or businesses that need a higher bandwidth capability, a complete wavelength can be provided to the premises, to support GE, 10 GE or plain transparent bit-rate and protocol-independent end-to-end wavelength service capability in either switched or provisioned modes.

As an example of the size of a large version of the network 2, consider a metropolitan area with a population in the order of 1 million subscribers or ~2-3 million people, all of whom are to be served, with true broadband residential and business services. To provide complete service coverage at 100% "take" rate (a pathological "limit" case) to such an area approximately 5 core nodes (16)+45 photonic switches (14) of average size 1000-2500 optical carrier/lambdas throughput, dependent upon the mix of 1GE, 10 GE lambdas, +2250 access multiplexers (12) (or equivalent) at an average of 50 per Central Office serving area would be needed to deliver up to 30-100 Mb/s per residence or small business, and 10 Gb/s to each medium or large business. The total number of optical carriers (1 and 10GE)=~10,000 per core node 16 which corresponds to terminating ~250 DWDM fibers, on a node with ~20-30 Tb/s throughput for a 100% penetration ubiquitous full broadband capability. Of course, where the subscriber uptake of services is more like 25-40%, not 100%, the capacity requirements are reduced accordingly, rendering the capacities readily achievable. For smaller networks, lower penetrations or lower per-subscriber bandwidths the network can be scaled down from this to a lesser number of core nodes (but at least 2), a lesser number of smaller photonic switches and, in the extreme, the agile DWDM photonic layer could be simplified by reducing the number of optical carriers per fiber to one, eliminating the DWDM complexity, whilst maintaining agile optical carrier configurations through single wavelength photonic switches. The network consists of very closely connected core nodes 16 providing the service-aware packet switching, but also contain multiple photonic switching functions, formatting Ethernet-based wavelengths to outlying edge photonic switch 14, which consolidate and switch the bandwidth to/from the subtending access systems on a per-wavelength basis. The access systems include but are not limited to a Gigabit Ethernet PON and the access multiplexer 12 which is based on Ethernet protocols.

The combination of access multiplexer 12 or GE-PON, plus the edge photonic switch 14 provides a non-blocking bandwidth-abundant path between the subscriber/user 4 and the core node 16 for packet-based services and photonic wavelength-based services, with a WDM-PON or direct wavelength access into the edge photonic switch 14. Central Office located Access Multiplexers can also be appended to the edge photonic switch 14 in order to map 1 GE lambdas into 10 GE lambdas at the access/inter-office trunking interface and/or to map legacy ATM, TDM traffic into the ubiquitous Ethernet packet flow, may be needed to connect to legacy equipment. In addition, 1 GE and 10 GE Ethernet-interfaced fiber entry adaptors may be co-located with legacy data equipment. These locations will allow the interfaces to that equipment to be controlled from the same control structure as is controlling the other optical nodes and switches in the rest of the photonic layer. This feature will be discussed later, but basically it will permit dynamic optical carrier connections under a number of different stimuli.

Initially, there may be value in providing some packet-based processing functionality co-located with the edge photonic switch 14 to keep the level of core equipment low, but as the network utilization increases a much greater percentage of the aggregated traffic connections can make reasonable utilization of switched optical carriers from the access multiplexers 12 back to the core node 16 without any intermediate packet processing, since the individual access channel capacities become large enough to utilize multiple wavelengths directly, especially if those wavelengths are carrying 1 GE and not 10 GE. In that case, there is, in some instantiations of this network, value in placing an Access Multiplexer acting as a simple "dumb" service-unaware 1 GE to 10 GE multiplexer co-located with the photonic switch to allow provisioning of bandwidth in the access, especially PON-based access in which case the Access multiplexer would also contain the PON base station.

In an alternative instantiation, the PON base-station can be placed at the core node 16 and avoid the use of O-E-O electrical multiplexing at the edge photonic switch 14, at the expense of providing more wavelength capacity in the core network. However, these wavelengths could be more tightly spaced, since the 1 GE sidebands are only 10% of those on 10 GE, and 50 GHz (80 channel) AWG-based Wavelength Division Multiplexers and Demultiplexers are already available with 25 GHz ones expected soon. Tighter spacing would put a premium on a simple photonic method of controllable mapping from ultra dense WDM (UDWDM) in the trunking to S-DWDM in the access to allow the access outside plant components to be inexpensive, both for optical sources and for outside plant-located WDMs. The key parameter to control is the upstream optical carrier frequency since this originates in the relatively uncontrolled environment of the customer premises equipment or field-located access multiplexer, and has to be sufficiently precisely aligned in frequency to pass, complete with side-bands, unimpaired into the narrow channel width (in optical frequency) of the upstream DWDM or even UDWDM link.

The edge photonic switch 14 is used to switch individual wavelengths such that the wavelength spacing on the access side is much higher than on the trunk side, at the expense of reducing the maximum number of wavelengths on any given access fiber (which is desirable anyway to avoid over-capacity on the access routs, since there are multiple access routes for each trunk route and hence capacity has to be divided). The edge photonic switch 14 photonic layer (switch and all local variants of the Access Multiplexer), the photonic layer in the core node 16 and the photonic interfaces in the various access units (e.g. access multiplexer 12) are all controlled via a dynamic wavelength switching/routing protocol, which can take one of several forms, depending upon the control stimuli and the desired amount of agility. These stimuli may well come from multiple sources (e.g. the core node 16 packet switch may well be demanding more or less bandwidth (i.e. wavelengths) to a specific destination or it may be demanding a reconfiguration of its wavelength paths across the network 2, or end-users 4 may be demanding end-to-end dial-up lambda services which are not visible to the packet aware the core node 16 packet router 20. Therefore, there is a need for an ability to work several classes of service type and of connectivity requests within the overarching lambda control system. This function may or may not be centralized depending on the desired amount of network agility. The approach referenced under the associated Contract Manager/Agile Lambda disclosure Graves-Hobb 99 is a distributed approach.

The core node 16 contains a multi-Tb/s level packet-aware, service aware Ethernet-interfaced router 20, a large bank of WDM transponders, a large WDM core photonic switch 19, together with ancillary functions and photonic network control functions (e.g. Contract Manager or similar). The core node or core nodes 16 provides the sub-λ service level switching for the entire network 2 for the given metro area and which also provides per-λ service switching via the subtending photonic switch in the core node 16. Multiple core nodes 16 are interconnected via multiple optical carrier links 22 to permit a high degree of flow between them for load sharing of the routing function and to provide high capacity lambda-level interconnect between the core nodes, by reconfiguring access paths to remote core node routers, should the local core node router be heavily loaded, and so that individual long-haul carriers need only access one core node or a subset of core nodes as a point of presence, and so that multiple core nodes 16 can provide a mutual protection function, preferably by an adaptive load-sharing algorithm in one of many known prior-art forms, in case of catastrophic loss of a core node 16. In this case the combination of the photonic switches and the agile lambda control would reconfigure capacity entering the failed core node router from its subtending Access Multiplexers away from that failed core node and towards the other core nodes in a distributed, load-shared manner. This reallocation may be per-service based, in which case a complex series of operations need to be implemented in the Access Multiplexer, or it may be at the optical carrier level in which case a relatively simple reallocation of optical carrier routings through the photonic layer is required, especially if the photonic layer and the core node router interfaces both have sufficient over-capacity to absorb the extra traffic. Then the subscriber services would have to be re-initiated, but this may be facilitated if the high capacity links between the core nodes are used to pass subscriber/service specific information between the core nodes. The core nodes 16 act as hubs for the subtending edge photonic switch 14 which provide a flexible and potentially agile method of mapping capacity from the edge to the core of the network 2.

The photonic switches 14 provide the following functions:

Switching
  Switched lambda aggregation, allocation under static or dynamic control, based upon user stimulus, between S-DWDM access and DWDM core as well as between DWDM pipes in a tandeming role, to enable end-to-end dynamic switched optical carrier path set up
  Switching lambdas to/from co-located or remoted Access Multiplexers for legacy access Traffic Balancing
  Load sharing (static provisioned, dynamic under network control, dynamic under local/autonomous control, dynamic interactive under core node 16 and/or access multiplexer control) back to the different core node's 16
  Optical carrier provisioning to the various access systems
  Time-of-day capacity re-allocation (optical carrier capacity shifted from business to residential areas in evenings)
  Lambda concentration/consolidation, especially at the access-core interface
  Lambda mapping from/to DWDM to/from S-DWDM Protection
  Interoffice network optical link protection, diverse routing
  edge photonic switch 14 protection/tandem photonic switch 14 protection or bypass
  Access system transmission protection, diverse routing selection Core Network Topology Evolution
  Network, node and link capacity upgrade, reconfiguration and continuity of service during upgrade Providing and distributing unmodulated optical carriers from a multi-lambda source as central wavelength resource
  Permit passive modulation at the customer premises
  Eliminate/automate lambda provisioning A majority of service-aware, packet-aware functions are centralized at the core node 16, each of which resides in a manned centre in a metro area, where other complex service-aware functionality is located, and which is fed from the access devices (access multiplexer 12, including local and remote, legacy and new/GbE/10 GE applications) via a purely wavelength-level all-photonic switched transport layer. This configuration may be relatively inefficient in the use of bandwidth, since the provisioning or switching granularity is an entire wavelength, but with low cost DWDM, this inefficiency is of little concern. In addition, as DWDM technology moves forward, with dense Array Waveguide WDM moving from 16 thru 40 ch/100 GHz grid and now on to 80 channel/50 GHz grid, combined with the generation of stable dense optical carrier grids as a centralized resource, and the potential availability of low cost photonic switching, the cost of an end-to-end switched wavelength will fall dramatically, so this inefficient use of bandwidth is of low or even no consequence.

The transport structure of the network 2 having no packet-level/service-aware functionality results in a very simple control and traffic flow structure with minimal QoS issues. In effect, from a QoS perspective, normally the packet-aware, service-aware port cards into the access multiplexers 12 appear to be directly connected into the core node 16.

The core of the network 2 is the core node 16 or small network of core nodes 16. These core nodes 16 provide all the routing of individual services or provide access to co-located servers or other service functions. As such, the service-aware functions are largely concentrated into the few core node 16 sites and not scattered throughout the metropolitan area. This arrangement has benefits in terms of how much data-aware expertise is required, since in the example model given earlier, with one million subscribers in a major metropolitan centre, 1-5 core node sites with large routers, in contrast to 45 router sites providing a combined edge/tandeming function at the packet level in known MANs with router-based tandeming. This reduction is made possible by the ability to centrally switch/route enormous amounts of traffic in the packet router 20 of the core node 16, combined with the low cost interconnection from the packet router 20 out to/from the metro network edge. The metro-interconnect to other offices and on into the access will be via the local Tandem photonic switch 19 in the core node 16 and on to other COs via DWDM.

Photonic-level services (e.g. dial a wavelength) are also supported through the Photonic switches 14, 19, with photonically switched service wavelengths being connected through the outlying edge photonic switch 14 to the core node 16 Photonic switch, where they are then routed to their destination in real time. This capability will simplify call-processing for the first phase of photonic services networking, at the expense of bandwidth efficiency. Whilst multiple different options exist for detailed photonic switch node architectures, in order to permit the use of simple scalable wavelength-plane-based photonic switches throughout the metropolitan core network, any provisioning for direct end-to-end optical carrier services (as opposed to services flowing through the router) requires the provisioning of an optical carrier wavelength converter at the photonic node associated with the router. Alternatively more complex line cards can be used on the access side of the optical edge switch nodes, permitting any wavelength optical carrier to be mapped into a given access fiber, either as a one optical carrier per access fiber solution or as a quasi-S-DWDM approach, but with tunable filters to assemble, demultiplex the multiple optical carriers at either end of the access fiber. In the event that the more sophisticated access line card technology is used, then, later, as the demand for lambda services grows, more efficient control algorithms can be implemented to permit direct photonic switch—core node optical carrier flows in an optimized mesh network, without the intervention of the core node's 16 core photonic switch 19. Avoiding partial path blocking in a DWDM optical carrier-based network while maintaining minimal lambda-converter costs requires migrating to more sophisticated autonomous (or semi-autonomous) control of the photonic switches 14 to find an option or options for wavelengths which permit cross-network connectivity on the required end-to-end path options (note there are all possible DWDM wavelengths to search as well as all possible paths between the given end points), and then to set up the selected path, to configure the access line cards to deliver that wavelength optical carrier to the required access fiber, configure the access line card and remote demultiplexr/tunable filter (in a WDM environment) to deliver that wavelength to the wavelength access point, and to configure the correct unmodulated optical carrier and deliver it to the end points for modulation. This control can be implemented as part of the Contract Manager protocols. The above issues apply mainly to extending this network to provide an end-to-end transparent optical carrier capability, since, in the event of Ethernet packet service, the optical carrier from the access multiplexer is terminated on the router, which, being a large central node, has a large number of received optical carriers at each of the entire band of DWDM wavelengths, and a large number of transmitters at each of the entire band of DWDM wavelengths, (which allows the router to also act as a wavelength converter "for free") hence eliminating the need to co-ordinate the wavelength plans of source, destination access multiplexers. In comparison, in an end-to-end transparent optical carrier application there is a need to provide optical connectivity between the end access multiplexers and hence a need to either co-ordinate their wavelength plans or to provide a central degree of freedom, in the form of a wavelength converter.

The edge photonic switch 14 consists of a photonic switch with integrated DWDM, S-DWDM interfaces, and all the functions to make it a photonic "good citizen" (e.g. controlled photonic impairments, ability to compensate for incoming impairments, and differences in optical signals such that it can format a "clean" optical signal at its output, as well as a switch which carries out the switching operation benignly with respect to the requirements of the line system, especially the optical amplifiers, by avoiding causing them to abruptly change gain level which would disrupt traffic already flowing through the amplifiers, should the number of carriers through those amplifiers be suddenly changed).

The core node 16 and access multiplexers 12 are provided with multiple wavelength arrays of optical carrier sources, the outputs of which, though grouped in groups matching the S-DWDM wavelength allocation, are generated with enough precision in a centralized multi-lambda generator detailed in a co-filed application 14041ROUS01P to permit the concatenation of, or more accurately the interleaving of a S-DWDM signals to flow directly into the DWDM core-network side ports on the edge photonic switch 14. The edge photonic switch 14 also carries out the mapping from DWDM to SWDM by mapping wavelengths. In a particularly simple instantiation, optimised for all or nearly all of the optical carriers terminating upon the core node router, this is carried out in a round-robin manner from one downstream DWDM port into n access ports where n is greater or equal to the ratio of DWDM wavelengths allowed to S-DWDM wavelengths allowed. As an example, considering a DWDM input to an MSPN with 40 lambdas, if the SWDM count were to be 8 lambdas then n=/>5 and, in the case of n=5, the allocations of wavelengths would be:

Access #1 lambda 1, 6, 11, 16, 21, 26, 31, 36,
Access #2 lambda 2, 7, 12, 17. 22, 27, 32, 37
. . .
Access #5 lambda 5, 10, 15, 20, 25, 30, 35, 40.

In this example the mapping has the effect of opening up the spectral grid from 100 GHz to 500 GHz in the access, giving an 8 channel S-DWDM structure, (although a 400 GHz number was quoted earlier in this document, equivalent to a 10 channel S-DWDM format, whilst other formats such as 4 ch S-DWDM, with 1 THz between carriers is also possible, all with a companion 40 ch DWDM in the core of the metropolitan network) thereby relaxing to the specifications on the access optical components. However, the optical carriers all have to be generated with DWDM-compatible wavelength precision. The wavelengths returned from the access plant have to be DWDM compatible. Note there are some dynamic characteristics to be managed such as optical group delay and any transient chirp introduced during transmission, though the dominant requirement is in the precision of the optical carrier frequency, which can be generated centrally. This has significant benefits including the ability to accurately synchronise or lock the optical carrier "comb" of frequencies to a network reference optical carrier frequency, the generation of the optical carriers in a benign Central Office environment instead of an outside plant cabinet or CPE, CLE environments and the elimination of CPE, CLE wavelength provisioning, and detection of errors in that provisioning.

The access multiplexer 12 has several possible varieties. One variety is a street-cabinet-located or further-distributed true broadband to the user (home or small/medium business but not large business because they would have a different form of access multiplexer 12 on their premises with a dedicated lambda-feed to it). The access multiplexer 12 is, in effect, an Ethernet multiplexer with 10 GE or 1 GE ports on its network (multiplexed) side and high speed DSL (Digital subscriber Loop) ports on its access side. Unlike current DSL, the access multiplexer 12 uses Ethernet throughout and the DSL carrier is based upon a simple form of QAM coding with careful planning of upstream and downstream carrier to minimize the cross-impact with amateur radio operators, since radio frequency ingress, leakage from twisted pair copper plant can be a problem. All DSL line transmission systems exhibit reach/bit-rate limitations and this one is no different in this respect. Hence the service level achievable (in terms of bit-rate) will be statistical, dependent upon loop length from the subscriber to the JWI-located access multiplexer 12. Alternatively, the DSL component of the access multiplexer 12 can be distributed deeper into the outside plant (OSP) by use of Fiber-to-the-neighbourhood sealed module ONUs, thereby shortening the reach on the longest runs to reduce or even eliminate the differences in available bit-rate to each subscriber 4.

Figure 5:
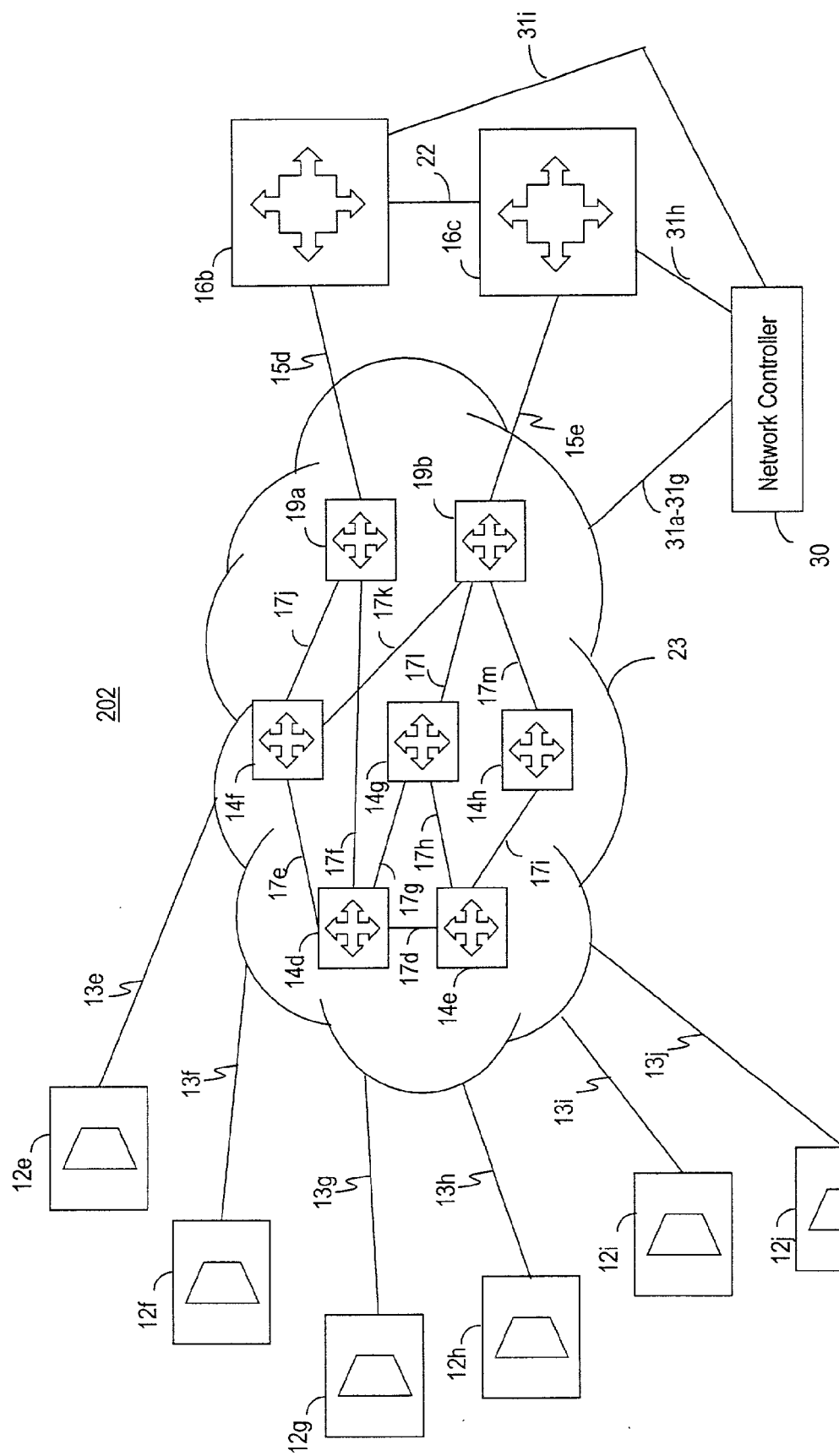
FIG. 5 is a diagram depicting the topology of a communications network in accordance with a second embodiment of the invention.

FIG. 5 depicts the topology of a communications network in accordance with another embodiment of the invention. In FIG. 5, access multiplexers 12a to 12f are connected to a mesh network configuration 23 of edge photonic switching nodes 14a to 14e via respective fiber optic cables 13a to 13f for carrying bi-directional SWDM optical signals. The mesh network configuration 23 further includes two (or more) tandem photonic switches 19a and 19b each connected to its respective one of the core nodes 16a and 16b (or more) via respective fiber optic cables for carrying bi-directional DWDM optical signals. The photonic switches 14 perform a variable mix of edge and tandeming functions are interconnected via fiber-optic cables 17a to 17j for carrying DWDM optical signals between them. The specific interconnection of access multiplexers 12 and photonic switches 14 is flexible, however, each access multiplexer 12 must be connected to at least one edge photonic switch 14, and preferably two or more photonic switches so as to allow route diversity in case of access fiber/cable cuts or equipment/node failures. Similarly, the interconnection of photonic switches 14 and tandem photonic switches 19 is flexible, however, each edge photonic switch 14 and each core photonic switch 19 must be connected to at least two other network nodes, either photonic switches 14, tandem photonic switches 19, or a selection of both. In this manner, the photonic switches 14 and tandem photonic switches 19 form the mesh network configuration 23. The management of paths through this mesh 23 is under the control of a network controller 30 connected to the photonic switches 14 and tandem photonic switches 19 via links 31a-31g and to the core nodes 16a, 16b via the links 31i and 31h, respectively.

When multiple core nodes 16 are used in a distributed router 20 environment the network 202 still has the same basic data flows and structure, with the intent to route packets only at one router 20 in the network at the IP level, bypassing routers 20 in other core nodes 16 that are in tandeming locations.

The operation of the network of FIG. 5 is similar to that of the network of FIG. 3, however, the use of the tandem photonic switches 19 in the mesh network configuration 23 provides additional advantages. That is, since the photonic switches 14 are hub-connected to the core nodes 16 by the tandem photonic switches 19, the network is more survivable than that of FIG. 3. The hub-connection to the core nodes 16 also allows a distributed resource network of core nodes 16. By having the photonic switches 14 hub-connected to the tandem photonic switches 19 the N-squared growth problem typical in mesh networks is avoided. The result is an N-growth network with an $(N/M)^2$ growth of the complexity of the core nodes 16, where N is the number of photonic switches 14 and M is the number of tandem photonic switches 19. This result is an improvement in survivability over the network of FIG. 3, which is singularly hub-connected to the core node 16a resulting in a single catastrophic point of failure at the core node 16a taking out the entire network, whereas in the network of FIG. 5 a single catastrophic failure event at any core node will take out $1/m^{th}$ of the network capacity and, providing the network has all links, node capacities over-equipped to the level of $1+1/m^{th}$ of the required capacity, then reconfiguration of the network will allow other core node routers to pick up the traffic that was destined to pass through the failed core node router.

More specifically, a conventional mesh of routers (or any network nodes) suffers from a bandwidth fragmentation problem in that each node has N−1 neighbours and provides (in a balanced case and with no "wasted" bandwidth) 1/(N−1) of its capacity to each of them. There are N×(N−1)/2 links and any traffic imbalance has to be handled by tandeming through other routers (or nodes) which robs capacity from the users of that node resulting in a reduced quality of service for services/subscribers entering the network at that node. This problem can be partially alleviated by providing a dynamic transport layer since any reconfiguration of capacity to handle a transient heavy load, by introducing tandeming through a specific node, need only last the duration of that peak demand and can then be reverted to remove the impact on local users. Nevertheless the combination of the bandwidth fragmentation of mesh networks and high available bandwidth utilization network design is a recipe for poor or variable QoS due to interactions in the transport layer or blocking of access from the packet layer into specific transport paths. The transport layer could be a photonic mesh network or a SONET-based mesh network that moves the complexities of mesh networking out from the router and in to the transport layer. In fact, since all of the capacity of any given router may be dedicated to one other node or may be uniformly distributed across the network of routers at any given time, then for the transport mesh connections to keep up with this they must either be massively over-engineered in capacity or must be very rapidly dynamically re-configurable, although, as we will present later, there is a compromise possible between these two extremes, which can be more practically exploited in a quasi-mesh network with a degree of hubbing such as is proposed later. If they are over-sized this can rapidly erode the economics of this approach, which is based upon the superior economics of fiber transport systems over packet-by-packet machines at the same throughput bandwidth, because in an "N" node network with N−1 links out of every node, to completely avoid any chance of tandeming (thereby eliminating any QoS impact on local users, due to that tandeming robbing capacity) each link would have to be over-engineered to a level of (N−1) times. If the transport is made dynamic then significant issues have to be overcome to make the dynamic approach work such as defining and developing an agile lambda control structure, handling the effects of rapidly reconfiguring transmission links on the actual transmission equipment and how to co-ordinate the set-up and tear-down of transport paths that the router needs, etc. While such protocols are being developed and the concepts behind these approaches have been disclosed before these approaches are most challenging to implement practical solutions for in multi-hop meshed networks (due to the level of path availability interactions, leading to the prospect of multiple partially complete path opportunities and a paucity of completely available paths without rearranging in-service traffic) and are also most challenged when implementing an agile network in a bandwidth-frugal or bandwidth-efficient network, due to the limited spare bandwidth to work in to in establishing new paths.

Alternatively, the mesh of (Edge) routers and tandem links can be replaced by a centralized routing resource, which may be required to be a massive machine in order to handle the load (dependent upon the size of the network and the service capacities to be provided), with simple non-intelligent access multiplexers providing a physical distribution of the router interfaces, with a straight-forward back-haul to the centralized routing resource. In this case, with a central resource and a hubbed approach, Ethernet protocols appear very attractive, because of their fit to data transport, the simple low cost nature of Ethernet interfaces and their acceptability, and ubiquity. However, such an approach has some substantial shortcomings, most notable of which is the obvious fragility of the resultant network, with all communication ceasing if the center node fails and all communications with a given access multiplexer ceasing if the point-to-point link to that access multiplexer fails.

Accordingly, the network 202 of FIG. 5 overcomes these aforementioned problems by coupling the layer 2/layer 3 hubbed architecture with a layer 1 photonic mesh transport network and more than one hubbing point. In the case of the photonic mesh, using reasonable response time photonic switching technologies, then the access multiplexers 12 can be provided with multiple mutually protecting path options (shown in more detail in FIG. 7) to/from the centralized routing resource 16, the routing resource can be partitioned into two or more co-operating routing resources (either general purpose or specialized, e.g. a video entertainment services routing resource). The photonic switched network 23 can set up paths from any or all access multiplexers 12 to each router 20 in the centralized resource 16 or can set up paths to only one of them but cut over to paths to another one in the event of problems. The protection optical carrier paths can be pre-computed, e.g. by using the P-cycles protection computation algorithms presented by TRLabs referred to herein below with regard to FIG. 9. Also, the photonic network 23 can reconfigure paths around any network failures such as fiber cuts using the same prior art technique. It is projected that reconfigurations would occur at lead-times in the sub-second time-frame (e.g. 100-300 ms) but not in the ms time frame or less, due to the settling time of current optical amplifiers since such amplifiers show a gain dependent upon the number of wavelengths/optical carriers passing through them, though this can be adjusted by the amplifier gain control loop. Hence changes in the number of optical carriers passing through the amplifiers have to be introduced slowly (e.g. by ramping the carrier power in the carriers that are being switched) to avoid creating transients on those optical carriers which are already set up and carrying live traffic. This means that the slew time of the changing levels of the optical carriers being switched must be longer than the stabilization time for the optical amplifier control loop. This is typically 100-300 ms. However, new optical amplifier designs are being reported (e.g. by JDS-Uniphase) with settling times of the order of a few (2-5) ms. This, combined with a 5-10 ms MEMS switching time would allow for 10-15 ms overall switching times. The reconfiguration time requirement would be based upon aggregate capacity needs of multiplexed feeds between a particular multiplexer 12 and a specific routing resource 20.

As referred to earlier in this document, for an agile lambda network to operate, and particularly to operate efficiently and rapidly, it is necessary to provide some level of excess bandwidth. If we consider a variable bandwidth source entering the agile lambda network (e.g. a multi-optical carrier-interfaced router), as that source crosses some threshold of bandwidth utilization, it will autonomously decide that it requires more bandwidth, in this case in the form of another optical carrier from itself to destination "B", wherever "B" may be. The bandwidth source has associated with it a set of statistics of probability of rate of change of bandwidth demands, such that, in a given short time period it is far more likely for the demand to change at a certain constrained median level, rather than at values much greater (or much smaller) than this. Based on the expected median (or some other confidence level such as three-sigma) rate of change, then the bandwidth source can flag that it is approaching but is not yet at a threshold where it has to utilize an extra optical carrier, and can request that optical carrier ahead of time, with a high degree of confidence that that optical carrier will be in place in time as long as:

The response time to establish the optical path is short enough to be shorter than the prediction time at the required confidence level and There are enough spare optical paths in the network to allow the end-to-end optical path to be set up.

In practice these two requirements interact, in that it will take longer to find a free optical path if there are only a few paths available, rather than if there are many, both due to the increased complexity of the search algorithms and due to the number of permutations and combinations that must be tried before a workable path is found. The activity of the agile optical carrier control system is to set up end-to-end paths and often it will (temporarily) leave stranded unused links that cannot be accessed, because the links they would be concatenated to are all in service. For instance, consider nodes D, E, F, all having connections to node G, each of 4 optical carrier cross-section. If D takes two optical carriers to E and one to F, and F takes two optical carriers to G, and one to E, and E takes one optical carrier to G, then there is an optical carrier left unused between D and G that cannot be concatenated with any other link . . . in a larger network context it is stranded, though it could carry local D←—→G traffic if warranted. In practice, in order to maintain a stable network, it is necessary to introduce some load-balancing algorithms, so that the loads on the various links tend to equalize as much as possible, within the constraints of where the bandwidth path end-points happen to be. This load-balancing has the effect of ensuring that there is approximately an equal amount of spare capacity to plan into, across the network, to the best approximation possible, given the constraints of where the bandwidth endpoints happen to have to be placed at any given time. This approximate levelling achieves a "best effort" levelling of the spare capacity, which in turn, provides a much more consistent response time for finding new paths on-demand across the network, and reduces the variation in the percentage of times a photonic network path cannot be found. This percentage has to be kept very low, since it represents a transient denial of service or denial of incremental service capacity. This parameter, the incremental service denial level, or "all potential paths blocked" level, is critically dependent upon the amount of spare capacity available in the network and the smoothness of the distribution of that capacity. This is a major issue which has been and is being addressed in companion work, "Technique For All-Optical Packet Switching" Ser. No. 09/745,867 filed Dec. 26, 2000; "Supervisory Control Plane over Wavelength Routed Networks", Ser. No. 09/563,864, filed May 4, 2000; "Method of Optical Network Bandwidth Representation for Optical Label Switching Networks", Ser. No. 09/611,447, filed Jul. 6, 2000; "Optical Bandwidth Control Protocol for use over a User-Optical Network Interface", Ser. No. 09/613,423, filed Jul. 10, 2000; and "Distributed Recovery Method for control Plane Failures in LP", Ser. No. 60/279,927 filed Mar. 29, 2001 and all assigned the same assigner as the present application. In addition, an efficient algorithm is required to recover optical carriers that are part of an under-utilized group. This can be regarded as running the set-up protocols in reverse, but likely with different time constants and thresholds to ensure that optical carriers are not prematurely retired and than enough hysterisis is introduced to keep the network stable and not toggling between unstable states. This has been covered in other disclosures and is beyond the scope of this disclosure.

In fact the provisioning of individual links at the optical carrier level to/from individual access multiplexers 12 results in a network with a significant percentage of optical carriers with a low "fill" of traffic capacity, since many Access Multiplexers will only need one optical carrier, at part fill to full fill or two optical carriers at part fill, which requires the use of a cost-effective bandwidth transport technology, since much of the active optical carrier capacity is not used, due to the granularity of the photonic network, relative to the capacity, capacity increments of the Access Multiplexers or other edge/access devices, combined with the need to provide an excess of latent optical carrier capacity for the active optical carriers to be dynamic into. This requires a very cost-effective technology in order for this approach to be cost-effective, which is the hurdle that would otherwise prevent us from building such a network and exploiting its benefits. This technology is available in the form of the photonic layer as long as it is indeed a true photonic layer 23 with an end-to-end photonic connectivity and not an optical transmission/electrical switching solution with the cost-penalties of multiple back-to-back transponders. This difference between a photonic network and an electro-optic network is accentuated when the incremental cost of an extra optical carrier across the network is considered. In a photonic network, such a carrier will often be "free" since the photonic switching for a number of DWDM multiplexed fibers is already in place and the DWDM filters/line cards are, by their very nature, multi-lambda devices, as are the optical amplifiers. Thus, unless a new optical carrier triggers the need for a new fiber, it is likely that that optical carrier can be accommodated in the existing construct of multi-lambda building blocks. The same would be true for an electro-optic approach, except for the need to add transponder at every node for every new optical carrier. These are per optical carrier devices and they are not cheap, vying with the electro-optic switch core for the dubious distinction of being the single biggest cost center, so they are very difficult to equip ahead of time in the anticipation that they might be used. Hence, a true photonic network 23, where DWDM is switched through DWDM interfaced switches 14, 19 results in a very low cost to add an individual wavelength within a photonic system, which is not true of a DWDM optical system with transponders, electrical switching, so it is easy to provide an over-provisioning of bandwidth in the form of excess numbers of optical carriers or wavelengths, which simplifies controlling the dynamic allocation of bandwidth.

Note, there are two forms of over-provisioning/excess bandwidth here. The first is to use optical carriers (e.g. 10 Gb/s-capable or just a mix of 10 times 1 Gb/s) to move user traffic without optimising the fill in the optical carrier. Hence the access multiplexers 12 can be simple multiplexers, since they are primarily transport multiplexers and not statistical multiplexers. The second, is the over-provisioning of the number of available optical carriers, so we can move bandwidth around agilely. In the most flexible incarnation, with the least service/capacity constraints, then the only point that statistical multiplexing is applied is at the entry into the central router, where chronic, consistent low-fill lambdas can be connected, via core photonic switches 19, to the statistical multiplex ports of the central router. If the fill on those lambdas increases they can be re-connected, by changing cross-connection assignments in the core photonic switches 19, to high traffic ports on the packet router. This results in only one service/capacity throttling point at the transition between the ultra-high bandwidth, coarsely granular, low-cost-per-Mb/s photonic network and the much higher cost-per-Mb/s, very finely granular, limited (Up to ~5 Tb/s is possible with OPC, but this is still much less than can easily be accommodated on the photonic network, where a multiplicity of 2000 lambda switches can be deployed) central router. This centralization of the bottlenecks into a single location in the network (or two-few, if more than one core node is deployed) facilitates rapid moving of individual end user's bottlenecks or service constraints, because all of the stat-muxing and non-stat-muxing capacity of the network is co-located, surrounded by photonic switching that can reconfigure their connectivity into the photonic cloud and hence end users. In addition there is one point to upgrade, reinforce as traffic levels climb over the years, or new services come in requiring different service-level constraints.

There are further advantages to the networks of FIGS. 3 and 5. Firstly, since all traffic is routed to the core nodes 16 for service-aware IP/MPLS routing, the access multiplexers 12 need not be IP-aware and can be reduced to being simple Ethernet packet-interleaving multiplexers, which are simpler to construct. The core nodes 16 implements simple traffic controls for example peak rate for tariff flexibility, etc. Service richness is contained in the packet router 20 of the core node 16 which distinguishes subscribers based on their source MAC address, provides transparent LAN service via MAC relay over IP, provides Internet routing, and maps corporate traffic into an MPLS virtual private intranet according to Internet Engineering Task Force (IETF) request for comments (RFC) document RFC2547. The access multiplexers 12 do not require Internet routing (e.g. OSPF, IS-IS, BGP-4), VPN management (i.e. RFC2547), nor IP version 6 (IPv6) conversion as would be the case if the access multiplexers 12 were required to be IP-aware. Therefore, service richness and flexibility is concentrated in the core nodes 16, rather then distributed throughout the network, making the network simpler to build and operate.

There are further advantages to the networks 2, 202 of FIGS. 3 and 5. Firstly with, for example, two 10 Gb/s (OC-192) rate S-DWDM optical signals to each access multiplexer 12, more than 500 homes, each using 30 Mb/s of bandwidth each (i.e. total of 15 Gb/s) can be serviced without recourse to the local packet multicasting, which would be the logical solution in a bandwidth frugal, high per-bandwidth-cost transport network, but which would also lock in specific service type assumptions (500 channel broad cast architecture, for example) into the Access Multiplexers distributed throughout the network, these assumptions being that the majority of the bandwidth is to be used in a "TV-broadcast" or "Switched digital entertainment video" architecture in perpetuity. Removing this limitation facilitates the convergence of video and Internet service, thereby permitting high quality video to be exploited in a wide range of new multi-media Internet applications. This means that each household could, as an example, have at least three ~9 Mb/s video feeds active and still have 3 Mb/s generic web-surfing plus telephony without the need for traffic concentration, and therefore priority queues or call admission control (CAC) are not required at the residential versions of access multiplexers 12. This is significant, since these will have to be small unobtrusive low-cost, low power, high reliability units and extreme functional simplicity is the best way to achieve these attributes. This simplification of the access multiplexers 12 reduces the engineering burden on the service providers operations support staff. Secondly, assuming Ethernet frames of 9K bytes each (i.e. six times the current Ethernet maximum), each cell would require seven microseconds of transmission time at 10 Gb/s. Since this transmission time is similar to that of an ATM cell, which requires three microseconds at 150 Mb/s, there is no need to partition even the extended Ethernet frames into cells to meet jitter requirements. Thirdly, the network is simpler, and therefore less expensive to build and operate than current MAN networks. This simplicity is chiefly due to the fact that the photonic hub-mesh network configuration 23 has replaced the ATM multiplexers at the junction wiring interface (JWI), the SONET rings, the ATM switches at the network edge, and the external WDM multiplexers that would normally be used. The replacement of this equipment leads to simpler provisioning because the IP/MPLS packet router 20 directly communicates through to the access multiplexer at or beyond the jumper wire interface (JWI), the physical demarcation point between the feeder and distribution outside plant cabling, using a photonic network that carries SWDM/DWDM optical signals. Furthermore, since MAC addresses are built into all Ethernet products, IP addresses can be assigned using dynamic host configuration protocol (DHCP). This assignment allows the subscriber to pick an Internet service provider (ISP) via a web page and reduces the risk of security breaches at the MAC layer.

Figure 6:
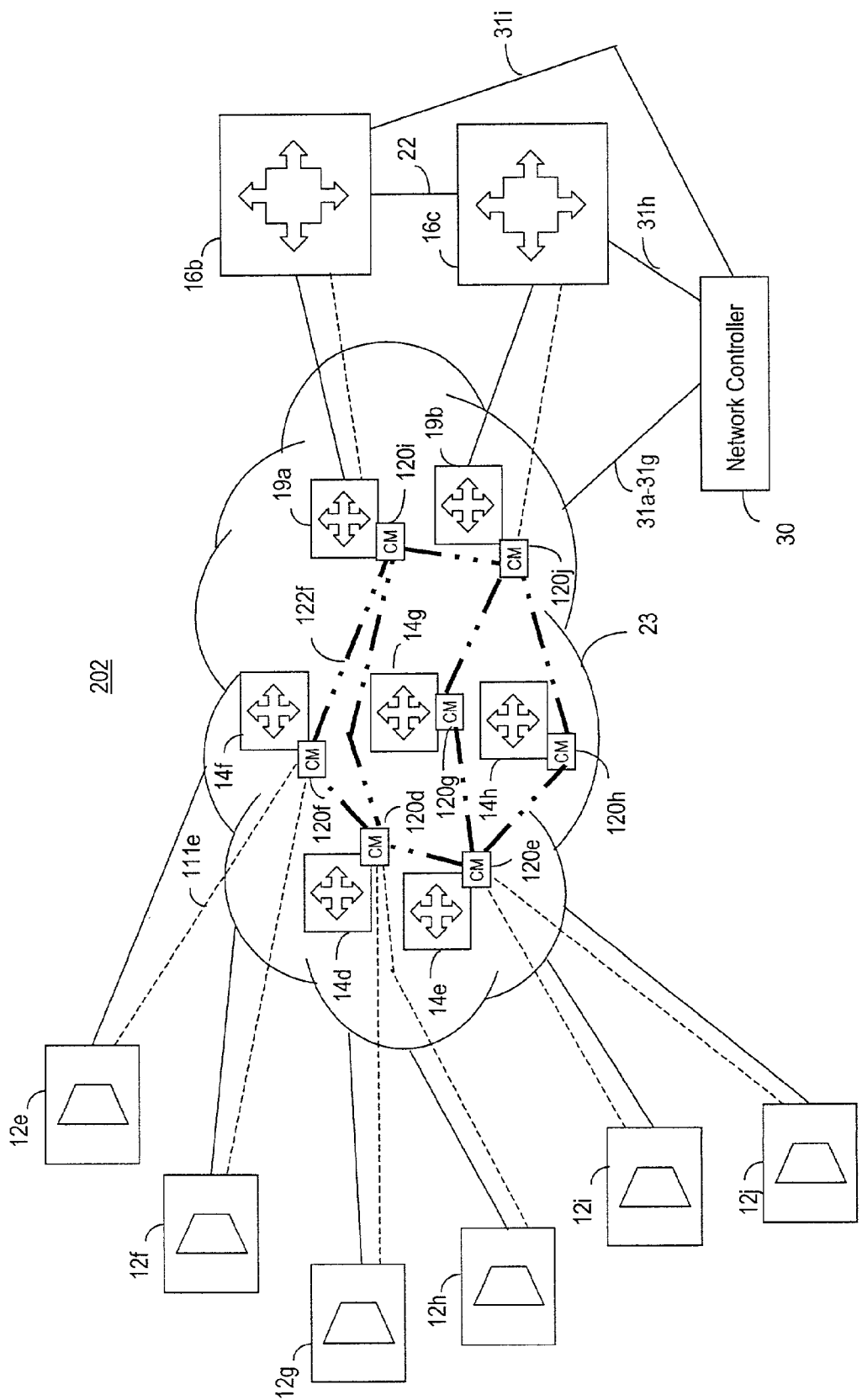
FIG. 6 shows communications control paths in the network of FIG. 5.

FIG. 6 shows the inter-CM communications links, in double-dashed lines, between the CMs 120d to 120g included in respective edge photonic switches 14f to 14h and tandem photonic switches 19a and 19b. These links perform the same functions as the corresponding links between the CM's 120 in FIG. 4, in that they provide the high speed data paths between the CM's to permit the rapid negotiation of path set-up and tear-down. The inter photonic switch transport paths are the same as on FIG. 5, but have been omitted on FIG. 6 for improved clarity.

Figure 7:
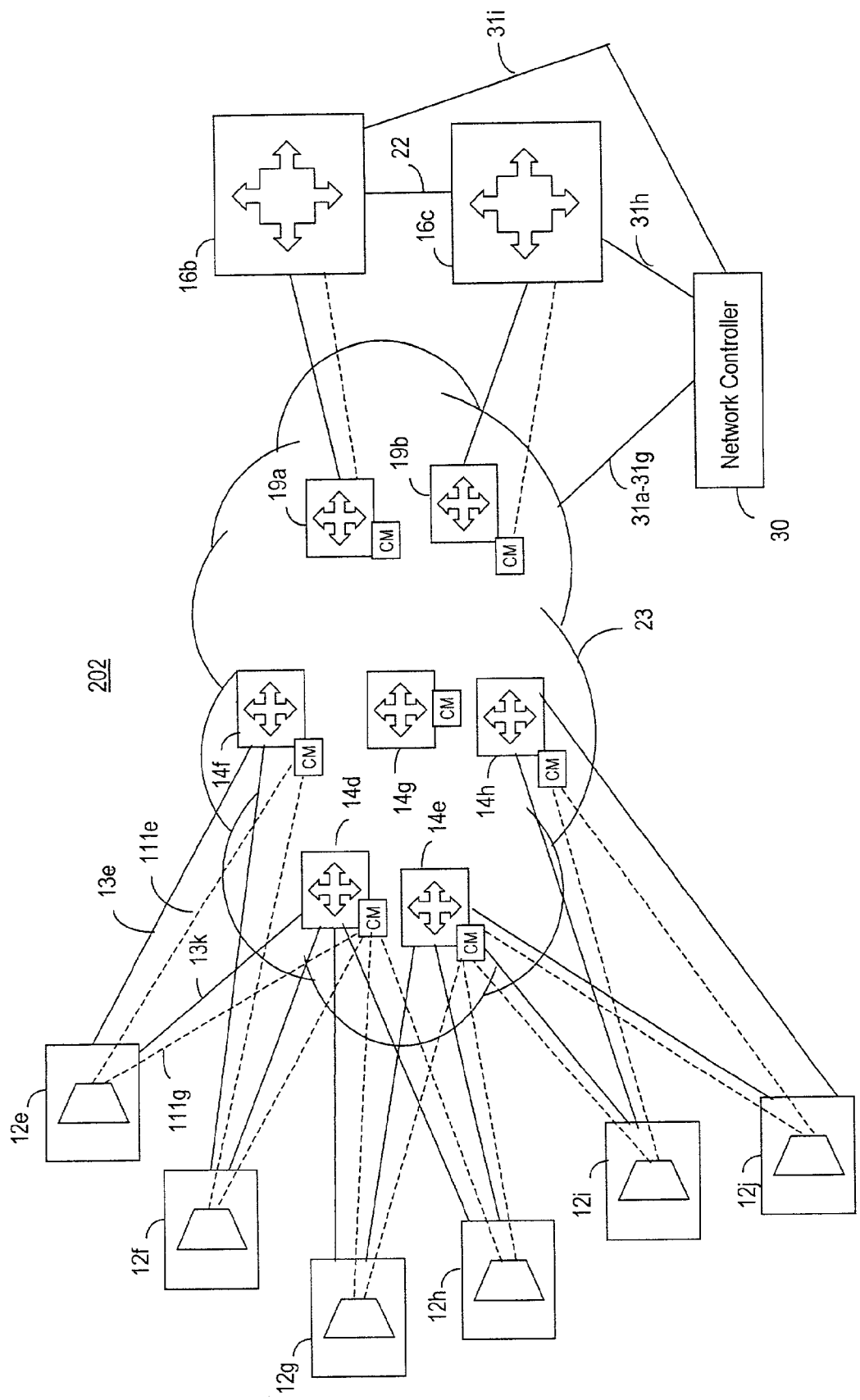
FIG. 7 shows dual homed communications control paths in the network of FIG. 5 in accordance with a third embodiment of the invention.

FIG. 7 shows dual homed communications control paths in the network of FIG. 5 in accordance with a third embodiment of the invention. For example, paths 111e and 111g from the access multiplexer 12e to respective edge photonic switches 14f and 14d are carried by respective links 13e and 13k. Each of the other access multiplexers 12f to 12j have two communications control paths, shown as dashed lines, to the edge photonic switches 14d to 14h. The inter-photonic switch transport paths are the same as on FIG. 5, and the inter-CM communications paths are the same as on FIG. 6. Both have been omitted from this figure to improve clarity.

Figure 8:
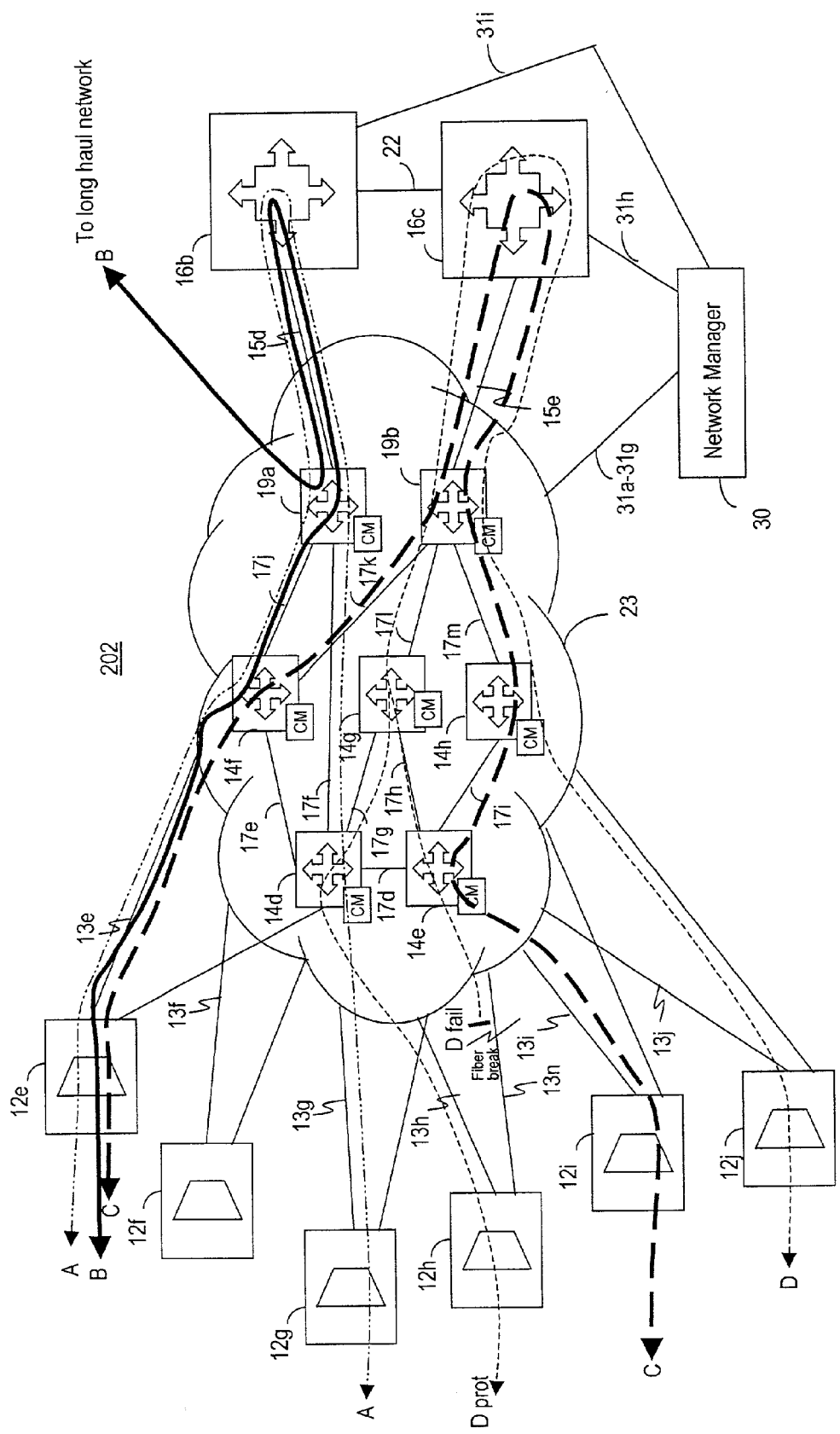
FIG. 8 shows optical carrier paths in the network of FIG. 5.

FIG. 8 shows several examples of optical carrier paths through the network 202 for the cases of Ethernet services being routed in the core node routers. A first example path, labelled: A, is a completely intra-metropolitan area Access Multiplexer-to-Access Multiplexer connection of Ethernet traffic, packet-routed in the router of the core node 16b. This path is shown as a double-dashed line starts at the access multiplexer 12e and traverses the network through edge photonic switch 14f, tandem photonic switch 19a, core node 16b where its core photonic switch routes the carrier back to the tandem photonic switch 19a and on to the access multiplexer 12g through the edge photonic switch 14d. FIG. 8a (to be drawn) shows the transitions across this network path in terms of the network layers utilised at each point.

A second example path, labelled: B is a hybrid-metropolitan area-long haul Access Multiplexer-to-Long Haul connection of Ethernet traffic, packet-routed in the router of the core node 16b. This path is shown as a thick line, follows a similar route as path A, but after being rerouted to the tandem photonic switch 19a, that switch 19a routes the carrier to a long haul network. FIG. 8b (to be drawn) shows the transitions across this network path in terms of the network layers utilised at each point.

A third path, labelled: C is a completely intra-metropolitan area Access Multiplexer-to-Access Multiplexer connection of Ethernet traffic, but packet-routed in the router of the core node 16c, demonstrating that different optical carriers from one Access multiplexer can be homed on to different core nodes, facilitating load sharing between the nodes. This path is shown as a thick, long-dashed line, traverse the network from the access multiplexer 12e to the access multiplexer 12i, via the edge photonic switches 14e, 14f, and 14h, the tandem photonic switch 19b, and the core node 16c. FIG. 8c (to be drawn) shows the transitions across this network path in terms of the network layers utilised at each point.

A fourth path, labelled: D is a completely intra-metropolitan area Access Multiplexer-to-Access Multiplexer connection of Ethernet traffic, packet-routed in the router of the core node 16c, demonstrating the result of protection-switching to recover from a photonic layer failure, in this case a fiber break. This path is and shown as a dashed line, runs between the access multiplexers 12j and 12h, but shows the effect of rerouting at the edge photonic switch 14d because of a fiber break in a link 13n between the access multiplexer 12h and the edge photonic switch 14e. FIG. 8d (to be drawn) shows the transitions across this network path in terms of the network layers utilised at each point.

Referring to FIG. 8a there is graphically illustrated the communications layers corresponding to a path through the network of FIG. 8 from access to core node. As can be seen from the graph of FIG. 8a, other than the Ethernet access portion, the entire traverse from access to core is in the optical domain. The transitions within the optical domain between λ, S-DWDM and DWDM are all effected using passive optical multiplexers and demultiplexers with amplification on a per wavelength or small group of wavelengths basis to offset loses.

Figure 9:
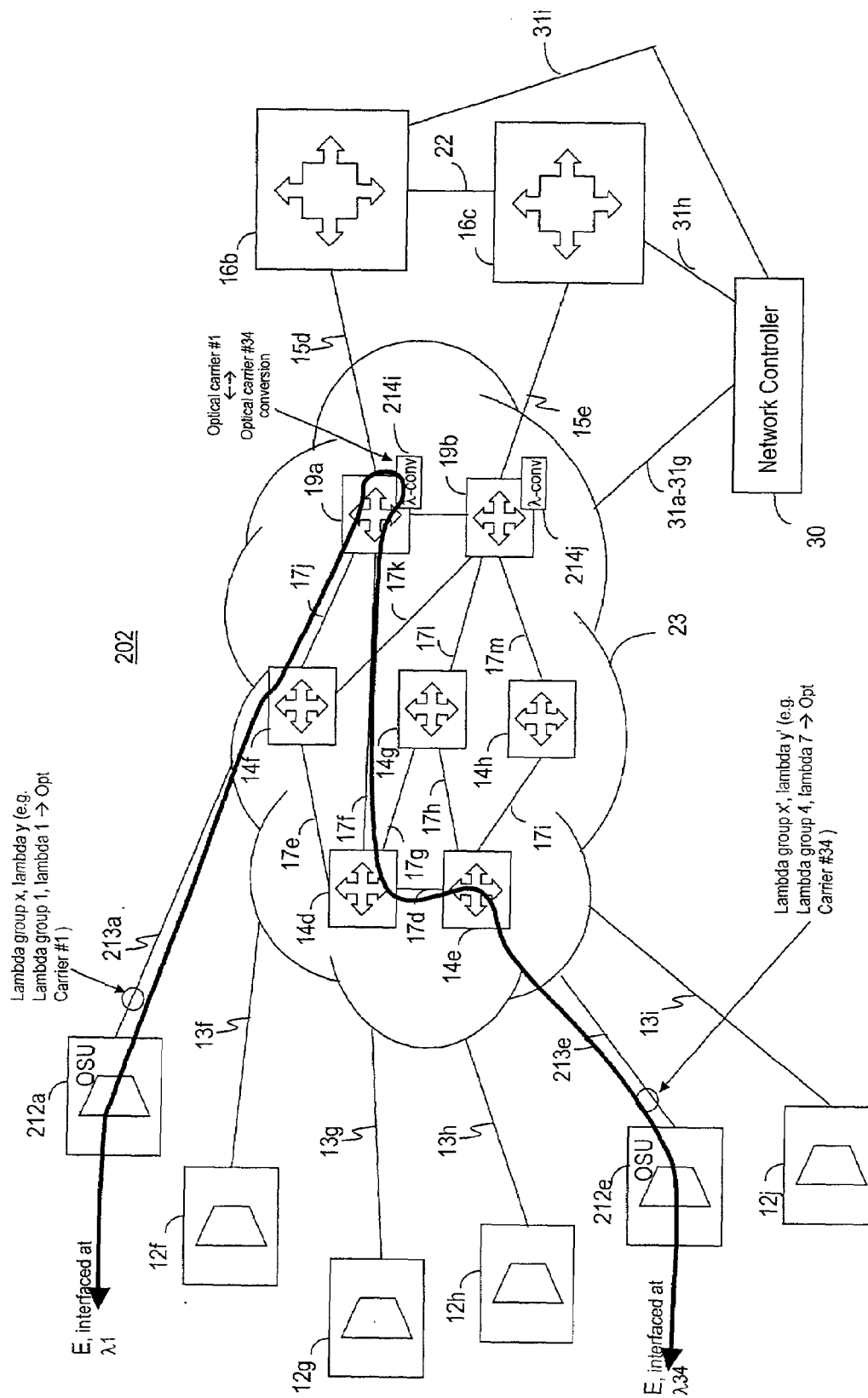
FIG. 9 shows wavelength conversion of optical carriers in the network of FIG. 5.

FIG. 9 shows an optical path, labelled: E, which provides end-to-end potentially protocol/bit-rate independent optical carrier connectivity, between two Optical Service Units that may or may not be operating at the same wavelength, with a single centralised wavelength conversion point that makes use of wavelength conversion capabilities of the tandem photonic switch 19a. The only significant protocol or bit rate constraint occurs in this wavelength converter, which again is placed in a centralized location along with all of the other service/capacity constraining components. This will facilitate the upgrading of this wavelength conversion function from today's largely electro-optic approaches which DO provide at least some bit-rate constraints (but not much in the way of protocol constraints) to an evolving all-optical wavelength conversion approach as this matures. Early experimental all-optical wavelength converters have been reported in the technical press but none are yet mature enough to be adopted. The tandem photonic switch 19a includes a wavelength convertor 214i for this purpose. Such a convertor is known in the art, for example as disclosed in laid-open Canadian application number 2,320,613 entitled "Switch for Optical Signals". The tandem photonic switch 19b also includes a wavelength convertor 214j. The optical carrier following path E starts at the OSU 212a having a particular wavelength λ1, traverse the edge photonic switch 14f to the tandem photonic switch 19a where the carrier is converted to another wavelength λ34, which continues to another OSU 212e via the edge photonic switches 14d and 14e.

Some of the key features of each network node 12, 14, 16, 19 will now be discussed, although the architecture of each node will be discussed later in detail.

The core nodes 16 have approximately 2-40 Tb/s of packet processing capability per node in true broadband networks (those optimised for GbE, 10GE business access, 30-60 Mb/s {transport level} residential access, thereby enabling almost any conceivable service to be delivered), or about $\frac{1}{10}^{th}$ to $\frac{1}{50}^{th}$ of this for evolutionary wideband and bulk narrowband services (ADSL-level residential, 1-150 Mb/s business connections, some GbE). For true broadband the amount of bandwidth required demands a high number of optical carriers, typically best provided by a DWDM structure at the photonic layer, but at the lower bandwidth demands of the evolutionary application and/or lower service uptake, the complexities of DWDM can be forsaken in favour of fiber-level photonic switching and a higher fiber count. This allows DWDM to be held "in reserve" for when (and if) the true ubiquitous broadband applications take off.

Each core node 16 has integrated Ethernet, emulated time division multiplexing (TDM) implemented over IP in the packet router, and wavelength switching capabilities implemented in the associated photonic switch. The input/output (I/O) ports of each core node 16 are nominally 10 Gb/s, preferably using the emerging 10 GE format/protocols, however, optionally some or all I/O ports could be 1 Gb/s, and using the existing 1 GE format and protocols. The packet router 20 of each core node 16 provides integrated content switching and OSI layer 2/3 switching, thereby providing a service gateway aggregation point. The core photonic switch 19 in each core node 16 is adapted to provide agile wavelength routing, wavelength on demand, and ASTN capabilities, via the photonic switching layer's agile optical carrier control structure, e.g. by use of Contract Managers. These capabilities are further enhanced by P-cycle optical protection, which has been developed and disclosed by TR Labs (Cycle-Oriented Distributed Preconfiguration: Ring-like Speed with Mesh-like Capacity for Self-planning Network Restoration—Wayne D. Grover, Demetrious Stamenatelakis, TR Labs, Dept. of Electrical and Computer Engineering, University of Alberta), as a method of pre-establishing protection paths in a ring or mesh network, thereby permitting efficient use of 1:N protection switching. These capabilities allow the core nodes 16 to provide photonic grooming or agile optical carrier switching of the bandwidth of entire optical carriers and statistical multiplexing of low-fill carriers prior to switching. When applied to lambda-switching nothing in P-cycles, WRP/WDP, contract manager etc. directly allows control of statistical multiplexing at the router. However the router, on examination of traffic loads on its incoming, outgoing ports, may determine that the traffic load is compatible with a subset of its wavelengths being statistically multiplexed and may request the agile photonic layer, e.g. Contract Manager, to connect those wavelengths with the low traffic to statistical multiplexer ports on the router instead of straight in ports.

The photonic switches 14 provide photonic (wavelength) connectivity and switching between the core nodes 16 and the access multiplexers 12. Each edge photonic switch 14 can be implemented using one of multiple different switching architectures. The switch architecture used as an illustration here is but one example, being the wavelength plane architecture. In this architecture the size of the switch "M×M" used on each of "N" planes determines the maximum number of DWDM fibers, each of "N" channel DWDM. The overall maximum node throughput is M×N. For 32×32 switches (e.g. projected OMM 2-D MEMS components or Agilent "bubble" switch components) and for 80 channel DWDM, such as is rendered possible simply with components from Lightwave MicroSystems Inc. of San Jose Calif., simple switches can be built up to 32×80=2560×2560 optical carriers. Hence photonic switching technology is capable of switching a total of from 100 up to 2000 wavelength inputs, which are nominally 10 Gb/s (10 GE) or 1 Gb/s (1 GE) modulated optical carriers occupying up to 80 (probably 40 will be more common) different wavelengths in the C or L bands. The size of the node, the number of fibers terminated×the number of wavelengths per fiber, is determined by the traffic requirements for that particular node. The photonic switches 14 enable the provision of wavelength-based VPN services for business subscribers. This is established by the OSU at customer premises "J" requesting a link to customer premises location "K", the request being passed through the OSA at "J" to the local CM. The local CM may request a validity check in the overall services level network manager to ensure that customer premises "J" and customer premises "K" are legitimate nodes on the same VPN or this data may have been pre-downloaded into the Contract Managers. Once the local CM has confirmed the validity of the request, then the rest of the setting up of the end-to-end connection between the two nodes is just the same as for any other agile optical carrier set up process, being, free-path search, potential path resource temporary reservation, best option compute, path set up and unwanted option release and then cut in to service. The entire elapsed time for this process in a metro environment can be reduced to well under a second and possibly as low as 50 milliseconds. Effectively, the photonic switches 14 are non-blocking at the wavelength-level without wavelength conversion, i.e. any "red" carrier input can get to any "red" carrier output, but not to a "blue" carrier output without wavelength conversion, which, in any case would be a useless function without wavelength conversion, since the output DWDM would simply reject red light injected into it's blue port (without which it wouldn't be a very good DWDM since there is likely already red light passing through it from its red port and combining two optical carriers with the same wavelength/colour will destroy the integrity of both of them.). This wavelength conversion function would typically only be provided in the core photonic switches 19 associated with the packet router 20. The edge and core photonic switches 14, 19 can do photonic things like per-lambda level adjustment, to generate the correct spectral powers in a DWDM, S-DWDM feed and may be involved in chromatic dispersion and other optical impairment compensations.

If required, forward error correction (FEC) protection or other means to "ruggedize" the electrical data integrity against impairments in the optical transmission path can be established between the electro-optic interface on the access multiplexers 12 and the electro-optic interface on the packet router 20 or its transponders. FEC is a baseband data manipulation thing prior to, or outside of, the photonic layer, which starts at the modulators and PIN diodes/APDs of the access multiplexers 12 and core data router transponders.

The residential access-nodes 12 in their FTTN, FTTJWI and other hybrid fiber-copper forms provide between 5 to 30 Mb/s, depending on distance, to each residential subscriber over the existing copper loop. One or more access multiplexers 12 are located at a JWI, which provides access to anywhere from 300 to 800 residential copper loops. Any number from 1 to 5 wavelengths (i.e. S-DWDM optical signals) carried over a pair of single mode fibers provides connectivity between the photonic switches 14 and each access multiplexer 12, dependent upon the traffic demand/service level× number of users homing on the Access Multiplexer. For the extreme case of 800 subs, each with 30 Mb/s of dedicated capacity, and dual homing, this leads to the need for 30×800=24 Gb/s of bandwidth=3 optical carrier×two paths for dual homing=6 optical carriers. But this is an extreme pathological case and most applications will require two optical carriers (primary+back-up) for any reasonable conceivable residential application. These wavelengths carry data in the form of either one-gigabit Ethernet (GbE) or 10-gigabit Ethernet (10 GbE) frames. Alternatively to transmitters which each generate their own optical carrier and modulate it, each access multiplexer 12 could have multiple wavelength sources for originating optical carriers and a bank of modulators for modulated the carriers with subscriber data before it is transmitted upstream to one of the photonic switches 14. Precise alignment of the optical carriers in the frequency domain is more readily achievable with a centrally generated, commonly controlled and synchronized plurality of wavelength sources further detailed in filed U.S. application Ser. No. 14041ROUS1P filed concurrently herewith.

The simplicity of the network 2,202 is due to the use of an over-capacity photonic-based transport layer 23 from the edge Ethernet/optical multiplex point (e.g. access multiplexer 12), be it a PON or a hybrid fiber/copper vehicle, back to the Ethernet interfaced core packet switch 16. Since the photonic transport is deliberately massively over-provisioned/over-capacity packet/frame loss rates are low or zero (usually zero), flow control, priority queues other than those associated with the actual flows within the core node router are unnecessary as a consequence of inserting the extreme bandwidth-trucking capability of the photonic layer between the point of Ethernet multiplexing at the access multiplexers 12 and the core nodes 16, in lieu of a limited capacity electro-optic network.

The networks 2,202 are intended to provide a wide range of primarily but not exclusively advanced data services and transport capabilities. The access services visible/accessible to the end users 4 are as follows: standard 10/100 Mps/1GbE attachment; IP packet forwarding based upon Ethernet MAC/VLAN address; prioritized traffic with different classes of service; web based provisioning system (bandwidth, location); performance, utilization, and event reports; billing services; security services; legacy service encapsulation; redundant connectivity; and service guarantees. The above access services are enabled by an interaction between core data services and photonic network services. The core data services are: point-to-point connections; point-to-multipoint connections; multipoint-to-multipoint connections; IP/MPLS routing; VLAN; and Data-VPN (as opposed to the lambda-VPN service mentioned earlier) services. These are all implemented by known prior-art methods as far as the Access Multiplexer, Core Node router and layer 3 control are concerned, but the resultant performance achieved is the same as if the Access Multiplexers were co-located with the core router, and not connected to it via a (up to 200 km long) transport network. The photonic and network services are: point-to-point connections; standard 10 GbE attachment; wavelength allocation/trading; photonic provisioning system (wavelength, location); overlay, peer-to-peer, & augmented services; leased wavelength; optical VPN. All of these are implemented in a similar way to the optical VPN described earlier, but with different service admission filters, prior to the Contract Manager determining the route across the photonic network. Note that the clients for the photonic services are both the end-user 4 directly, and the core nodes 16.

Referring to FIG. 9*a*, there is graphically illustrated the communications layers corresponding to a path through the network of FIG. 9 from access to access providing λ based transport on a network provisioned for non-blocking connectivity or controlled-level blocking connectivity (traffic engineered) from access to core, dependent upon how much core resource is to be provisioned.

Referring to FIG. 9*b*, there is graphically illustrated the communications layers corresponding to a path through the network of FIG. 9 from access to access providing λ based transport on a network provisioned for non-blocking connectivity or controlled-level blocking connectivity (traffic engineered) from access to core, dependent upon how much core resource is to be provisioned.

Figure 1D:
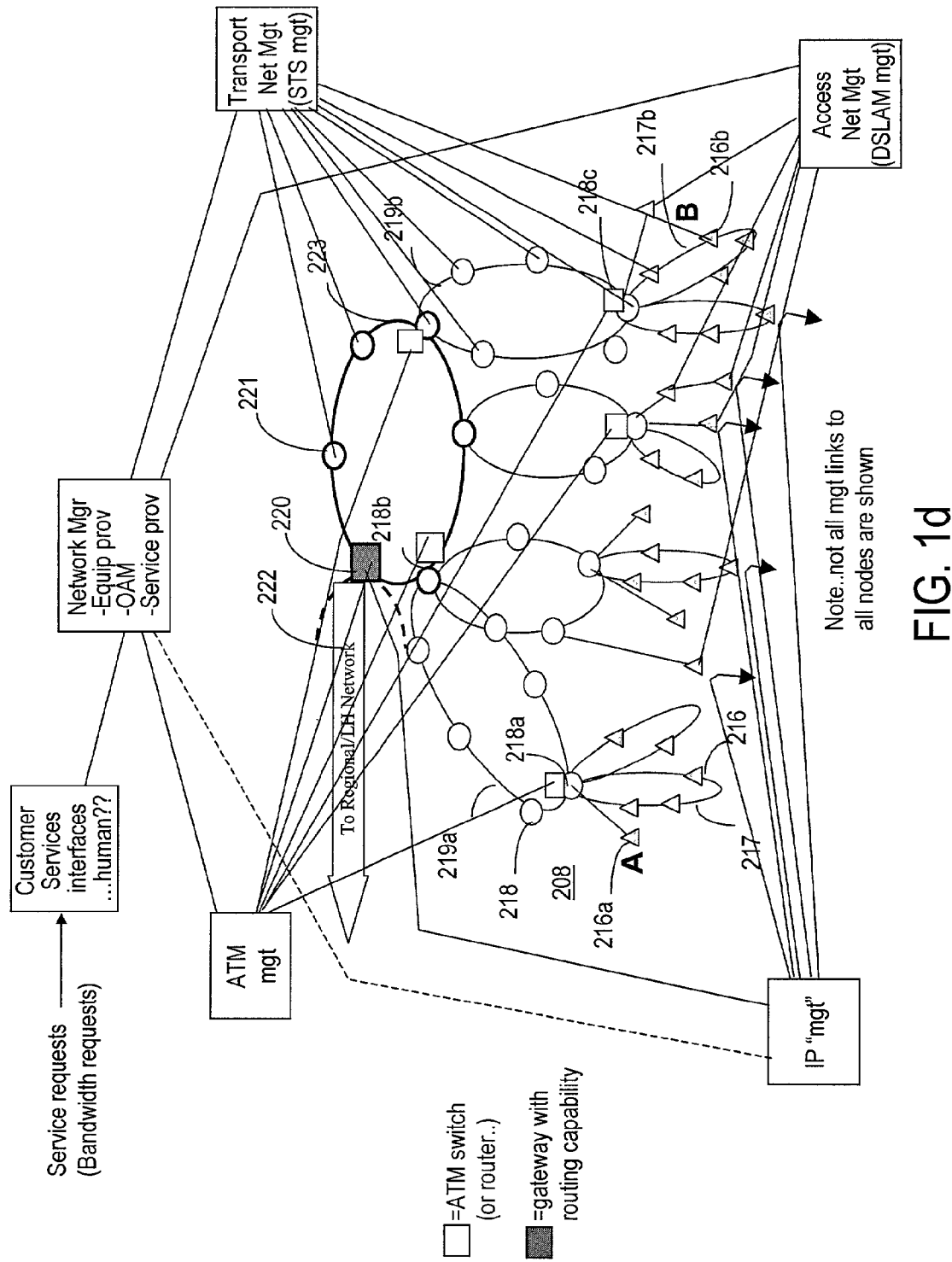
FIG. 1d shows the network of FIG. 1a with the addition of network managements.
Figures 2, 2A:
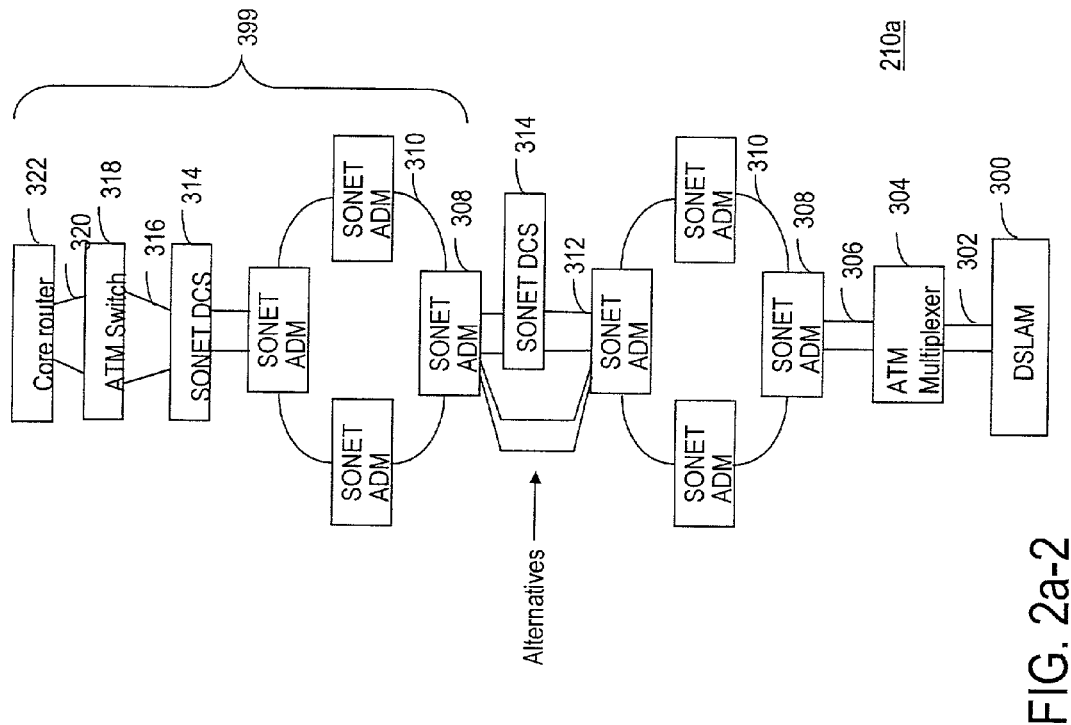
FIGS. 2a, 2b are diagrams of a portion of a prior art metro access network, comprising the path from a DSLAM through to one core network data router in a median complexity network such as that of FIG. 1b.
Figures 1, 2A:
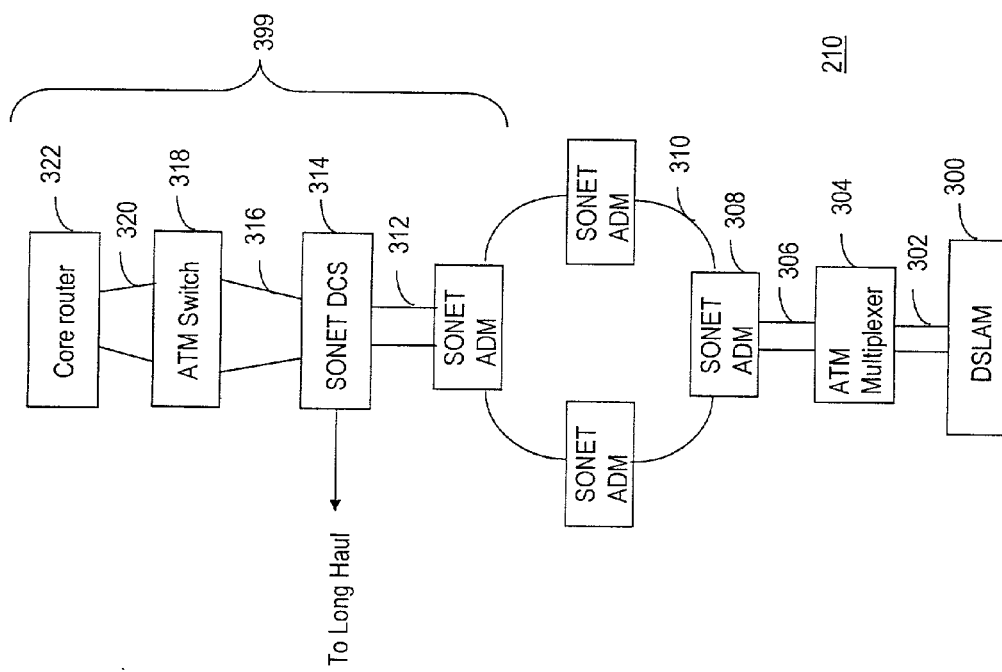
Figures 2, 2B:
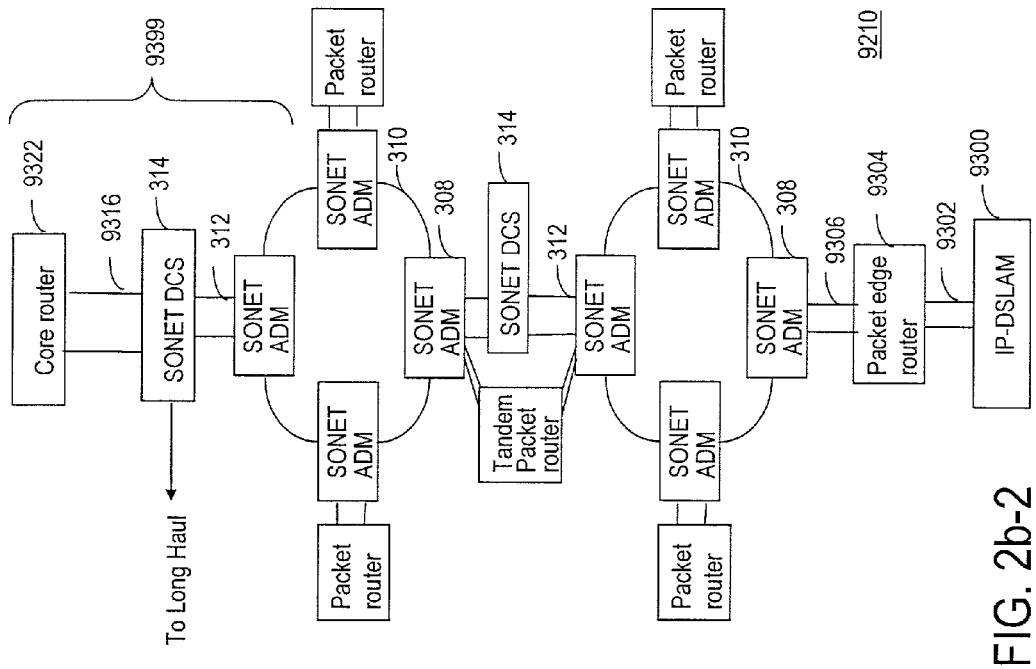
Figures 1, 2B:
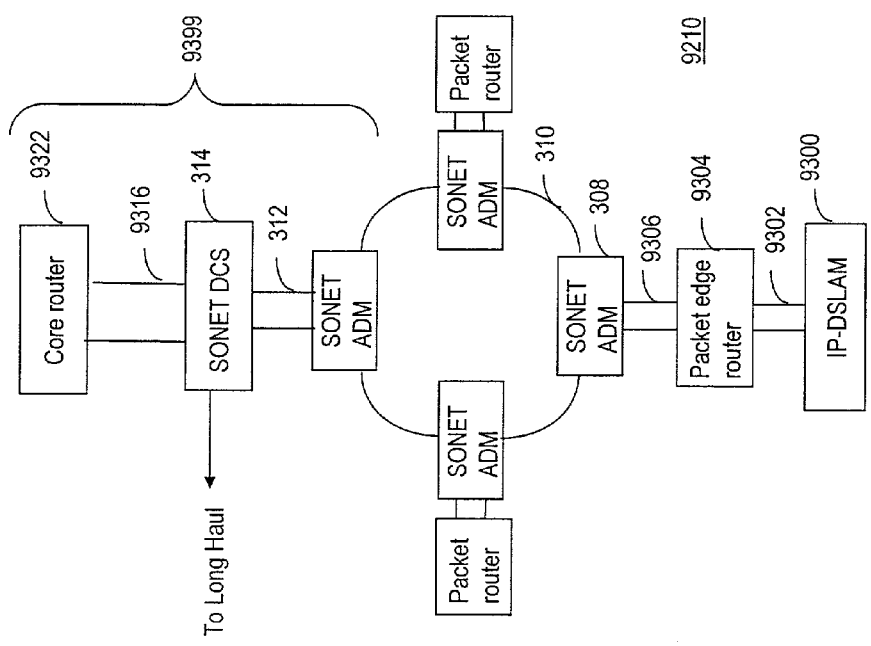
Figure 2C:
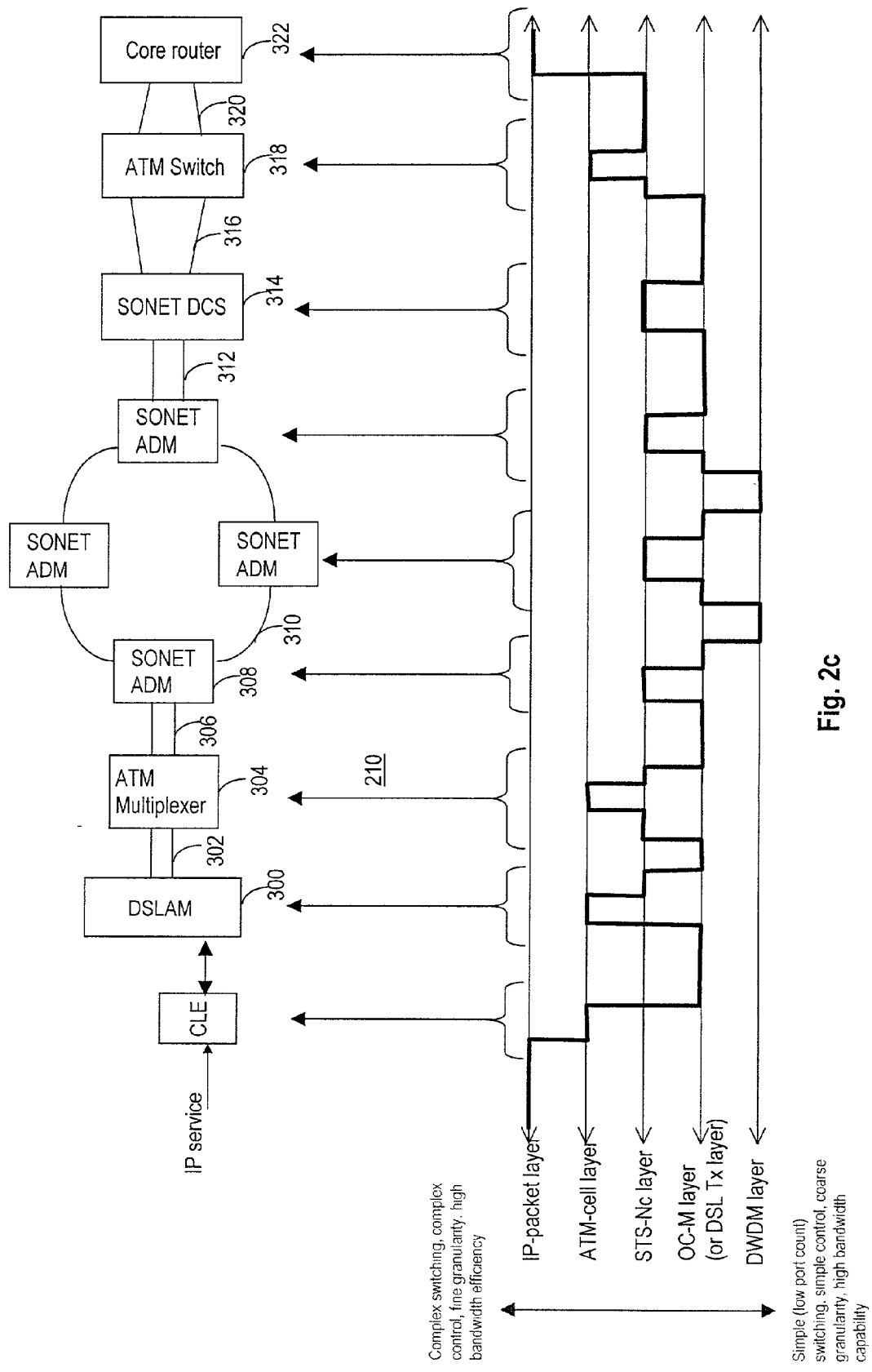
FIGS. 2c, 2d show the management structures that overlay the networks of FIGS. 2a, 2b respectively.
Figure 2D:
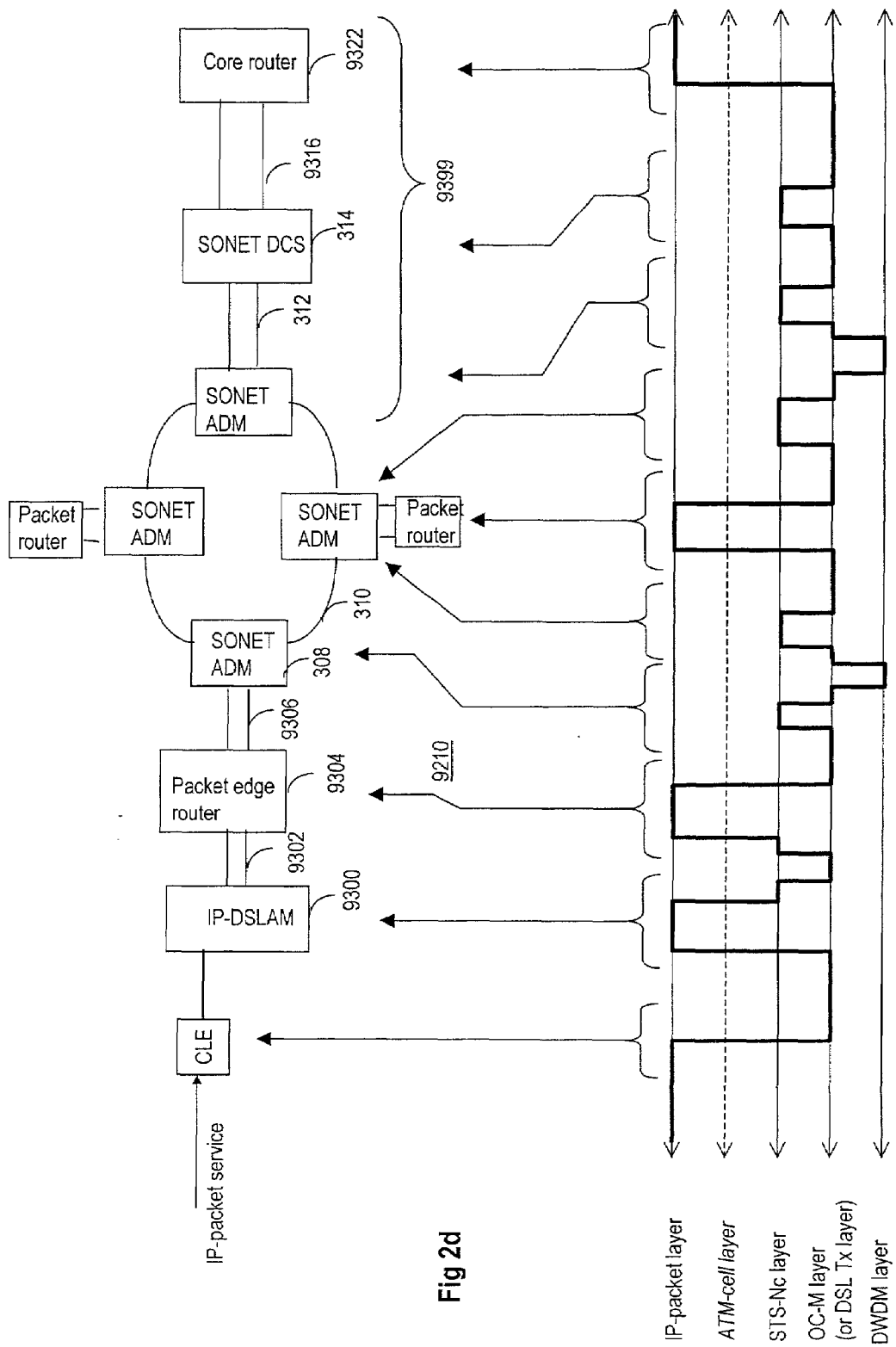
Figure 2E:
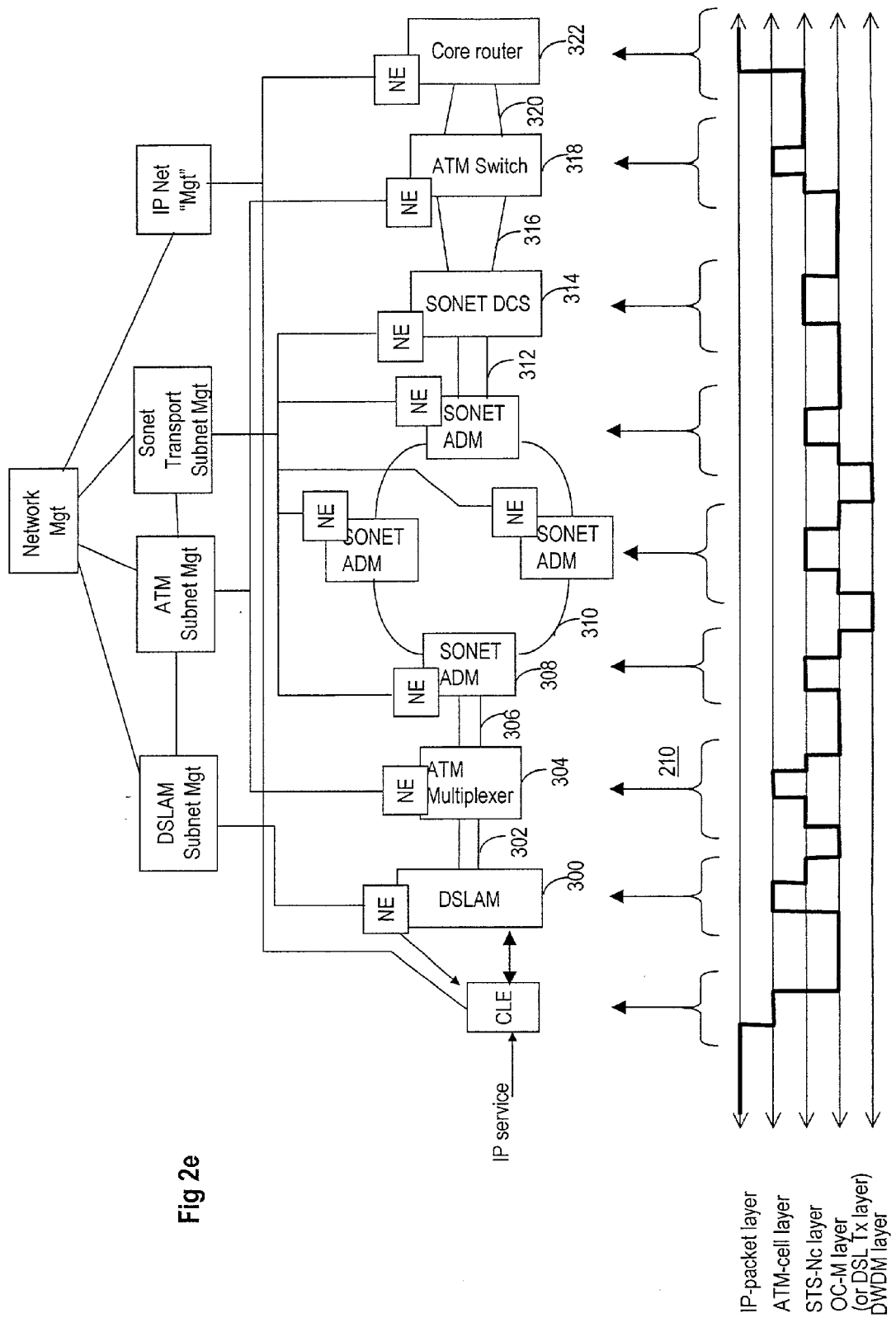
FIGS. 2e, 2f show the transitions between each of the layers of the network as the traffic transits the paths of FIGS. 2a, 2b respectively.
Figure 2F:
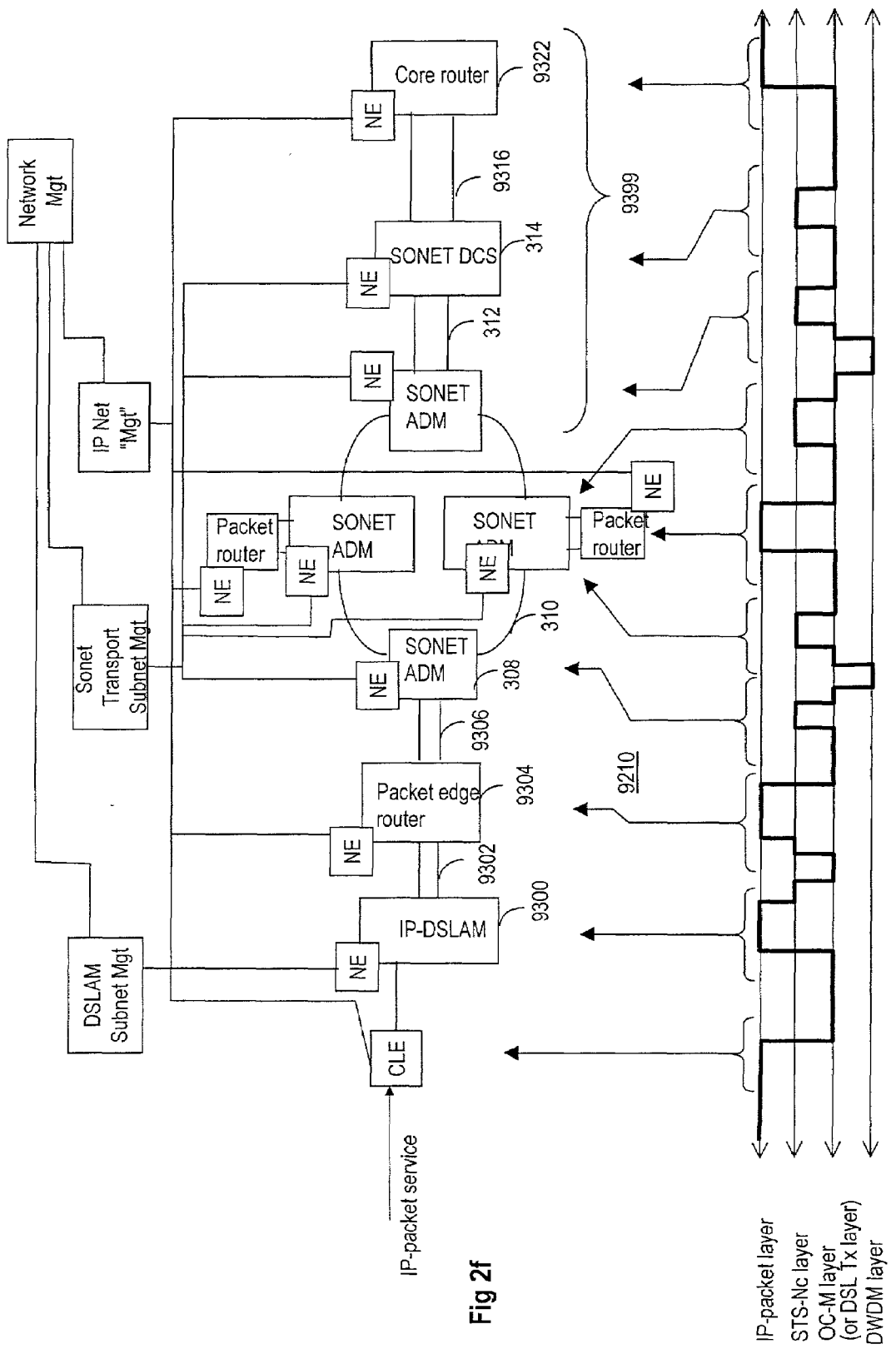

In FIG. 9*b* the wavelength conversion is carried out in the optical domain. FIGS. 8*a*, 9*a* and 9*b*, show the dramatic saving in complexity of the metropolitan photonic network compared to that of FIGS. 2*c*, *d*, *e*, and *f*. While in the prior art networks, the path consists of very little optical domain links and many EIU/F conversion stages, the embodiments of FIGS. 8*a*, 9*a* and 9*b* show that most links are in the optical domain.

Figure 10:
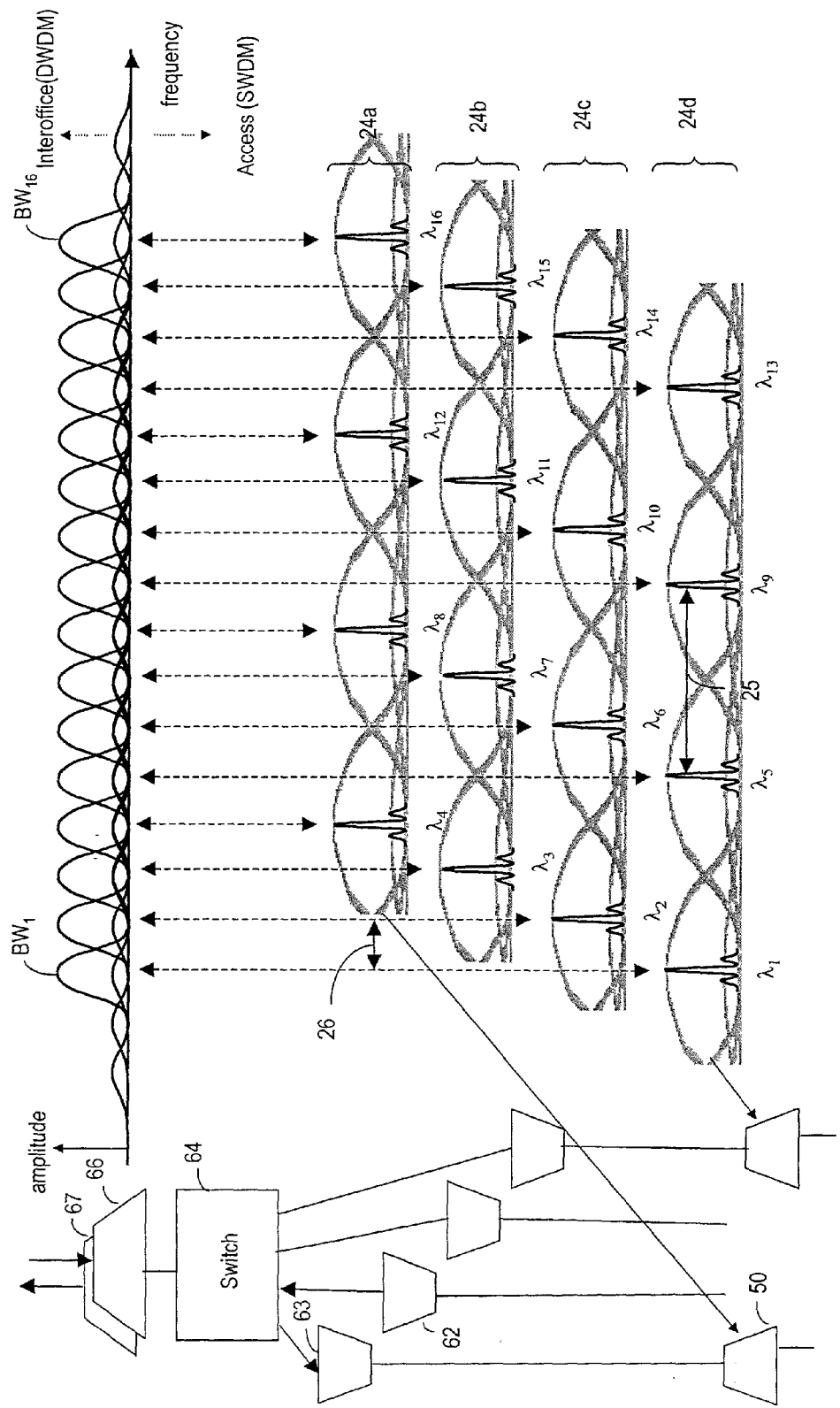
FIG. 10 is a diagram showing a portion of a first wavelength assignment plan usable for any of the above networks.

FIG. 10*a* diagram showing a portion of the wavelength assignment plan of the network 202 of FIG. 5. An edge photonic switch DWDM multiplexer 67 and DWDM demultiplexer 66 as well as photonic switch planes 64 are shown at the side of the figure for references. These components will be explained in more detail later with reference to FIG. 12. Furthermore, an SWDM multiplexer 63 and SWDM demultiplexer 62 of an edge photonic switch as well as an SWDM demultiplexer 50 from an access multiplexer are shown in the figure for reference, and will likewise be explained in detail later with reference to FIG. 12. A first set of wavelengths 24*a* consisting of the wavelengths λ4,λ8,λ12, and λ16 are generated by the access multiplexer 12*a*. A portion of the first set 24*a* (e.g. the wavelengths λ4, λ8 and λ12) is for downstream transmission of data to the access multiplexer 12*a*. The remaining wavelength λ16 of the first set 24*a* is for a stream transmission to the edge photonic switch 14*a* after being modulated by subscriber data. Similarly, three other sets of wavelengths 24*b*, 24*c*, and 24*d*, each consists of four wavelengths. Specifically, the second set 24*b* consists of the wavelengths λ3, λ7, λ11, and λ15; the third sets 24*c* consists of the wavelengths λ2, λ6, λ10, and λ14, and the fourth set 24*d* consists of the wavelengths λ1, λ5, λ9, and λ13. The spacing in frequency between wavelengths of any one set (e.g. 24*a* to 24*d*) is the same for all wavelengths. This spacing is 400 GHz in this embodiment, and the spacing is referred to as S-DWDM spacing 25. The spacing in frequency between adjacent wavelengths is the same for all wavelengths. This spacing is 100 GHz in this embodiment, and this spacing is referred to as DWDM spacing 26. FIG. 10 further shows the mapping of the wavelengths, λ1 to λ16, on the access side (S-DWDM) of the photonic switches 14 into passbands BW1 to BW16 on the interoffice (DWDM) side of the photonic switches 14. This mapping requires accurate wavelength sources so that each wavelength, λ1 to λ16, is in the approximate center of its respective passband, BW1 to BW16, thereby preventing undue attenuation by a wavelength filters and providing sufficient guard bands between the wavelengths. The purpose of mapping DWDM into multiple S-DWDM structures is two-fold, being:

To taper the per fiber capacity to a scaling more appropriate for the access, where a lower aggregate capacity may be required. The level of S-DWDM scaling can be adjusted to match the needs of the outside plant and hence the 1:4 scaling shown here is illustrative. The S-DWDM/DWDM approach allows one DWDM fiber to feed multiple fully load fed access fibers, providing a fiber consolidation function that is compatible with photonic switching, giving a 1:# fiber count gain, where # is the ratio of S-DWDM wavelengths per fiber to DWDM wavelengths per fiber. In addition for sub-populated S-DWDM feeds (dark access wavelengths) the photonic switch can be used to provide further concentration, across the entire S-DWDM access/DWDM trunk resources. For example, if only one third of the S-DWDM wavelengths are illuminated then the 4:1 fiber gain of moving from a 40 channel DWDM to a 10 channel S-DWDM can be compounded with an up to 3:1 fiber gain due to ending the dark access fibers at the switch and not propagating them onwards. This 3:1 value has to be modified, due to the need for providing excess capacity for this network to be agile into, as described earlier, but that value is typically ±30%, so, if we assume an excessive ±50% this would reduce the 3:1 savings down to 2:1, for a combined access fiber to core fiber ratio of 8:1 for the case of 1/3$^{rd}$ filled 10 ch S-DWDM access impinging on a photonic switch with 40 ch DWDM. Diverse routing capabilities would further reduce this somewhat, of course.

To provide low cost, non temperature-controlled components in the access plant. The access environment is the most hostile of all environmentally, with outside plant located equipment and relatively uncontrolled environment customer premises equipment. Very precise, close spaced filtering and other optical functions require a benign environment denied them in the access plant. So, instead of exporting a high quality environment into the access (by introducing thermal stabilization, etc.) the proposed approach is to remove the high precision devices from the access. This can be done in S-DWDM by changing the channel spacing by the de-interleaving of the DWDM signal to provide such a broad channel spacing (400 GHz-1 THz) that a thermal low cost low precision optical filters and demultiplexers can be used, and by removing the need for a precise optical carrier to be generated on the customer premises. Because the optical carrier entering the network has to be very precise in optical frequency in order to pass through the optical switch and align (in the frequency domain) with the trunk-side DWDM filters, the requirement for a high precision optical carrier cannot be eliminated. But the requirement for that carrier to be generated in the outside plant and/or customer premises can be eliminated, by the simple process of generating that optical carrier at a benign environment central location, in this case the edge photonic switch, and then distributing it out to the required customer premises or outside plant access multiplexer.

Figure 11:
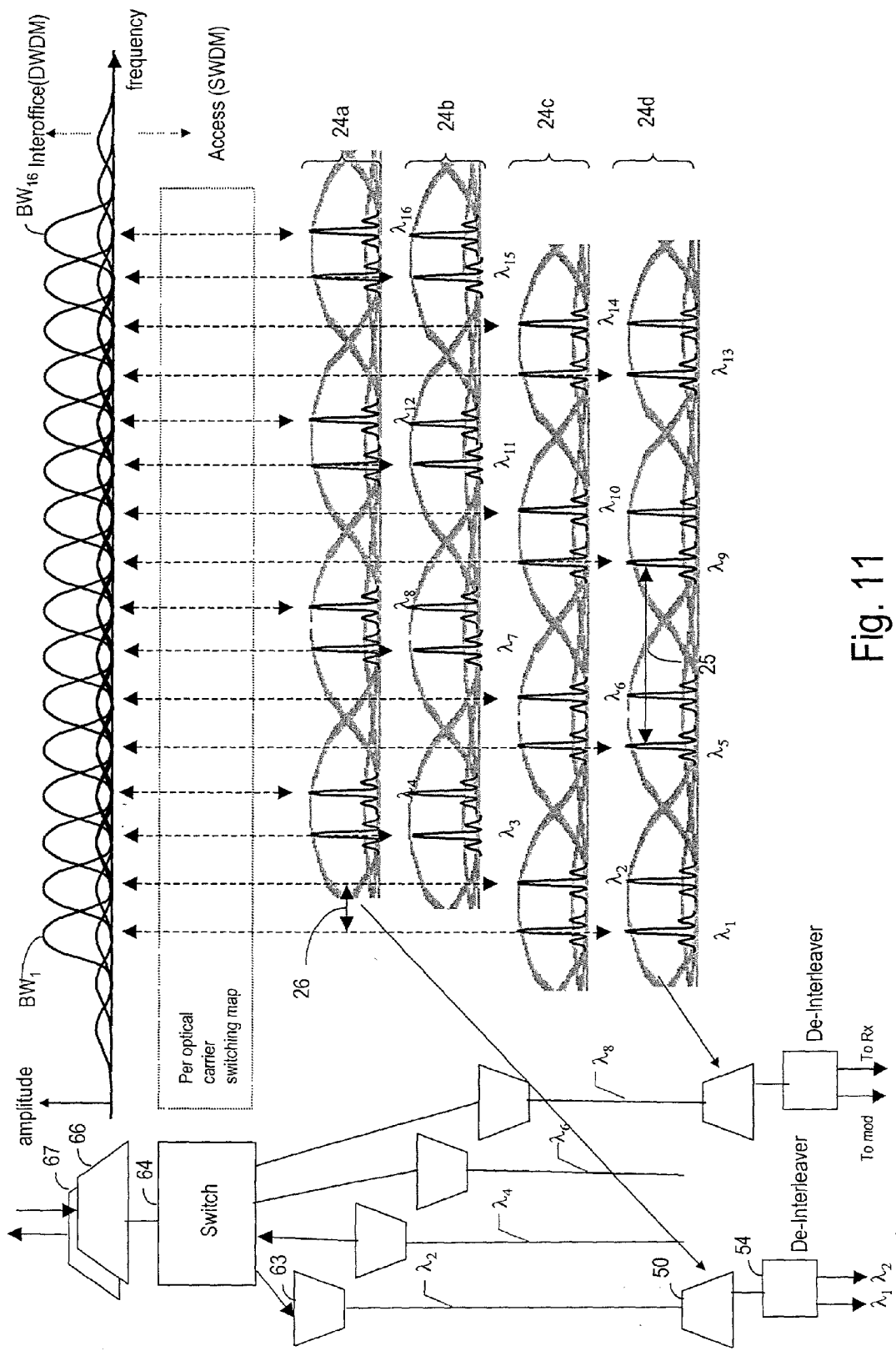
FIG. 11 is a diagram showing a portion of a second wavelength assignment plan usable for any of the above networks.

FIG. 11 shows an alternative wavelength assignment plan with reference to an interleaver 54 which would be included in the access multiplexers 12 using this wavelength assignment plan. In this plan, wavelength adjacent unmodulated optical carriers are inserted into the optical path to the access multiplexers 12. For example in group 24a, the unmodulated carrier at wavelength λ2 is inserted in the path carrying carrier at wavelength λ1. This shows the mapping of both a downstream data-modulated optical carrier from the far side of the network, and the injection (from a multi-lambda source at the photonic switch site) of an unmodulated optical carrier, which is propagated down to the Access Multiplexer or similar OSP/CLE/CPE function, to provide the optical carrier into the upstream modulator, thereby producing an upstream data-modulated optical carrier which is then propagated back to the switch and on to the far side of the network.

Figure 12:
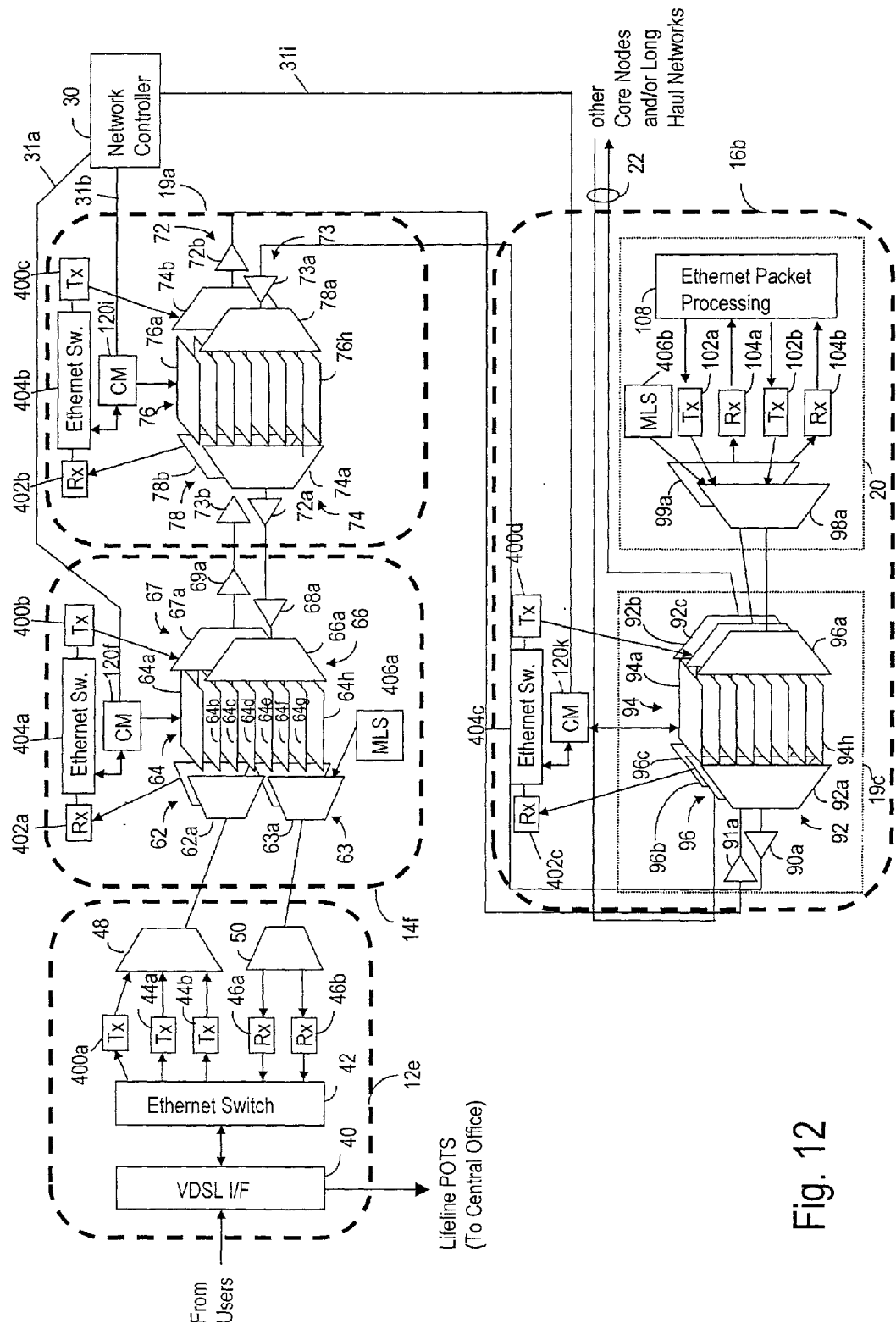
FIG. 12 is a schematic diagram showing a portion of the network of FIG. 5 in more detail.

FIG. 12 is a schematic diagram of a portion of the network of FIG. 5 showing an example of wavelength flow through the network. A portion of the network 202 depicted in FIG. 12 consists of the following a network nodes: the access multiplexer 12a, the edge photonic switch 14f, the tandem photonic switch 19a, and the core node 16b. These network nodes are connected together by fiber-optic cables as previously described. Before discussing the flow of wavelengths through this portion of the network 202, some more details of each of the network nodes will be provided.

The access multiplexer 12a includes a VDSL interface 40 coupled between subscriber loops 5 and an Ethernet switch 42. The Ethernet switch 42 it is coupled to a pair of optical transmitters (Tx), 44a and 44b, for upstream transmission of data and a pair of optical receivers, 46a and 46b, for receiving data transmitted downstream to the access multiplexer 12a. The transmitters 44a and 44b generate the optical carriers for upstream transmission, described previously with respect to FIG. 10, and modulate these carriers with subscriber data in the form of 10 GbE frames. The transmitters 44a and 44b are coupled to a S-DWDM multiplexer 48, which multiplexes the modulated carriers before they are transmitted to the edge photonic switch 14a. The receivers 46a and 46b are coupled to a S-DWDM demultiplexer 50, which the demultiplexes S-DWDM optical signals received from the edge photonic switch 14a. A 1310 nm optical transmitter 400a receives control information from the Ethernet switch 42 (e.g. user requests for more bandwidth) and transmits this information on a 1310 nm optical carrier to the S-D WDM multiplexer 48 for inclusion in the traffic flowing to the edge photonic switch 14f.

The edge photonic switch 14f includes a plurality of S-DWDM demultiplexers 62, of which one demultiplexer 62a is shown, and a plurality of S-DWDM multiplexers 63, of which one multiplexer 63a is shown. The S-DWDM multiplexers 63 and S-DWDM demultiplexers 62 are each coupled between a respective S-DWDM I/O port and a portion of a layered photonic switching core comprised of switches 64a to 64h. Each of the switches 64 is connected to the S-DWDM multiplexers 63 and S-DWDM demultiplexers 62 such that each switch, 64a to 64h, switches optical signals of the same wavelength. In FIG. 12 the demultiplexer 62a is shown coupled to the switches 64a to 64d and the multiplexer 63a is shown coupled to the switches 64e to 64h. The switches 64 are coupled to a plurality of DWDM multiplexers 67, of which one multiplexer 67a is shown, and a plurality of DWDM demultiplexers 66, of which one demultiplexer 66a is shown. The multiplexers 67 and demultiplexers 66 are each coupled to a DWDM I/O port of the edge photonic switch 14a through respective optical amplifiers. In FIG. 12 the multiplexer 67a is shown coupled to an optical amplifier 69a and the demultiplexer 66a is shown coupled to an optical amplifier 68a. The optical amplifiers 68a and 69a are each coupled to respective DWDM I/O ports and may have different gain and other characteristics as required for driving optical signals into, or out from, the edge photonic switch 14a.

The edge photonic switch 14f also includes a 1310 nm receiver 402a coupled to an Ethernet switch 404a for receiving control information from the access multiplexer 12e and switching it to the CM 120f. The CM 120f is coupled to the switches 64 and can configure optical paths based on communications received from other CMs. The CM 120f sends control information to other CMs via the Ethernet switch 404a which is connected to a 1310 nm optical transmitter 400b. The receiver 402a and transmitter 400b are coupled to high band/low band coarse WDM filters (1310/1500 nm WDM) in series with the S-DWDM demultiplexer 62a and DWDM multiplexer 67a, respectively.

The edge photonic switch 14f also includes a multi-lambda source (MLS) 406a for generating the unmodulated optical carriers that are sent to the access multiplexers 12 in the case that a wavelength assignment plan according to that described with reference to FIG. 11 is used.

The tandem photonic switch 19a includes a plurality of optical amplifiers 72, two amplifiers 72a and 72b of which are shown. Each optical amplifier 72 is coupled between an I/O port of the switch and a respective DWDM multiplexer 74. The optical amplifiers 72a and 72b are coupled to DWDM multiplexers 74a and 74b, respectively. The multiplexers 74 are each coupled to a plurality of switches 76a to 76h adapted to photonically switch optical signals, in a like manner to the switches 64 in the edge photonic switch 14a. The plurality of switches 76 is coupled to a plurality of demultiplexers 78, of which two are shown 78a and 78b. The demultiplexers 78 are also coupled to a plurality of optical amplifiers 73, two amplifiers 73a and 73b of which are shown coupled to the demultiplexers 78a and 78b, respectively. Each optical amplifier 73 is coupled between an I/O port of the switch and a respective DWDM demultiplexer 78. The first core photonic switch 19a receives DWDM optical signals at its I/O ports, amplifies and demultiplexes these signals into their constituent optical wavelengths, individually switches each wavelength to an appropriate multiplexer, and optically amplifies the multiplexed DWDM optical signals for transmission from an I/O port.

The tandem photonic switch 19a includes a 1310 nm optical receiver 402b, an Ethernet switch 404b, a 1310 nm optical transmitter 400c connected together and for the same purpose as the corresponding components in the access multiplexer 14f, however in this case the optical receiver 402b is coupled to a coarse WDM in series with DWDM demultiplexer 78b.

The core node 16a includes the core photonic switch 19, and the packet router 20. The core node 16a has DWDM I/O ports coupled to the core photonic switch 19c. The core photonic switch 19c also has a DWDM interface coupling it to the packet router 20.

The core photonic switch 19c of the core node 16a is identical in structure to the tandem photonic switch 19a previously described. However, components in the core photonic switch 19c with the same functionality as corresponding components in the tandem photonic switch 19a have been given different reference characters to indicate that these components may have a different specifications (e.g. dimensioning of the optical switches, gain of the optical amplifiers, tolerances of the multiplexers/demultiplexers, etc.) and also to facilitate the description of wavelength flow through the portion of the network 202.

The core photonic switch 19c includes a plurality of switches 94, a plurality of multiplexers 92, and a plurality of demultiplexers 96. The core photonic switch 19c has a demultiplexer 96a coupled between the DWDM interface to the packet router 20 and the optical switch matrices 94a to 94h. A multiplexer 92a is coupled between the optical switch matrices 94 and an optical amplifier 90a, which is coupled to a DWDM I/O port of the core photonic switch 19c. Similarly, an optical amplifier 91a is coupled between a DWDM I/O port and the demultiplexer 96b. The demultiplexer 96b is coupled to the optical switch matrices 94. Another multiplexer 92b is coupled between the optical switch matrices 94 and the DWDM interface to the packet router 20. Additionally, other multiplexers 92 and demultiplexers 96, for instance multiplexer 92c and the multiplexer 96c, are coupled to two other core nodes 16 and/or long haul networks via links 22.

The core photonic switch 19c includes a 1310 nm optical receiver 402c, an Ethernet switch 404b, a 1310 nm optical transmitter 400d connected together and for the same purpose as the corresponding components in the tandem photonic switch 19a.

The packet router 20 includes an Ethernet packet processor 108 which receives Ethernet frames from a plurality of receivers, two of which receivers 104a and 104b are shown. The receivers 104a and 104b are each coupled to a demultiplexer 99a, which is in turn coupled to the DWDM interface to the core photonic switch 19c. Transmitters 102a and 102b, which are coupled to the Ethernet packet processor 108, generate and modulate the optical carriers. These carriers are generated with wavelength that are in accordance with the wavelength plan of FIG. 10 and are modulated by user data provided in Ethernet frames by the Ethernet packet processor 108. A multiplexer 98a coupled to the transmitters 102a and 102b receives their modulated optical signals and multiplexes them into a DWDM optical signal for transmission on the DWDM interface to the core photonic switch 19c.

The packet router 20 also includes a multi-lambda source (MLS) 406b for generating the unmodulated optical carriers that are sent to the access multiplexers 12 in the case that a wavelength assignment plan according to that described with reference to FIG. 10 is used.

Figure 13:
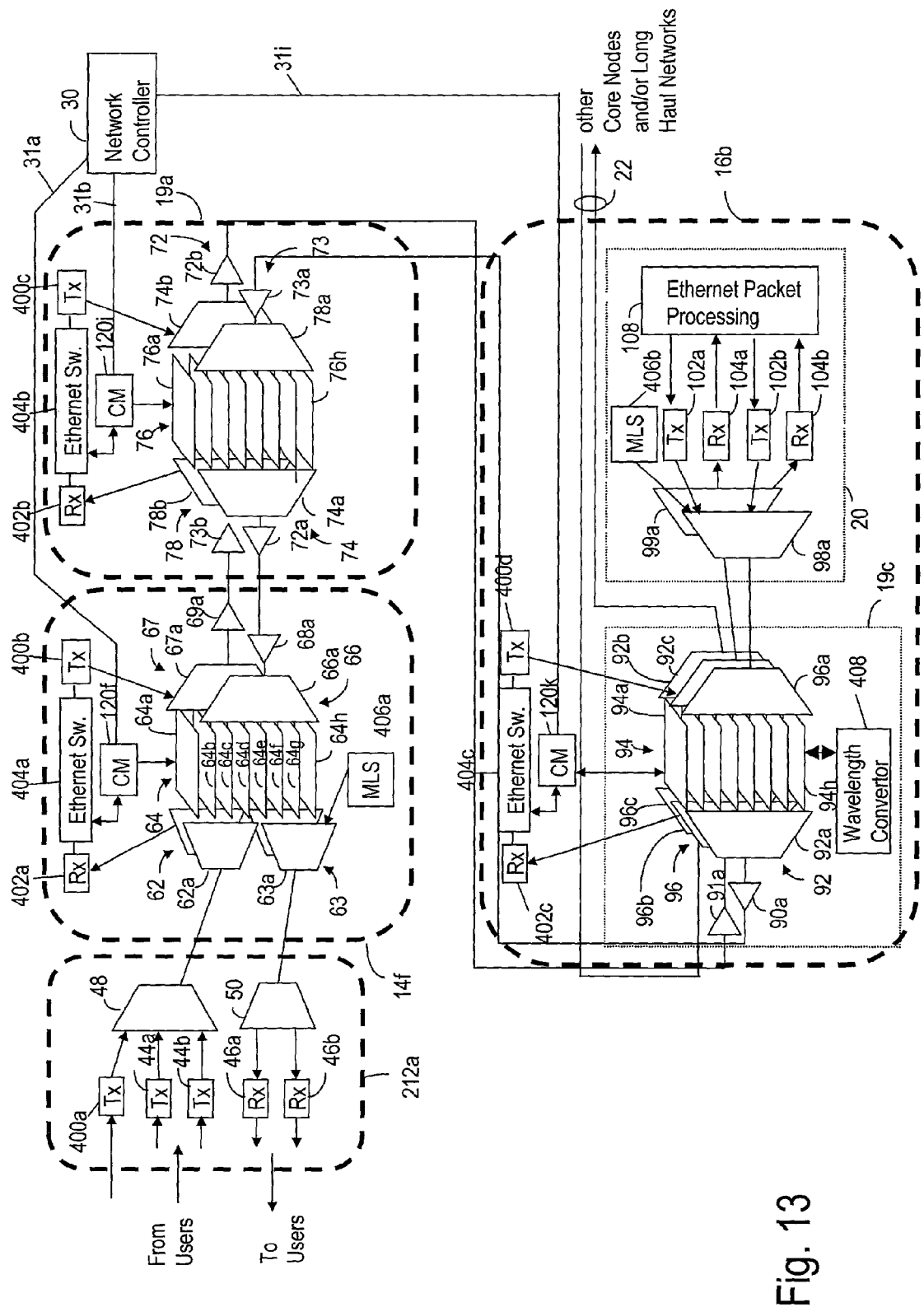
FIG. 13 shows example photonic services in the network portion of FIG. 12.

FIG. 13 shows the same portion of the network as FIG. 12 except the access multiplexer has been replaced by the OSU 212a to provide direct wavelength optical services to an end user. The OSU 212a has the same receiver/transmitter and multiplexer/demultiplexer configurations as the access multiplexer 12e, but does not include the VDSL interface 40 or the Ethernet switch 42 since the OSU 212a provides an optical interface to the end user.

Figure 14:
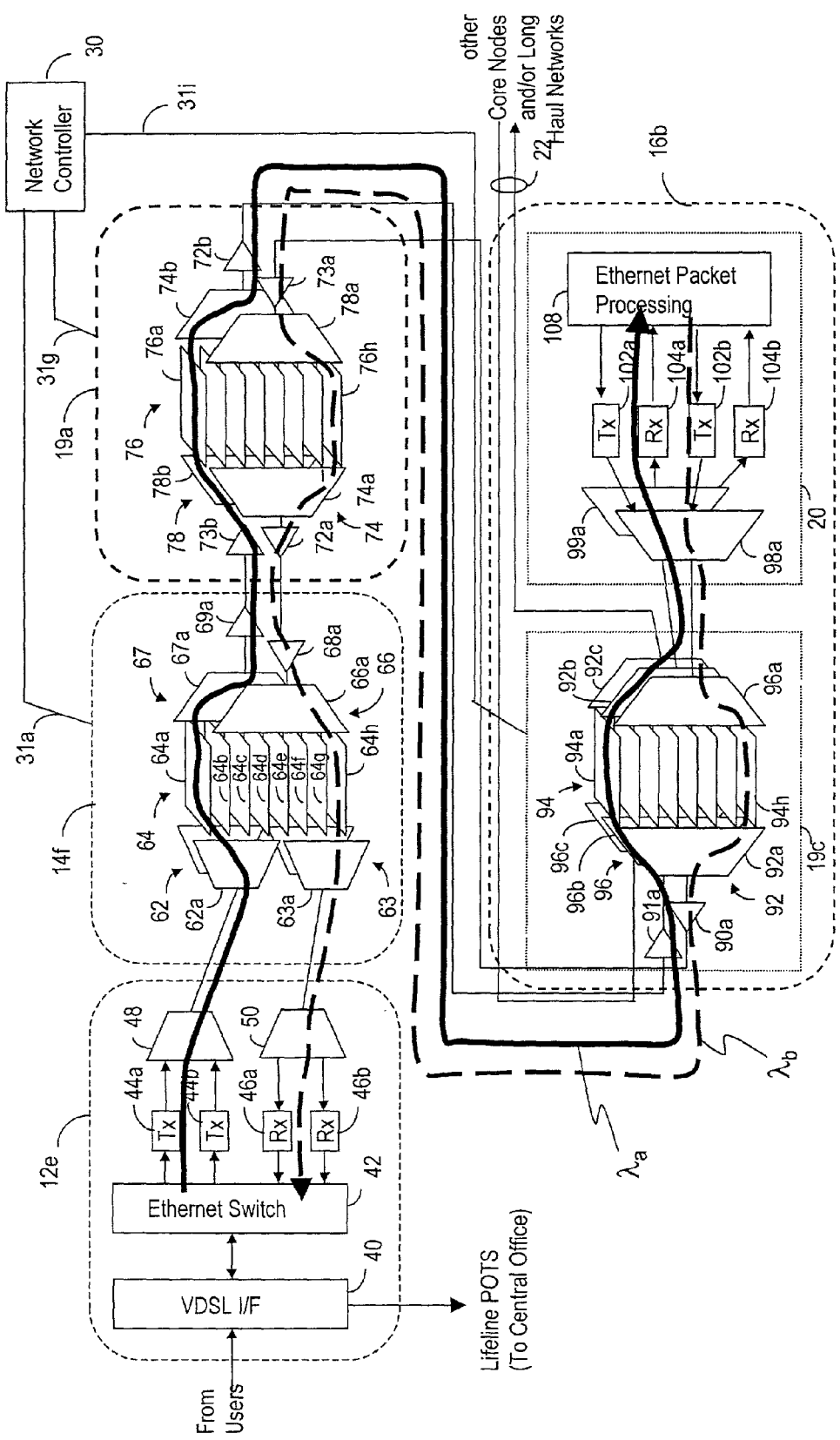
FIG. 14 is a diagram depicting an example wavelength flow through the network portion of FIG. 12.
Figure 15:
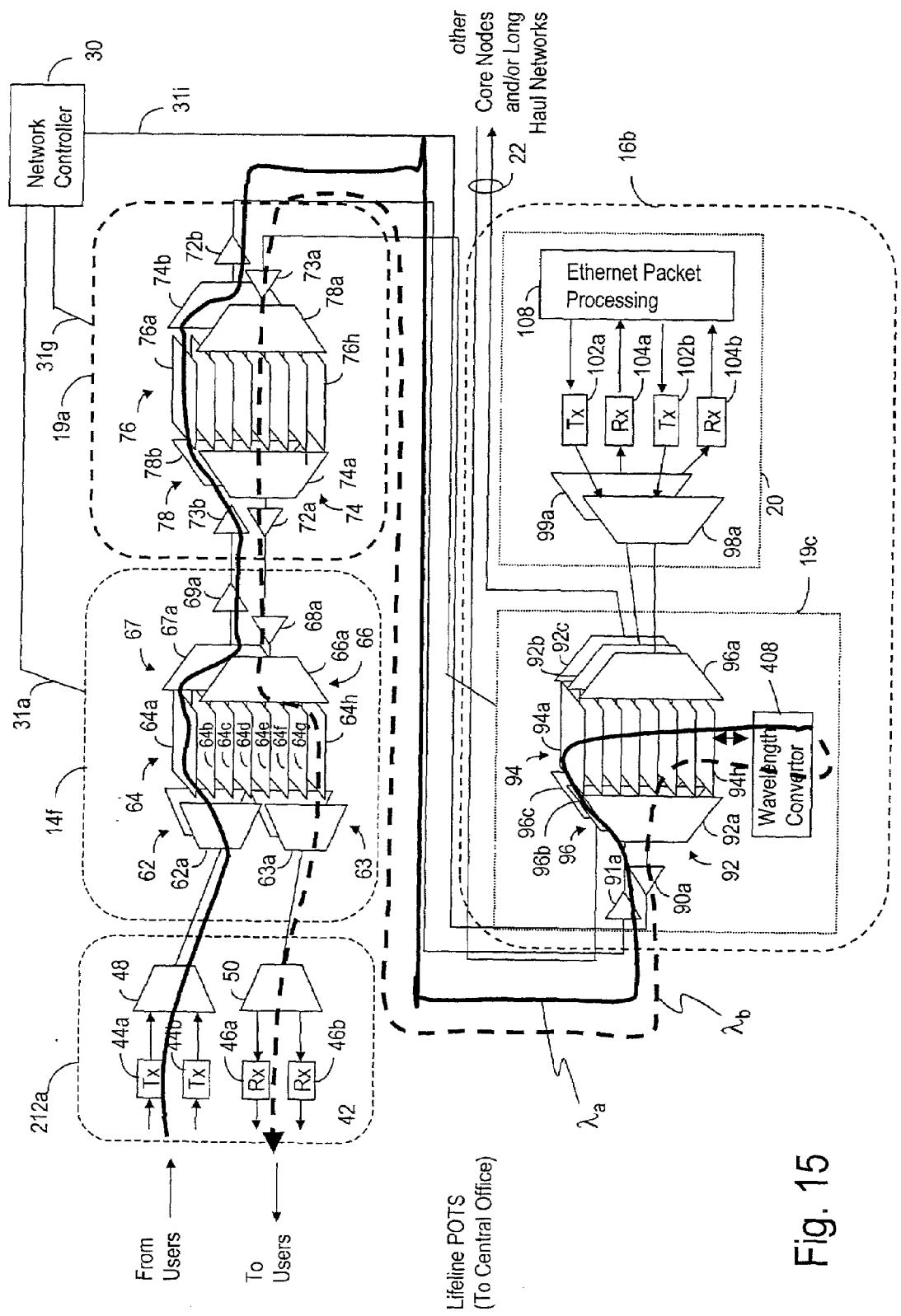
FIG. 15 shows example photonic services in the network portion of FIG. 14.

FIG. 14 is a diagram depicting an example wavelength flow through the portion of the network of FIG. 12. Two examples will be provided, a first wavelength $\lambda_a$ originating in the access multiplexer 12a and flowing upstream to the core node 16a, and a second wavelength $\lambda_b$ originating in the core node 16a and flowing downstream to the access multiplexer 12a.

The first wavelength $\lambda_a$ originates as an unmodulated optical carrier in the transmitter 44a (or may be delivered to the modulator of 44a from a centralized wavelength source) and is modulated by user data in the form of Ethernet frames provided to the transmitter 44a by the Ethernet switch 42. The modulated wavelength is then combined with other modulated wavelengths from other transmitters of the access multiplexer 12a, for example the transmitter 44b. Each transmitter generates an optical carrier having a wavelength which is in accordance with the wavelength plan described earlier with reference to FIG. 10. The first wavelength $\lambda_a$ is then combined with these other wavelengths by the multiplexer 48 into a S-DWDM optical signal and this signal is transmitted to the edge photonic switch 14a. The demultiplexer 62a optically demultiplexes the S-DWDM optical signal into its constituent wavelengths and the first wavelength $\lambda_a$ is switched by the optical switch 64a to the multiplexer 67a. This multiplexer 67a optically multiplexes the first wavelength with other modulated wavelengths from the corresponding port of the other optical switches 64b-64h into a DWDM optical signal. The resulting DWDM optical signal is amplified by the optical amplifier 69a and is transmitted to the core photonic switch 19a. The optical amplifier 73b of the core photonic switch 19a receives this DWDM optical signal, amplifies it, and transmits it to the demultiplexer 78b where it is demultiplexed into its constituent wavelengths. The first wavelength $\lambda_a$ is coupled to the optical switch 76a where it is switched to the multiplexer 74b and optically combined with other wavelengths into a second DWDM optical signal for transmission to the core node 16a after amplification by the optical amplifier 72b. The second DWDM optical signal is received by the optical amplifier 91a in the core photonic switch 19 of the core node 16a. The second DWDM optical signal is demultiplexed into its constituent wavelengths by the demultiplexer 96b and the first wavelength $\lambda_a$ is coupled to the optical switch 94a where it is switched to the multiplexer 92b. The multiplexer 92b multiplexes the first wavelength $\lambda_a$ with other wavelengths from the corresponding ports of the switches 94b-94h into a third DWDM optical signal for transmission to the packet router 20. The demultiplexer 99a in the packet router 20 receives this third DWDM optical signal, demultiplexes it into its constituent wavelengths, and couples the first wavelength $\lambda_a$ to the receiver 104a. The receiver 104a receives the first wavelength $\lambda_a$, converts it to an electrical signal, performs clock and data recovery, and forwards the recovered data to the Ethernet packet processor 108. In this manner user data in the form of an Ethernet frames traverse the photonic layer 23 to arrive at the Ethernet packet processor 108 for further processing accordance with procedures that will be described later.

In a similar manner, the second wavelength $\lambda_b$ originates at the core node 16a and flows downstream to the access multiplexer 12a providing data in the form of Ethernet frames to end-users 4.

The second wavelength $\lambda_b$ originates as an unmodulated optical carrier in the transmitter 102b and is modulated by data in the form of Ethernet frames provided to the transmitter 102b by the Ethernet packet processor 108. The modulated wavelength is then combined with other modulated wavelengths from other transmitters of the core node 16a, for example the transmitter 102a. Each transmitter generates an optical carrier having a wavelength which is in accordance with the wavelength plan described earlier with reference to FIG. 10. The second wavelength $\lambda_b$ is then combined with these other wavelengths by the multiplexer 98a into a DWDM optical signal and this signal is transmitted to the core photonic switch 19. The demultiplexer 96a optically demultiplexes the DWDM optical signal into its constituent wavelengths and the second wavelength $\lambda_b$ is switched by the optical switch 69h to the multiplexer 92a. This multiplexer 92a optically multiplexes the second wavelength $\lambda_b$ with other modulated wavelengths from the corresponding port of the other optical switches 94a-94g into a second DWDM optical signal. The second DWDM optical signal is amplified by the optical amplifier 90a and is transmitted to the core photonic switch 19a. The optical amplifier 73a of the core photonic switch 19a receives this second DWDM optical signal, amplifies it, and transmits it to the demultiplexer 78a where it is demultiplexed into its constituent wavelengths. The second wavelength $\lambda_b$ is then coupled to the optical switch 76h where it is switched to the multiplexer 74a and optically combined with other wavelengths into a third DWDM optical signal for transmission to the edge photonic switch 14a after amplification by the optical amplifier 72a. The third DWDM optical signal is received by the optical amplifier 68a in the edged node 14a. The third DWDM optical signal is demultiplexed into its constituent wavelengths by the demultiplexer 66a and the second wavelength $\lambda_b$ is coupled to the optical switch 64h where it is switched to the multiplexer 63a. The multiplexer 63a multiplexes the second wavelength $\lambda_b$ with other wavelengths from the corresponding ports of the switches 64a-64g into a S-DWDM optical signal for transmission to the access multiplexer 12a. The demultiplexer 50 in the access multiplexer 12a receives this S-DWDM optical signal, demultiplexes it into its constituent wavelengths, and couples the second wavelength $\lambda_b$ to the receiver 46a. The receiver 46a receives the second wavelength $\lambda_b$, converts it to an electrical signal, performs clock and data recovery, and forwards the recovered data to the Ethernet switch 42. In this manner data in the form of an Ethernet frames traverse the photonic layer 23 to arrive at the Ethernet switch 42 for further processing accordance with procedures that will be described later.

Some specifics about wavelength generation and the WDM technology used in the network 202 are now provided. Tunable or wavelength-administered sources in the access equipment/photonic edge equipment from third-party equipment could be accommodated as long as the sources meet DWDM frequency/wavelength precision and stability requirements. Additionally, centralized sources could be shared over multiple access multiplexers 12 by power splitting and amplification, which would result in a lower network cost and simpler lambda administration. The photonic network 23 uses a very cost-effective DWDM optimized switch architecture, which allows for both the enormous growth and bandwidth-carrying capacity of DWDM into the metro network 202. However, optical precision is required for implementing a 100 GHz on-grid wavelength assignment plan, previously described with reference to FIG. 10. This requirement has two aspects, being the precision of the DWDM multiplexers 67, 74, 92 and demultiplexers 66, 78, 96 and the precise generation of the optical carriers themselves. DWDM multiplexers and demultiplexers are rapidly falling in cost and complexity as Array Waveguide technology matures to the point of offering adequate performance. This technology allows a single chip monolithic part to be manufactured using silicon wafer processing.

Standard DWDM technology has too much capacity for the bandwidth demands of a typical metropolitan area access network. Using as many as 40, or even 80, wavelengths per fiber between switches having 300-500 wavelength per port is a reasonable solution for a core network, but using 40 channel plans in the access plant is overkill when each access fiber terminates on just a few access/entry multiplexers and each multiplexer can barely fill a wavelength (especially at 10 Gb/s). An advantage of the present network 202 is that it uses a less dense, in terms of wavelength spacing, access solution. However, since wavelength conversion between the access multiplexers 12 and the core nodes 16 is undesirable, the access wavelength assignment plan has been linked to the core DWDM plan. The approach used to achieve this linking is to simply assign core DWDM wavelengths, in a Round Robin fashion, to a number of subtending access fibers for every core fiber. Hence, if an eight wavelength access plan is adopted, then five different access fibers can be filled from one core DWDM fiber carrying 40 channels. Since Round-Robin assignment was used, only every fifth DWDM wavelength flows into (or from) each access fiber. The resultant lambda-spacing is opened up 5:1 to 500 GHz. Alternatively a 10 wavelength S-DWDM plan can be used as per the earlier examples, resulting in a 400 GHz spacing or even a 4 wavelength plan can be used, resulting in a 1 THz spacing. This relaxes the tolerance on the frequency selective, wavelength selective components enormously, which massively reduces their cost. This approach is hereinafter named "Sparse-DWDM" because it uses a DWDM-compatible frequency grid, sparsely populated with wavelengths.

The optical carriers passing from the core network into the access network require precise wavelength control so that they are able to transit the core network before entering the access plant. In addition, the same amount of optical carrier precision is required on the upstream optical source in the access equipment (e.g. access multiplexers 12), because, although the carrier is being launched into a comparatively broad set of filters and frequency plan in the access, the carrier may be passed through the core photonic switch 19 and into a port of the outgoing core network DWDM filter. This possibility requires that the optical carrier be in the centre of the pass-band of that filter, hence the optical source at the entry point is required to be of DWDM-compatible precision. This precision can be achieved by placing an expensive DWDM-precision source on each port card in the access multiplexer 12. Such a device would consist of a tunable laser, an optical frequency discriminator and a suitable control system. In order to achieve substantial wavelength control and administration, remote provisioning and measurement of the source in the access multiplexer (e.g. access multiplexer 12) are provided.

The S-DWDM is variably mapped into the DWDM links (and vice-versa) by the photonic switches 14. Note that, while the SWDM allows one core DWDM fiber to completely fill five access SWDM fibers this is not a fixed ratio, just an upper bound and an access fiber may contain wavelengths originating from multiple core fibers, or alternatively one, or a few core fibers may fan out across a very large number of access fibers with only one or two wavelengths in each access fiber—in this case the switch is acting as a wavelength concentrator. After passing through the required number of tandem photonic switches (14, 19), the DWDM optical path terminates on the packet router 20, having first transmitted the associated core photonic switch 19. FIG. 14 shows this being achieved via back-to-back DWDM multiplexers 98, 92 and demultiplexers 96,99 separated by the office cabling length, but, if the transponders are close to the core photonic switch 19 this back-to-back multiplexing/demultiplexing can be dispensed with, and replaced by direct transponder-photonic switch interconnection via a much simpler port card. This replacement would result in a simpler, lower stress optical budget throughout the photonic layer 23.

More detail on the photonic layer 23 of the network 202, its structure and its interaction with the surrounding layers (e.g. Ethernet, IP, control and management) is provided below. The photonic layer 23 consists of the photonic interfaces in all of the entry/exiting points (basically access multiplexers 12, and the packet routers 20), the photonic switches 14, 19 themselves, the control infrastructure within and between those switches as well as between the switch nodes and the entry points and between all of these and a network control/management plane. The control plane and management plane both couple across to the Ethernet control, management planes as well as to an Optical User-Network Interface (O-UNI) Server or the network controller 30. The photonic layer 23 is quasi-autonomous and configures its wavelength paths based on requests for end-to-end connectivity passed to the O-UNI Server or network controller 30. The controller/ server then notifies each node 12, 14, 16, 19 of the required new end-to-end path and the nodes co-operate to establish such a path.

End-to-end lambda transport under end-user control in the present network 202 provides several advantages. Firstly, it permits simplification in layer 2, 3 network topology by permitting re-configurable bypass, and elimination of tandem router capacity. Secondly, it permits cost-efficient access to a centralized massive network L2/L3 resource; the packet router 20. Thirdly, it provides non-real time PSN λ-control initially, based on requests to O-UNI server and potential "Dial-a-lambda" capability later.

The present network 202 supports the many applications. For example, high capacity switching and switched bandwidth delivery are supported. Traffic balancing through the network to end nodes and Lambda provisioning to the various access systems are also supported. Path protection and evolution of core network topology are supported through the topology and capacity management available in the photonic network layer 23.

The present network 202 is supported by several photonic protocols. For example, the optical—UNI (O-UNI) protocol is an optical bandwidth control protocol which supports signaling, discovery, registration/de-registration/authentication of users and optical equipment. It also supports connection requests, releases, and l-allocation. It augments routing, scheduling, and optical VPN services and provides information for services billing. The Optical Link Management Protocol (OLMP) provides control channel management and protection as well as link connectivity verification and fault detection/isolation. The OPTICAL-NNI (O-NNI) includes a Wavelength Routing Protocol (WRP) that provides topology and resource discovery, as well as protection, restoration and path optimization algorithms. The OPTICAL-NNI also includes a Wavelength Distribution Protocol (WDP) that provides signalling for connections such as: connection type & bandwidth labelling; connection request, release, path modification; connection priority; connection protection; and connection compatibility check.

More specifically, the O-UNI uses many different light path messages to provide the aforementioned functionality. For example, a lightpath create message creates an end-to-end path across the optical network with attributes. A lightpath delete message releases an established optical path. A lightpath modify message modifies optical path attributes. As well, there is a lightpath status enquiry message for querying the status of an established optical path, a hello message for discovering information about a path, a keep-alive message to prevent temporarily inactive paths from being taken down, and an initial station message used as part of path creation. Using the above messages, network nodes 14, 19 in the photonic layer 23 manage the states of the light paths through the layer 23. According to the O-UNI specification a light path typically progresses through following states from a set up to tear down: Null, Call Initiated, Call Present, Active, Release Request, and Release Indication. Furthermore, a light path may have any one of the following attributes associated with it: an identifier, framing type, overhead termination, priority, maximum delay, route diversity, directionality, protection, pre-emption and bandwidth.

Figure 16:
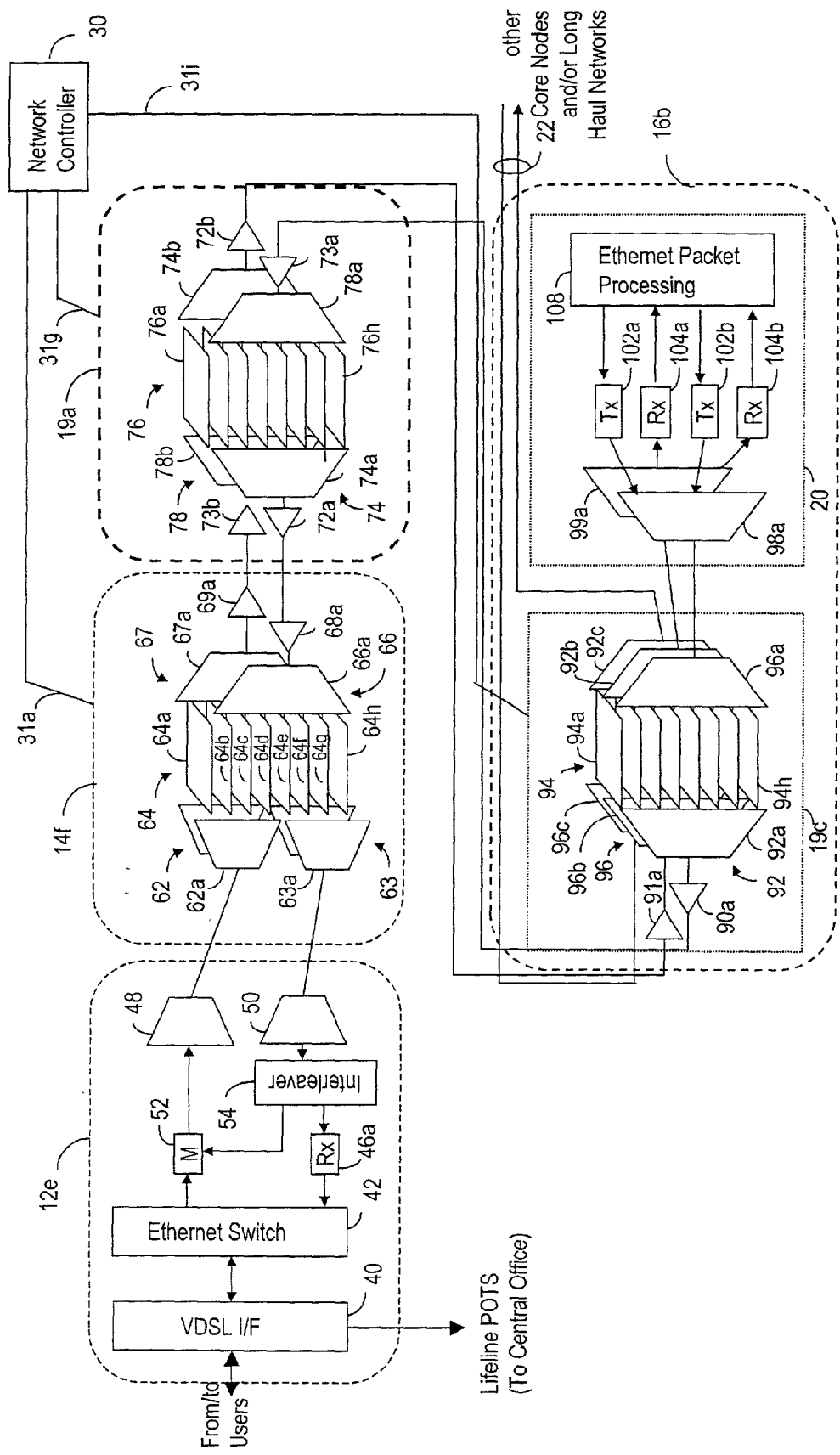
FIG. 16 shows a portion of the network of FIG. 5 in accordance with a fourth embodiment of the invention.

FIG. 16 shows an access multiplexer for supporting the wavelength distribution plan of FIG. 11. The access multiplexer 12e includes an interleaver 54 coupled between the S-DWDM demultiplexer 50 and the receiver 46a. The interleaver 54 directs each of the adjacent optical carriers (e.g. modulated carrier λ1 and unmodulated carrier λ2) to different components. The modulated carrier is directed to the receiver 46a and the unmodulated carrier is directed to a modulator 52 which is coupled between the Ethernet switch 42 and the S-DWDM multiplexer 48. The modulator 52 modulates the carrier it receives with data received from the Ethernet switch 42 and outputs the modulated carrier to the multiplexer 48.

Figure 17:
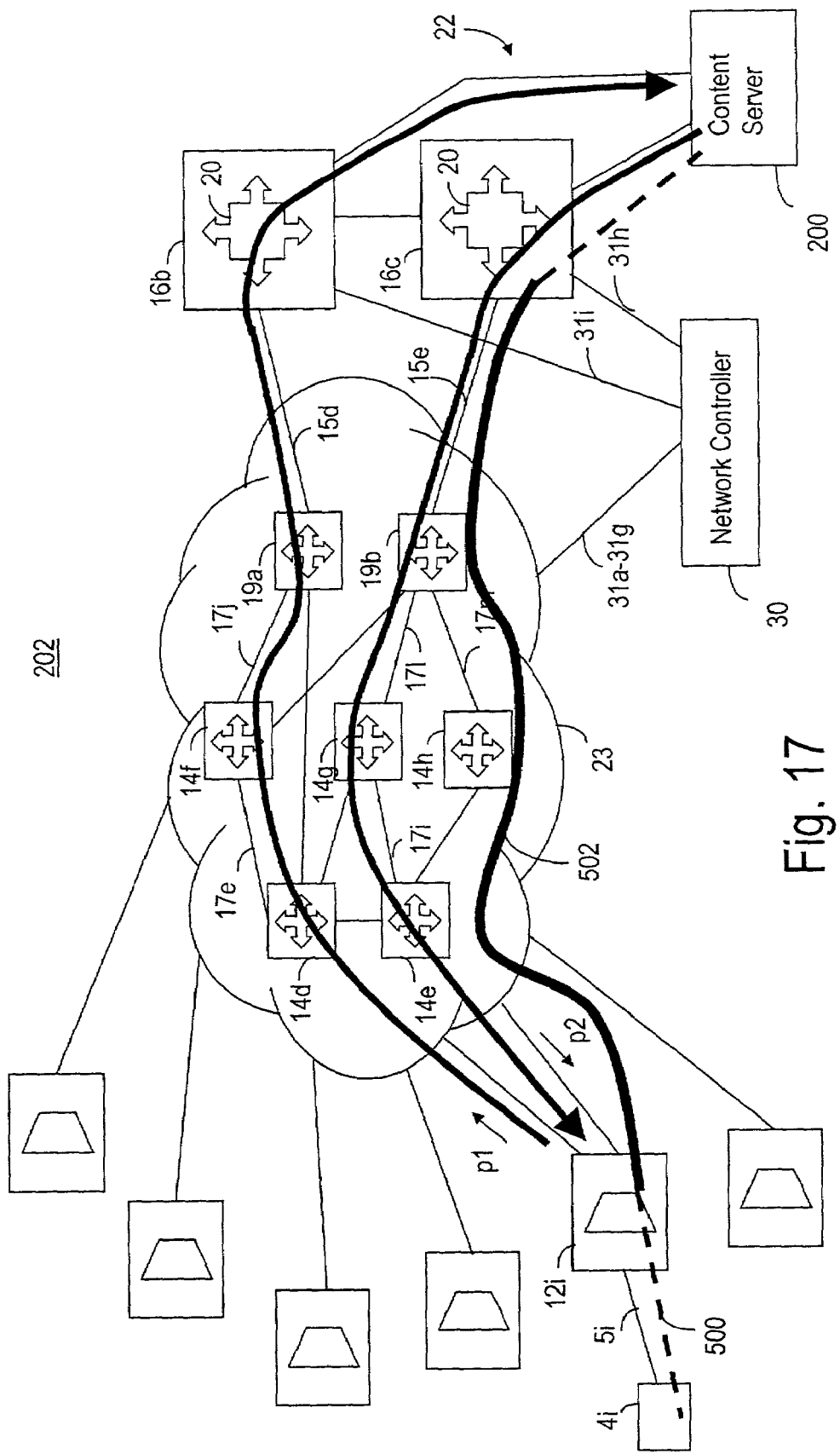
FIG. 17 is a diagram depicting example packet flows through the network of FIG. 5.

FIG. 17 is a diagram depicting example packet flows through the network of FIG. 5. An IP packet flow p1 originates from an application process running on an end-user's computer 4e. Each packet in the flow p1 has an IP source and destination address. The end-user's computer 4e encapsulates the IP flow into Ethernet frames, each frame having the Mac address of the end-user's computer, and performs the required modulation to send the Ethernet frames over the VDSL link 5e. At the access multiplexer 12e, the VDSL signal is received and the Ethernet frames are extracted and multiplexed with Ethernet frames from other users into a 1 Gb/s Ethernet (1 GE) stream with the MAC addresses of the Ethernet frames preserved in order to identify that the originating Ethernet access port. The 1 GE stream is multiplexed into a 10 GE stream using statistical multiplexing of Ethernet frames at x: 1 (x=1-10). The MAC addresses are preserved to permit mapping into appropriate tributary 1 GE streams in the return path. Ethernet frame flows are mapped in two wavelengths based on which destination router 20 (e.g. in core node 16a or 16b) is hosting the connection. In the example show on in FIG. 16, the flow p1 is hosted by the core node 16a, while a return flow p2 is hosted by the other core node 16b. The 10 GE and 1 GE frames streams are terminated by the router 20 in the hosting core node 16, the MAC and IP originating addresses are stored, and the IP stream is passed on for further routing based on IP address. This routing may be to a destination within the network 202 or a destination outside the network 202, for example to a long haul gateway or local content server 200.

Within the photonic layer 23, wavelengths are connected across the photonic switches 14 and tandem photonic switches 19 to the core nodes 16 according to wavelength engineering requests implemented by agile wavelength protocols. This results in a photonically switched wavelength network that is slow-dynamically optimised according to lambda demand. Servers 200 may also be connected via Ethernet multiplexers if they have low capacity, or may have a dedicated wavelength to one of the core nodes 16, in which case they would have a 1 GE or 10 GE interface.

Simply put, the present network 202 consists of access Ethernet multiplexers 12 homing in to one or more core Ethernet interfaced routers 20 via a photonic switched network 23. Multiplexed end-users 4, servers and content sources are accessed the same way, and the flows p1, p2 show the path taken via an IP stream that is providing a connection between the end-user 4 and a content server 200 to. Note that all flows are in Ethernet frame streams with IP address visibility only at the content source 200, the end-user 4 and at one point in the network; the packet router 20. Note also that the long-haul network ports may be connected off of a photonic switch 19a, 19b remote from that packet router 20 with dedicated photonic circuits 22 to that long-haul gateway, and that the long-haul gateway may well have sub-lambda functionality; especially for hand off from an ILEC to multiple third-party long-haul carriers, since individual services and circuits have to be groomed into the multiple networks on a per-service basis. Alternatively, this functionality can be absorbed into the packet router 20, in which case the access to long-haul carriers may be at the wavelength level or the aggregated SONET pipe level.

In the case of the downstream flow from the core node 16 to the end user, large numbers of transceivers should to be co-located in one place in the core node 16 site, which leads to a particular optimum implementation. For the upstream return optical signal, the access multiplexer 12 use relatively few wavelengths each so the transponder functions need to be distributed to the access multiplexer 12. This is achieved by making the transceiver elements necessarily located in the access multiplexer 12 for data Tx/Rx purposes dependent upon an incoming optical carrier which is generated at a centralized location in the core node 16. Note that, other than transceiver elements located in the co-located Access Multiplexers in the edge photonic switch 14 site, there are virtually no electro-optic functions in the edge photonic switch 14 location (except for the electro-optics associated with the actual control of the edge photonic switch 14). The intent to develop very dense electro-optics compatible with metro reach (but not long-haul) requires a very power-efficient design. This is largely achieved by massively reducing the power needed to drive the outgoing modulation process.

A layer-2 or layer-3 tunnel 500, between the end-user 4*i* and the content server 200, is shown inside a layer-2 tunnel 502 (e.g. MPLS tunnel) between the access multiplexer 12*i* and the core node 16*c*. These tunnels 500, 502, are set up at network configuration, and as a result of granted user requests, by the network controller 30 in conjunction with the CMs 120.

As the present network 202 is put in place it is desirable that the network 202 be compatible with existing legacy equipment that it will eventually displace. At the levels below an entire wavelength this compatibility is achieved by adding multi-services add-drop cards to the various forms of Ethernet Multiplexer (either the access multiplexer 12 or the PAM/S). Note that circuit emulation through the Ethernet multiplexer is possible at any bandwidth up to and including a complete wavelength but, at the entire wavelength level, it is likely preferable to provide a direct lambda path through the edge note 14 and rather than through an Ethernet Multiplexer.

Migration from legacy networks to the present network 202 can be accomplished with the following steps. First, adding multi-service access cards to access multiplexers 12 to support IP, ATM, Frame Relay, etc. as required. Second, packetizing legacy services onto MPLS over Ethernet. This packetization would provide a connection-oriented service with QoS like ATM and use the dominant layer 2 protocol (Ethernet) of the Internet. Furthermore, SONET links could be emulated over Ethernet.

Numerous alterations, variations and adaptations to the embodiments of the invention described above are possible within the scope of the invention, which is defined by the claims.

What is claimed is:

1. A communications network for a metropolitan area comprising:
   a plurality of access multiplexers, each access multiplexer operable to provide multiplexing of data packets from a plurality of end-users onto a sparse dense wavelength division multiplexed (S-DWDM) wavelength; the S-DWDM wavelength having an optical precision capable of being interleaved into the optical frequency constraints of a dense wavelength division multiplex (DWDM) wavelength plan used in a core network;
   a photonic switch, coupled to the access multiplexers via fiber optic cable for carrying a plurality of S-DWDM wavelengths, being all-optical and operable to switch the plurality of S-DWDM wavelengths into a DWDM signal for transmission; and
   a core node being part of the core network, coupled to the photonic switch via a fiber optic cable for carrying the DWDM signal, and operable to route the data packets within the communications network or out to a long haul network.

2. The network as claimed in claim 1 wherein the photonic switch includes a multi-wavelength source for generating DWDM quality wavelengths for supplying the access multiplexers with unmodulated wavelengths upon which to multiplex data packets.

3. The network as claimed in claim 1 wherein the core node includes a photonic switch and a packet switch.

4. The network as claimed in claim 3 wherein the photonic switch includes a multi-wavelength source for generating DWDM quality wavelengths for supplying the packet switch with unmodulated wavelengths upon which to multiplex data packets.

5. The network of claim 1 wherein the data packets are Ethernet packets.

6. The network of claim 5 wherein a portion of the data packets are transmitted from a particular end-user to a particular access multiplexer over a local loop, connecting the particular end-user to the particular access multiplexer, using a digital subscriber line DSL protocol.

7. The network of claim 6 wherein the DSL protocol is a very-high-data-rate VDSL protocol.

8. The network of claim 1 wherein the photonic switches are capable of switching at the wavelength, group of wavelength, and fiber level.

9. The network of claim 1 wherein the core node is capable of switching at the wavelength, group of wavelength, and fiber level.

10. The network of claim 9 wherein the core node is capable of switching data packets based on a service to which the data packet pertains.

11. The network of claim 10 further comprising a plurality of photonic switches, each of the photonic switches connected to at least one other photonic switch and the core node.

12. The network of claim 11 further comprising a plurality of core nodes, each of core nodes connected to at least one other core node.

13. The network as claimed in claim 1 wherein the core node includes a wavelength converter for converting one wavelength to another wavelength to provide an end-to-end photonic connection across the network.

14. The network as claimed in claim 13 wherein the wavelength converter includes opto-electronic devices.

15. The network as claimed in claim 14 wherein the wavelength converter includes photonic devices.

16. A method of operating a metropolitan photonic network comprising the steps of:
   providing to an access multiplexer a dense wavelength division multiplex (DWDM) quality unmodulated wavelength from a source remote therefrom;
   modulating the wavelength with packet data at the access multiplexer;
   multiplexing the wavelength together with other modulated wavelengths to form a sparse wavelength division multiplexed (S-DWDM) signal, the S-DWDM signal having an optical precision capable of being interleaved into the optical frequency constraints of a dense wavelength division multiplex (DWDM) wavelength plan used in a core network;
   transporting the S-DWDM signal to a metro photonic switch, the metro photonic switch being all-optical;
   demultiplexing the S-DWDM signal to a plurality of wavelengths;
   switching each of the plurality of wavelengths on a per wavelength basis;

multiplexing different switched wavelengths to form a (DWDM) signal; and launching the DWDM signal toward a core node in the core network.

17. The method as claimed in claim 16 wherein the step of providing to an access multiplexer a DWDM quality unmodulated wavelength includes generating a plurality of DWDM quality wavelengths adjacent to a metro photonic switch and coupling one of the plurality of wavelengths to a fiber from the metro photonic switch to the access multiplexer.

18. The method as claimed in claim 17 wherein the step of modulating the wavelength with packet data at the access multiplexer includes the step of receiving packet data from the access network and modulating the unmodulated wavelength from the metro photonic switch therewith.

19. The method as claimed in claim 18 wherein the step of multiplexing the wavelength together with other modulated wavelengths to form a sparse dense wavelength division multiplexed (S-DWDM) signal includes the step of selecting wavelengths having a predetermined separation.

20. The method as claimed on claim 19 wherein the DWDM signal includes N wavelengths and the predetermined separation is s, where N>s and N and s are integers.

21. The method as claimed in claim 20 wherein N is 40 and s is 5.

22. A photonic metropolitan network comprising:

means for providing to the access multiplexer a dense wavelength division multiplex (DWDM) quality unmodulated wavelength from a source remote therefrom;

an access multiplexer including means for modulating the wavelength with packet data at the access multiplexer, and means for multiplexing the wavelength together with other modulated wavelengths to form a sparse wavelength division multiplexed (S-DWDM) signal, the S-DWDM signal having an optical precision capable of being interleaved into the optical frequency constraints of a dense wavelength division multiplex (DWDM) wavelength plan used in a core network;

means for transporting the S-DWDM signal to the metro photonic switch;

wherein the metro photonic switch is all-optical, includes means for demultiplexing the S-DWDM signal at the metro photonic switch to a plurality of wavelengths; means for switching each of the plurality of wavelengths on a per wavelength basis; means for multiplexing different switched wavelengths to form a DWDM signal; and means for transporting the DWDM signal to a core node in the core network.

23. A communications network for a metropolitan area comprising:

a plurality of access multiplexers, each access multiplexer operable to provide multiplexing of data packets from a plurality of end-users onto a sparse dense wavelength division multiplexed (S-DWDM) wavelength, the S-DWDM wavelength having an optical precision capable of being interleaved into the optical frequency constraints of a first separation being multiple of a second separation in a dense wavelength division multiplex (DWDM) wavelength plan used in a core network;

a photonic switch, coupled to the access multiplexers via fiber optic cable for carrying a plurality of the S-DWDM wavelengths, being all-optical and operable to switch the plurality of S-DWDM wavelengths into a DWDM signal for transmission;

a core node, coupled to the photonic switch via a fiber optic cable for carrying the DWDM signal, and operable to mute the data packets within the communications network or out to a long haul network; and a control plane coupled to the photonic switch and the core node for effecting end-to-end photonic connectivity.

24. The communications network as claimed in claim 23 wherein the core node includes a packet router and a photonic switch coupled together to effect packet level switching for packets originating at the access multiplexers.

25. The communications network as claimed in claim 24 wherein the core node includes a wavelength converter coupled to the photonic switch to effect an all photonic connection through the network.

26. The communications network as claimed in claim 23 wherein the photonic switch includes a first plurality of input ports and a second plurality of output ports, with the first being greater than the second, whereby the photonic switch effects concentration of the S-DWDM wavelengths from the access multiplexers.

* * * * *

UNITED STATES PATENT AND TRADEMARK OFFICE
CERTIFICATE OF CORRECTION

PATENT NO. : 7,599,620 B2  Page 1 of 1
APPLICATION NO. : 09/893493
DATED : October 6, 2009
INVENTOR(S) : Alan F. Graves et al.

It is certified that error appears in the above-identified patent and that said Letters Patent is hereby corrected as shown below:

Column 48
line 56, after "form a sparse" insert --dense--.

Column 49
line 22, change "as claim on claim 19" to read --as claimed in claim 19--.
line 36, after "form a sparse" insert --dense--.

Column 50
line 25, change "mute" to --route--.

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

PATENT NO.         : 7,599,620 B2                                    Page 1 of 1
APPLICATION NO. : 09/893493
DATED              : October 6, 2009
INVENTOR(S)        : Graves et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1867 days.

Signed and Sealed this

Fourteenth Day of December, 2010

David J. Kappos
*Director of the United States Patent and Trademark Office*